United States Patent
Boyden et al.

(10) Patent No.: US 7,862,771 B2
(45) Date of Patent: **\*Jan. 4, 2011**

(54) APC PROCESS PARAMETER ESTIMATION

(75) Inventors: Scott A. Boyden, Knoxville, TN (US); Stephen Piche, Austin, TX (US)

(73) Assignee: Alstom Technology Ltd., Baden (CH)

( * ) Notice: Subject to any disclaimer, the term of this patent is extended or adjusted under 35 U.S.C. 154(b) by 1784 days.

This patent is subject to a terminal disclaimer.

(21) Appl. No.: 11/002,436

(22) Filed: Dec. 3, 2004

(65) Prior Publication Data

US 2006/0045802 A1 Mar. 2, 2006

Related U.S. Application Data

(63) Continuation of application No. 10/927,243, filed on Aug. 27, 2004, now Pat. No. 7,536,232.

(51) Int. Cl.
- *B01D 53/60* (2006.01)
- *B01D 53/56* (2006.01)
- *B01D 53/54* (2006.01)
- *B01D 53/34* (2006.01)
- *G05B 23/02* (2006.01)

(52) U.S. Cl. .......................... 422/62; 422/83; 422/177; 422/172; 436/55; 700/266; 700/267; 700/52; 700/48; 700/51; 700/54; 423/235; 423/237; 423/242.1

(58) Field of Classification Search .................. None
See application file for complete search history.

(56) References Cited

U.S. PATENT DOCUMENTS

| | | | |
|---|---|---|---|
| 4,423,018 A | 12/1983 | Lester et al. | |
| 4,487,784 A | 12/1984 | Kuroda et al. | |
| 4,836,991 A | * 6/1989 | Ishiguro et al. | 423/243.03 |
| 5,167,009 A | 11/1992 | Skeirik | |

(Continued)

FOREIGN PATENT DOCUMENTS

| | | |
|---|---|---|
| EP | 0296500 | 12/1988 |
| EP | 0866395 | 9/1998 |
| EP | 1382905 | 1/2004 |
| JP | 109897/78 | 9/1978 |
| JP | 290036/96 | 11/1996 |
| JP | 2001-249705 | 9/2001 |
| JP | 2003-144852 | 5/2003 |
| WO | WO 03/065135 | 8/2003 |
| WO | WO 2004061278 | * 7/2004 |

OTHER PUBLICATIONS

Tran, et al., "Dynamic Matrix Control on Benzene and Toluene Towers", Oct. 1989.

(Continued)

*Primary Examiner*—P. Kathryn Wright
(74) *Attorney, Agent, or Firm*—Antonelli, Terry, Stout & Kraus, LLP; Alfred A. Stadnicki

(57) ABSTRACT

A virtual analyzer is provided to estimate either an attribute of a reactant applied during performance of, or an amount of a reactant exhausted by, a process having multiple process parameters (MPPs) that is performed to control an amount of a pollutant emitted into the air. The virtual analyzer includes an interface which receives signals corresponding to attributes of the MPPs. If the process is a wet flue gas desulfurization (WFGD) process, the signals include a signal corresponding to a measured pH level of the applied reactant. If the process is a selective catalytic reduction (SCR) process, the signals include a signal corresponding to a measured amount of the reactant exhausted by the process.

7 Claims, 26 Drawing Sheets

U.S. PATENT DOCUMENTS

| | | | |
|---|---|---|---|
| 5,212,765 | A | 5/1993 | Skeirik |
| 5,282,261 | A | 1/1994 | Sheirik |
| 5,386,373 | A | 1/1995 | Keeler et al. |
| 5,479,573 | A | 12/1995 | Keeler et al. |
| 5,548,528 | A | 8/1996 | Keeler et al. |
| 5,605,552 | A | 2/1997 | Shimizu et al. |
| 5,635,149 | A | 6/1997 | Klingspor et al. |
| 5,729,661 | A | 3/1998 | Keeler et al. |
| 5,770,161 | A | 6/1998 | Ochi et al. |
| 5,770,166 | A | 6/1998 | Shimizu et al. |
| 5,781,432 | A | 7/1998 | Keeler et al. |
| 5,933,345 | A | 8/1999 | Martin et al. |
| 6,002,839 | A | 12/1999 | Keeler et al. |
| 6,047,221 | A | 4/2000 | Piche et al. |
| 6,168,709 | B1 | 1/2001 | Etter |
| 6,243,696 | B1 | 6/2001 | Keeler et al. |
| 6,278,899 | B1 | 8/2001 | Piche et al. |
| 6,493,596 | B1 | 12/2002 | Martin et al. |
| 6,542,852 | B2 | 4/2003 | Chen et al. |
| 6,611,726 | B1 | 8/2003 | Crosswhite |
| 6,625,501 | B2 | 9/2003 | Martin et al. |
| 6,656,440 | B2 | 12/2003 | Takashina et al. |
| 6,662,185 | B1 | 12/2003 | Stark et al. |
| 6,746,237 | B2 | 6/2004 | Storm et al. |
| 6,856,855 | B2 | 2/2005 | Hirata et al. |
| 6,865,509 | B1 | 3/2005 | Hsiung et al. |
| 6,882,940 | B2 | 4/2005 | Potts et al. |
| 6,985,779 | B2 | 1/2006 | Hsiung et al. |
| 7,113,835 | B2 * | 9/2006 | Boyden et al. ............... 700/52 |
| 7,323,036 | B2 * | 1/2008 | Boyden et al. ............... 95/108 |
| 2004/0098974 | A1 * | 5/2004 | Nieuwstadt et al. ........... 60/286 |
| 2004/0249480 | A1 * | 12/2004 | Lefebvre et al. ............. 700/31 |
| 2005/0131620 | A1 * | 6/2005 | Bowyer ..................... 701/108 |
| 2005/0265417 | A1 | 12/2005 | Fallon et al. |
| 2006/0042525 | A1 * | 3/2006 | Lefebvre et al. ............ 110/185 |
| 2006/0052902 | A1 * | 3/2006 | Lefebvre et al. ............ 700/266 |
| 2006/0153761 | A1 * | 7/2006 | Bandl-Konrad et al. .. 423/239.1 |
| 2006/0178762 | A1 * | 8/2006 | Wroblewski et al. .......... 700/30 |

OTHER PUBLICATIONS

O'Conner, et al., "Application of a Single Multivariable Controller to Two Hydrocracker Distillation Columns in Series", Oct. 1991.

Brown, et al., "Adaptive, Predictive Controller for Optimal Process Control", Los Almost National Laboratory, Los Alamos, NM, 1993.

Boyden, et al., "The Development of DMCix: The AxM-based (DMC)™ Controller Interface", Honeywell OpenUSE Technical Exchange Seminar, Mar. 1995.

Boyden "Controlled Variable Predictions with DMI: Temperature to Analyzer Predictors", Jun. 1995.

Bequette, Model Predictive Control—References (Aug. 2000).

B. Hacking, "Advanced Control of Selective Catalytic Reduction (SCR) Literature and Patent Review", Pegasus Technologies Technical Report, Mar. 2003.

B. Hacking, "Advanced Control of Wet Flue Gas Desulfurization Literature and Patent Review", Pegasus Technologies Technical Report, Apr. 2003.

* cited by examiner

1450

Lab Sample Entry Form | Advanced Controller

Unit 1 Lab Sample Entry

UNIT 1 GYPSUM PURITY

|  | VALUE (%) |
|---|---|
| PURITY | 95.6 |

| | MONTH | DAY | TIME |
|---|---|---|---|
| SAMPLE TIME | 1 | 3 | 1030 |

[UPDATE]

ABSORBER 1 CHEMISTRY

|  | VALUE (PPM) |
|---|---|
| CHLORIDE | 1700 |
| MAGNESIUM | 3500 |
| FLUORIDE | 67 |

| | MONTH | DAY | TIME |
|---|---|---|---|
| SAMPLE TIME | 1 | 2 | 0950 |

[UPDATE]

Unit 2 Lab Sample Entry

UNIT 2 GYPSUM PURITY

|  | VALUE (%) |
|---|---|
| PURITY | 95.3 |

| | MONTH | DAY | TIME |
|---|---|---|---|
| SAMPLE TIME | 1 | 3 | 0600 |

[UPDATE]

ABSORBER 2 CHEMISTRY

|  | VALUE (PPM) |
|---|---|
| CHLORIDE | 1800 |
| MAGNESIUM | 3200 |
| FLUORIDE | 82 |

| | MONTH | DAY | TIME |
|---|---|---|---|
| SAMPLE TIME | 1 | 2 | 0950 |

[UPDATE]

UNIT 1 AND 2 COMBINED LAB SAMPLE ENTRY

|  | VALUE (%) |  | VALUE (%) |
|---|---|---|---|
| GYPSUM PURITY | 92.3 | LS PURITY | 96.7 |
|  |  | LS GRIND | 94.3 |

| | MONTH | DAY | TIME | | MONTH | DAY | TIME |
|---|---|---|---|---|---|---|---|
| SAMPLE TIME | 1 | 2 | 0950 | SAMPLE TIME | 1 | 2 | 0950 |

[UPDATE] [UPDATE]

Figure 14B

APC PROCESS PARAMETER ESTIMATION

RELATED APPLICATIONS

This application is a Continuation application of U.S. Application Ser. No. 10/927,243, filed Aug. 27, 2004, now U.S. Pat. No. 7,536,232 entitled MODEL PREDICTIVE CONTROL OF AIR POLLUTION CONTROL PROCESSES; which is related to U.S. application Ser. No. 10/927,229, filed Aug. 27, 2004, entitled OPTIMIZED AIR POLLUTION CONTROL; U.S. application Ser. No. 10/927,049, filed concurrently herewith, entitled COST BASED CONTROL OF AIR POLLUTION CONTROL; U.S. application Ser. No. 11/002,439, filed concurrently herewith, entitled APC PROCESS CONTROL WHEN PROCESS PARAMETERS ARE INACCURATELY MEASURED; U.S. application Ser. No. 10/927,201, filed Aug. 27, 2004, entitled CONTROL OF ROLLING OR MOVING AVERAGE VALUES OF AIR POLLUTION CONTROL EMISSIONS TO A DESIRED VALUE; U.S. application Ser. No. 10/926,991, filed Aug. 27, 2004, entitled CASCADED CONTROL OF AN AVERAGE VALUE OF A PROCESS PARAMETER TO A DESIRED VALUE; U.S. application Ser. No. 10/927,200, filed Aug. 27, 2004, entitled MAXIMIZING PROFIT AND MINIMIZING LOSSES IN CONTROLLING AIR POLLUTION; U.S. application Ser. No. 10/927,221, filed Aug. 27, 2004, entitled MAXIMIZING REGULATORY CREDITS IN CONTROLLING AIR POLLUTION, the contents of which are incorporated by reference herein in their entirety.

BACKGROUND OF THE INVENTION

1. Field of Endeavor

The present invention relates generally to process control. More particularly the present invention relates to techniques for enhanced control of processes, such as those utilized for air pollution control. Examples of such processes include but are not limited to wet and dry flue gas desulfurization (WFGD/DFGD), nitrogen oxide removal via selective catalytic reduction (SCR), and particulate removal via electrostatic precipitation (ESP).

2. Background

Wet Flue Gas Desulfurization:

As noted, there are several air pollution control processes, to form a basis for discussion; the WFGD process will be highlighted. The WFGD process is the most commonly used process for removal of $SO_2$ from flue gas in the power industry. FIG. 1, is a block diagram depicting an overview of a wet flue gas desulfurization (WFGD) subsystem for removing $SO_2$ from the dirty flue gas, such as that produced by fossil fuel, e.g. coal, fired power generation systems, and producing a commercial grade byproduct, such as one having attributes which will allow it to be disposed of at a minimized disposal cost, or one having attributes making it saleable for commercial use.

In the United States of America, the presently preferred byproduct of WFGD is commercial grade gypsum having a relatively high quality (95±% pure) suitable for use in wallboard, which is in turn used in home and office construction. Commercial grade gypsum of high quality (~92%) is also the presently preferred byproduct of WFGD in the European Union and Asia, but is more typically produced for use in cement, and fertilizer. However, should there be a decline in the market for higher quality gypsum, the quality of the commercial grade gypsum produced as a byproduct of WFGD could be reduced to meet the less demanding quality specifications required for disposal of at minimum costs. In this regard, the cost of disposal may be minimized if, for example, the gypsum quality is suitable for either residential landfill or for backfilling areas from which the coal utilized in generating power has been harvested.

As shown in FIG. 1, dirty, $SO_2$ laden flue gas 112 is exhausted from a boiler or economizer (not shown) of a coal fired power generation system 110 to the air pollution control system (APC) 120. Commonly the dirty flue gas 112 entering the APC 120 is not only laden with $SO_2$, but also contains other so called pollutants such as $NO_x$ and particulate matter. Before being processed by the WFGD subsystem, the dirty flue gas 112 entering the APC 120 is first directed to other APC subsystems 122 in order remove $NO_x$ and particulate matter from the dirty flue gas 112. For example, the dirty flue gas may be processed via a selective catalytic reduction (SCR) subsystem (not shown) to remove $NO_x$ and via an electrostatic precipitator subsystem (EPS) (not shown) or filter (not shown) to remove particulate matter.

The $SO_2$ laden flue gas 114 exhausted from the other APC subsystems 122 is directed to the WFGD subsystem 130. $SO_2$ laden flue gas 114 is processed by the absorber tower 132. As will be understood by those skilled in the art, the $SO_2$ in the flue gas 114 has a high acid concentration. Accordingly, the absorber tower 132 operates to place the $SO_2$ laden flue gas 114 in contact with liquid slurry 148 having a higher pH level than that of the flue gas 114.

It will be recognized that most conventional WFGD subsystems include a WFGD processing unit of the type shown in FIG. 1. This is true, for many reasons. For example, as is well understood in the art, WFGD processing units having a spray absorber towers have certain desirable process characteristics for the WFGD process. However, WFGD processing units having other absorption/oxidation equipment configurations could, if desired, be utilized in lieu of that shown in FIG. 1 and still provide similar flue gas desulfurization functionality and achieve similar benefits from the advanced process control improvements presented in this application. For purposes of clarity and brevity, this discussion will reference the common spray tower depicted in FIG. 1, but it should be noted that the concepts presented could be applied to other WFGD configurations.

During processing in the countercurrent absorber tower 132, the $SO_2$ in the flue gas 114 will react with the calcium carbonate-rich slurry (limestone and water) 148 to form calcium sulfite, which is basically a salt and thereby removing the $SO_2$ from the flue gas 114. The $SO_2$ cleaned flue gas 116 is exhausted from the absorber tower 132, either to an exhaust stack 117 or to down-steam processing equipment (not shown). The resulting transformed slurry 144 is directed to the crystallizer 134, where the salt is crystallized. The crystallizer 134 and the absorber 132 typically reside in a single tower with no physical separation between them—while there are different functions (absorption in the gas phase and crystallization in the liquid phase) going on, the two functions occur in the same process vessel. From here, gypsum slurry 146, which includes the crystallized salt, is directed from the crystallizer 134 to the dewatering unit 136. Additionally, recycle slurry 148, which may or may not include the same concentration of crystallized salts as the gypsum slurry 146, is directed from the crystallizer 134 through pumps 133 and back to the absorber tower 132 to continue absorption cycle.

The blower 150 pressurizes ambient air 152 to create oxidation air 154 for the crystallizer 134. The oxidation air 154 is mixed with the slurry in the crystallizer 134 to oxidize the calcium sulfite to calcium sulfate. Each molecule of calcium sulfate binds with two molecules of water to form a compound that is commonly referred to as gypsum 160. As shown, the gypsum 160 is removed from the WFGD processing unit 130 and sold to, for example manufacturers of construction grade wallboard.

Recovered water 167, from the dewatering unit 136 is directed to the mixer/pump 140 where it is combined with fresh ground limestone 174 from the grinder 170 to create limestone slurry. Since some process water is lost to both the gypsum 160 and the waste stream 169, additional fresh water 162, from a fresh water source 164, is added to maintain the limestone slurry density. Additionally, waste, such as ash, is removed from the WFGD processing unit 130 via waste stream 169. The waste could, for example, be directed to an ash pond or disposed of in another manner.

In summary, the $SO_2$ within the $SO_2$ laden flue gas 114 is absorbed by the slurry 148 in the slurry contacting area of the absorber tower 132, and then crystallized and oxidized in the crystallizer 134 and dewatered in the dewatering unit 136 to form the desired process byproduct, which in this example, is commercial grade gypsum 160. The $SO_2$ laden flue gas 114 passes through the absorber tower 132 in a matter of seconds. The complete crystallization of the salt within the transformed slurry 144 by the crystallizer 134 may require from 8 hours to 20+ hours. Hence, the crystallizer 134 has a large volume that serves as a slurry reservoir crystallization. The recycle slurry 148 is pumped back to the top of the absorber to recover additional SO2.

As shown, the slurry 148 is fed to an upper portion of the absorber tower 132. The tower 132 typically incorporates multiple levels of spray nozzles to feed the slurry 148 into the tower 132. The absorber 132, is operated in a countercurrent configuration: the slurry spray flows downward in the absorber and comes into contact with the upward flowing $SO_2$ laden flue gas 114 which has been fed to a lower portion of the absorber tower.

Fresh limestone 172, from limestone source 176, is first ground in the grinder 170 (typically a ball mill) and then mixed with (recovered water 167 and fresh/make-up water 162 in a mixer 140 to form limestone slurry 141. The flow of the ground limestone 174 and water 162 via valve (not shown) to the mixer/tank 140 are controlled to maintain a sufficient inventory of fresh limestone slurry 141 in the mixer/tank 140. The flow of fresh limestone slurry 141 to the crystallizer 134 is adjusted to maintain an appropriate pH for the slurry 148, which in turn controls the amount of $SO_2$ removed from the flue gas 114. WFGD processing typically accomplishes 92-97% removal of $SO_2$ from the flue gas, although those skilled in the art will recognize that but utilizing certain techniques and adding organic acids to the slurry the removal of $SO_2$ can increase to greater than 97%.

As discussed above, conventional WFGD subsystems recycle the slurry. Although some waste water and other waste will typically be generated in the production of the gypsum, water is reclaimed to the extent possible and used to make up fresh limestone slurry, thereby minimizing waste and costs, which would be incurred to treat the process water.

It will be recognized that because limestone is readily available in large quantities in most locations, it is commonly used as the reactant in coal gas desulfurization processing. However, other reactants, such as quick lime or a sodium compound, could alternatively be used, in lieu of limestone. These other reactants are typically more expensive and are not currently cost-competitive with the limestone reactant. However, with very slight modifications to the mixer 140 and upstream reactant source, an existing limestone WFGD could be operated using quick lime or a sodium compound. In fact, most WFGD systems include a lime backup subsystem so the WFGD can be operated if there are problems with limestone delivery and/or extended maintenance issues with the grinder 170.

FIG. 2 further details certain aspects of the WFGD subsystem shown in FIG. 1. As shown, the dewatering unit 136 may include both a primary dewatering unit 136A and a secondary dewatering unit 136B. The primary dewatering unit 136A preferably includes hydrocyclones for separating the gypsum and water. The secondary dewatering unit 136B preferably includes a belt dryer for drying the gypsum. As has been previously discussed, the flue gas 114 enters the absorber 132, typically from the side, and flows upward through a limestone slurry mist that is sprayed into the upper portion of the absorber tower. Prior to exiting the absorber, the flue gas is put through a mist eliminator (ME) (not shown) that is located in the top of the absorber 132; the mist eliminator removes entrained liquid and solids from the flue gas stream. To keep the mist eliminator clean of solids, a ME water wash 200 applied to the mist eliminator. As will be understood, the ME wash 200 keeps the ME clean within the absorber tower 132 with water from the fresh water source 164. The ME wash water 200 is the purest water fed to the WFGD subsystem 130.

As noted above, the limestone slurry mist absorbs a large percentage of the $SO_2$ (e.g., 92-97%) from the flue gas that is flowing through the absorber tower 132. After absorbing the $SO_2$, the slurry spray drops to the crystallizer 134. In a practical implementation, the absorber tower 132 and the crystallizer 134 are often housed in a single unitary structure, with the absorber tower located directly above the crystallizer within the structure. In such implementations, the slurry spray simply drops to the bottom of the unitary structure to be crystallized.

The limestone slurry reacts with the $SO_2$ to produce gypsum (calcium sulfate dehydrate) in the crystallizer 134. As previously noted, forced, compressed oxidation air 154 is used to aid in oxidation, which occurs in the following reaction:

$$SO_2+CaCO_3+\tfrac{1}{2}O_2+2H_2O \rightarrow CaSO_4.2H_2O+CO_2 \quad (1)$$

The oxidation air 154 is forced into the crystallizer 134, by blower 150. Oxidation air provides additional oxygen needed for the conversion of the calcium sulfite to calcium sulfate.

The absorber tower 132 is used to accomplish the intimate flue gas/liquid slurry contact necessary to achieve the high removal efficiencies required by environmental specifications. Countercurrent open-spray absorber towers provide particularly desirable characteristics for limestone-gypsum WFGD processing: they are inherently reliable, have lower plugging potential than other tower-based WFGD processing unit components, induce low pressure drop, and are cost-effective from both a capital and an operating cost perspective.

As shown in FIG. 2, the water source 164 typically includes a water tank 164A for storing a sufficient quantity of fresh water. Also typically included there is one or more pumps 164B for pressurizing the ME wash 200 to the absorber tower 132, and one or more pumps 164C for pressurizing the fresh water flow 162 to the mixer 140. The mixer 140 includes a mixing tank 140A and one more slurry pumps 140B to move the fresh limestone slurry 141 to the crystallizer 134. One or more additional very large slurry pumps 133 (see FIG. 1) are required to lift the slurry 148 from the crystallizer 134 to the multiple spray levels in the top of the absorber tower 132.

As will be described further below, typically, the limestone slurry 148 enters the absorber tower 132, via spray nozzles (not shown) disposed at various levels of the absorber tower 132. When at full load, most WFGD subsystems operate with at least one spare slurry pump 133. At reduced loads, it is often possible to achieve the required $SO_2$ removal efficiency with a reduced number of slurry pumps 133. There is significant economic incentive to reduce the pumping load of the slurry pumps 133. These pumps are some of the largest pumps in the world and they are driven by electricity that could otherwise be sold directly to the power grid (parasitic power load).

The gypsum 160 is separated from liquids in the gypsum slurry 146 in the primary dewaterer unit 136A, typically using a hydrocyclone. The overflow of the hydrocyclone, and/or one or more other components of primary dewaterer unit 136A, contains a small amount of solids. As shown in FIG. 2, this overflow slurry 146A is returned to the crystallizer 134. The recovered water 167 is sent back to mixer 140 to make fresh limestone slurry. The other waste 168 is commonly directed from the primary dewaterer unit 136A to an ash pond 210. The underflow slurry 202 is directed to the secondary dewaterer unit 136B, which often takes the form of a belt filter, where it is dried to produce the gypsum byproduct 160. Again, recovered water 167 from the secondary dewaterer unit 136B is returned to the mixer/pump 140. As shown in FIG. 1, hand or other gypsum samples 161 are taken and analyzed, typically every few hours, to determine the purity of the gypsum 160. No direct on-line measurement of gypsum purity is conventionally available.

As shown in FIG. 1, a proportional integral derivative (PID) controller 180 is conventionally utilized in conjunction with a feedforward controller (FF) 190 to control the operation of the WFDG subsystem. Historically, PID controllers directed pneumatic analog control functions. Today, PID controllers direct digital control functions, using mathematically formulations. The goal of FF 190/PID controller 180 is to control the slurry pH, based on an established linkage. For example, there could be an established linkage between the adjustment of valve 199 shown in FIG. 1, and a measured pH value of slurry 148 flowing from the crystallizer 134 to the absorber tower 132. If so, valve 199 is controlled so that the pH of the slurry 148 corresponds to a desired value 186, often referred to as a setpoint (SP).

The FF 190/PID controller 180 will adjust the flow of the limestone slurry 141 through valve 199, based on the pH setpoint, to increase or decrease the pH value of the slurry 148 measured by the pH sensor 182. As will be understood, this is accomplish by the FF/PID controller transmitting respective control signals 181 and 191, which result in a valve adjustment instruction, shown as flow control SP 196, to a flow controller which preferably is part of the valve 199. Responsive to flow control SP 196, the flow controller in turn directs an adjustment of the valve 199 to modify the flow of the limestone slurry 141 from the mixer/pump 140 to the crystallizer 134.

The present example shows pH control using the combination of the FF controller 190 and the PID controller 180. Some installations will not include the FF controller 190.

In the present example, the PID controller 180 generates the PID control signal 181 by processing the measured slurry pH value 183 received from the pH sensor 182, in accordance with a limestone flow control algorithm representing an established linkage between the measured pH value 183 of the slurry 148 flowing from the crystallizer 134 to the absorber tower 132. The algorithm is typically stored at the PID controller 180, although this is not mandatory. The control signal 181 may represent, for example, a valve setpoint (VSP) for the valve 199 or for a measured value setpoint (MVSP) for the flow of the ground limestone slurry 141 exiting the valve 199.

As is well understood in the art, the algorithm used by the PID controller 180 has a proportional element, an integral element, and a derivative element. The PID controller 180 first calculates the difference between the desired SP and the measured value, to determine an error. The PID controller next applies the error to the proportional element of the algorithm, which is an adjustable constant for the PID controller, or for each of the PID controllers if multiple PID controllers are used in the WFGD subsystem. The PID controller typically multiples a tuning factor or process gain by the error to obtain a proportional function for adjustment of the valve 199.

However, if the PID controller 180 does not have the correct value for the tuning factor or process gain, or if the process conditions are changing, the proportional function will be imprecise. Because of this imprecision, the VSP or MVSP generated by the PID controller 180 will actually have an offset from that corresponding to the desired SP. Accordingly, the PID controller 180 applies the accumulated error over time using the integral element. The integral element is a time factor. Here again, the PID controller 180 multiplies a tuning factor or process gain by the accumulated error to eliminate the offset.

Turning now to the derivative element. The derivative element is an acceleration factor, associated with continuing change. In practice, the derivative element is rarely applied in PID controllers used for controlling WFGD processes. This is because application of the derivative element is not particularly beneficial for this type of control application. Thus, most controllers used for in WFGD subsystems are actually PI controllers. However, those skilled in the art will recognize that, if desired, the PID controller 180 could be easily configured with the necessary logic to apply a derivative element in a conventional manner.

In summary, there are three tuning constants, which may be applied by conventional PID controllers to control a process value, such as the pH of the recycle slurry 148 entering the absorber tower 132, to a setpoint, such as the flow of fresh lime stone slurry 141 to the crystallizer 134. Whatever setpoint is utilized, it is always established in terms of the process value, not in terms of a desired result, such as a value of $SO_2$ remaining in the flue gas 116 exhausted from the absorber tower 132. Stated another way, the setpoint is identified in process terms, and it is necessary that the controlled process value be directly measurable in order for the PID controller to be able to control it. While the exact form of the algorithm may change from one equipment vendor to another, the basic PID control algorithm has been in use in the process industries for well over 75 years.

Referring again to FIGS. 1 and 2, based on the received instruction from the PID controller 180 and the FF controller 190, the flow controller generates a signal, which causes the valve 199 to open or close, thereby increasing or decreasing the flow of the ground limestone slurry 141. The flow controller continues control of the valve adjustment until the valve 199 has been opened or closed to match the VSP or the measured value of the amount of limestone slurry 141 flowing to from the valve 1992 matches the MVSP.

In the exemplary conventional WFGD control described above, the pH of the slurry 148 is controlled based on a desired pH setpoint 186. To perform the control, the PID 180 receives a process value, i.e. the measured value of the pH 183 of the slurry 148, from the sensor 182. The PID controller 180 processes the process value to generate instructions 181 to the valve 199 to adjust the flow of fresh limestone slurry 141, which has a higher pH than the crystallizer slurry 144, from the mixer/tank 140, and thereby adjust the pH of the slurry 148. If the instructions 181 result in a further opening of the valve 199, more limestone slurry 141 will flow from the mixer 140 and into the crystallizer 134, resulting in an increase in the pH of the slurry 148. On the other hand, if the instructions 181 result in a closing of the valve 199, less limestone slurry 141 will flow from the mixer 140 and therefore into the crystallizer 134, resulting in a decrease in the pH of the slurry 148.

Additionally, the WFGD subsystem may incorporate a feed forward loop, which is implemented using a feed forward unit 190 in order to ensure stable operation. As shown in FIG. 1, the concentration value of $SO_2$ 189 in the flue gas 114 entering the absorber tower 132 is measured by sensor 188 and input to the feed forward unit 190. Many WFGD systems that include the FF control element may combine the incoming flue gas $SO_2$ concentration 189 with a measure of generator load from the Power Generation System 110, to determine the quantity of inlet $SO_2$ rather than just the concentration and, then use this quantity of inlet $SO_2$ as the input to FF 190. The feed forward unit 190 serves as a proportional element with a time delay.

In the exemplary implementation under discussion, the feed forward unit 190 receives a sequence of $SO_2$ measurements 189 from the sensor 188. The feed forward unit 190 compares the currently received concentration value with the concentration value received immediately preceding the currently received value. If the feed forward unit 190 determines that a change in the measured concentrations of $SO_2$ has occurred, for example from 1000-1200 parts per million, it is configured with the logic to smooth the step function, thereby avoiding an abrupt change in operations.

The feed forward loop dramatically improves the stability of normal operations because the relationship between the pH value of the slurry 148 and the amount of limestone slurry 141 flowing to the crystallizer 134 is highly nonlinear, and the PID controller 180 is effectively a linear controller. Thus, without the feed forward loop, it is very difficult for the PID 180 to provide adequate control over a wide range of pH with the same tuning constants.

By controlling the pH of the slurry 148, the PID controller 180 effects both the removal of $SO_2$ from the $SO_2$ laden flue gas 114 and the quality of the gypsum byproduct 160 produced by the WFGD subsystem. Increasing the slurry pH by increasing the flow of fresh limestone slurry 141 increases the amount of $SO_2$ removed from the $SO_2$ laden flue gas 114. On the other hand, increasing the flow of limestone slurry 141, and thus the pH of the slurry 148, slows the $SO_2$ oxidation after absorption, and thus the transformation of the calcium sulfite to sulfate, which in turn will result in a lower quality of gypsum 160 being produced.

Thus, there are conflicting control objectives of removing $SO_2$ from the $SO_2$ laden flue gas 114, and maintaining the required quality of the gypsum byproduct 160. That is, there may be a conflict between meeting the $SO_2$ emission requirements and the gypsum quality requirements.

FIG. 3 details further aspects of the WFGD subsystem described with reference to FIGS. 1 and 2. As shown, $SO_2$ laden flue gas 114 enters into a bottom portion of the absorber tower 132 via an aperture 310, and $SO_2$ free flue gas 116 exits from an upper portion of the absorber tower 132 via an aperture 312. In this exemplary conventional implementation, a counter current absorber tower is shown, with multiple slurry spray levels. As shown, the ME wash 200 enters the absorber tower 132 and is dispersed by wash sprayers (not shown).

Also shown are multiple absorber tower slurry nozzles 306A, 306B and 306C, each having a slurry sprayer 308A, 308B or 308C, which sprays slurry into the flue gas to absorb the $SO_2$. The slurry 148 is pumped from the crystallizer 134 shown in FIG. 1, by multiple pumps 133A, 133B and 133C, each of which pumps the slurry up to a different one of the levels of slurry nozzles 306A, 306B or 306C. It should be understood that although 3 different levels of slurry nozzles and sprayers are shown, the number of nozzles and sprayers would vary depending on the particular implementation.

A ratio of the flow rate of the liquid slurry 148 entering the absorber 132 over the flow rate of the flue gas 116 leaving the absorber 132 is commonly characterized as the L/G. L/G is one of the key design parameters in WFGD subsystems.

The flow rate of the flue gas 116 (saturated with vapor), designated as G, is a function of inlet flue gas 112 from the power generation system 110 upstream of the WFGD processing unit 130. Thus, G is not, and cannot be, controlled, but must be addressed, in the WFGD processing. So, to impact L/G, the "L" must be adjusted. Adjusting the number of slurry pumps in operation and the "line-up" of these slurry pumps controls the flow rate of the liquid slurry 148 to the WFGD absorber tower 132, designated as L. For example, if only two pumps will be run, running the pumps to the upper two sprayer levels vs. the pumps to top and bottom sprayer levels will create different "L"s.

It is possible to adjust "L" by controlling the operation of the slurry pumps 133A, 133B and 133C. Individual pumps may be turned on or off to adjust the flow rate of the liquid slurry 148 to the absorber tower 132 and the effective height at which the liquid slurry 148 is introduced to the absorber tower. The higher the slurry is introduced into the tower, the more contact time it has with the flue gas resulting in more $SO_2$ removal, but this additional $SO_2$ removal comes at the penalty of increased power consumption to pump the slurry to the higher spray level. It will be recognized that the greater the number of pumps, the greater the granularity of such control.

Pumps 133A-133C, which are extremely large pieces of rotating equipment, can be started and stopped automatically or manually. Most often, in the USA, these pumps are controlled manually by the subsystem operator. It is more common to automate starting/stopping rotating equipment, such as pumps 133A-133C in Europe.

If the flow rate of the flue gas 114 entering the WFGD processing unit 130 is modified due to a change in the operation of the power generation system 110, the WFGD subsystem operator may adjust the operation of one or more of the pumps 133A-133C. For example, if the flue gas flow rate were to fall to 50% of the design load, the operator, or special logic in the control system, might shut down one or more of the pumps that pump slurry to the spray level nozzles at one or more spray level.

Although not shown in FIG. 3, it will be recognized that extra spray levels, with associated pumps and slurry nozzles, are often provided for use during maintenance of another pump, or other slurry nozzles and/or slurry sprayers associated with the primary spray levels. The addition of this extra spray level adds to the capital costs of the absorber tower and hence the subsystem. Accordingly, some WFGD owners will decide to eliminate the extra spray level and to avoid this added capital costs, and instead add organic acids to the slurry to enhance its ability to absorb and therefore remove $SO_2$ from the flue gas during such maintenance periods. However, these additives tend to be expensive and therefore their use will result in increased operational costs, which may, over time, offset the savings in capital costs.

As indicated in Equation 1 above, to absorb $SO_2$, a chemical reaction must occur between the $SO_2$ in the flue gas and the limestone in the slurry. The result of the chemical reaction in the absorber is the formation of calcium sulfite. In the crystallizer 134, the calcium sulfite is oxidized to form calcium sulfate (gypsum). During this chemical reaction, oxygen is consumed. To provide sufficient oxygen and enhance the speed of the reaction, additional $O_2$ is added by blowing compressed air 154 into the liquid slurry in the crystallizer 134.

More particularly, as shown in FIG. 1 ambient air 152 is compressed to form compressed air 154, and forced into the crystallizer 134 by a blower, e.g. fan, 150 in order to oxidize the calcium sulfite in the recycle slurry 148 which is returned from the crystallizer 134 to the absorber 132 and the gypsum slurry 146 sent to the dewatering system 136 for further processing. To facilitate adjustment of the flow of oxidation air 154, the blower 150 may have a speed or load control mechanism.

Preferably, the slurry in the crystallizer 134 has excess oxygen. However, there is an upper limit to the amount of oxygen that can be absorbed or held by slurry. If the $O_2$ level within the slurry becomes too low, the chemical oxidation of $CaSO_3$ to $CaSO_4$ in the slurry will cease. When this occurs, it is commonly referred to as limestone blinding. Once limestone blinding occurs, limestone stops dissolving into the slurry solution and $SO_2$ removal can be dramatically reduced. The presence of trace amounts of some minerals can also dramatically slow the oxidation of calcium sulfite and/or limestone dissolution to create limestone blinding.

Because the amount of $O_2$ that is dissolved in the slurry is not a measurable parameter, slurry can become starved for $O_2$ in conventional WFGD subsystems if proper precautions are not taken. This is especially true during the summer months when the higher ambient air temperature lowers the density of the ambient air 152 and reduces the amount of oxidation air 154 that can be forced into the crystallizer 134 by the blower 150 at maximum speed or load. Additionally, if the amount of $SO_2$ removed from the flue gas flow increases significantly, a corresponding amount of additional $O_2$ is required to oxidize the $SO_2$. Thus, the slurry can effectively become starved for $O_2$ because of an increase in the flow of $SO_2$ to the WFGD processing unit.

It is necessary to inject compressed air 154 that is sufficient, within design ratios, to oxidize the absorbed $SO_2$. If it is possible to adjust blower 150 speed or load, and turning down the blower 150 at lower $SO_2$ loads and/or during cooler ambient air temperature periods is desirable because it saves energy. When the blower 150 reaches maximum load, or all the $O_2$ of a non-adjustable blower 150 is being utilized, it is not possible to oxidize an incremental increase in $SO_2$. At peak load, or without a blower 150 speed control that accurately tracks $SO_2$ removal, it is possible to create an $O_2$ shortage in the crystallizer 134.

However, because it is not possible to measure the $O_2$ in the slurry, the level of $O_2$ in the slurry is not used as a constraint on conventional WFGD subsystem operations. Thus, there is no way of accurately monitoring when the slurry within the crystallizer 134 is becoming starved for $O_2$. Accordingly, operators, at best, will assume that the slurry is becoming starved for $O_2$ if there is a noticeable decrease in the quality of the gypsum by-product 160, and use their best judgment to control the speed or load of blower 150 and/or decrease $SO_2$ absorption efficiency to balance the $O_2$ being forced into the slurry, with the absorbed $SO_2$ that must be oxidized. Hence, in conventional WFGD subsystems balancing of the $O_2$ being forced into the slurry with the $SO_2$ required to be absorbed from the flue gas is based, at best, on operator judgment.

In summary, conventional control of large WFGD subsystems for utility application is normally carried out within a distributed control system (DCS) and generally consists of on-off control logic as well as FF/PID feedback control loops. The parameters controlled are limited to the slurry pH level, the L/G ratio and the flow of forced oxidation air.

The pH must be kept within a certain range to ensure high solubility of $SO_2$ (i.e. $SO_2$ removal efficiency) high quality (purity) gypsum, and prevention of scale buildup. The operating pH range is a function of equipment and operating conditions. The pH is controlled by adjusting the flow of fresh limestone slurry 141 to the crystallizer 134. The limestone slurry flow adjustment is based on the measured pH of the slurry detected by a sensor. In a typically implementation, a PID controller and, optionally, FF controller included in the DCS are cascaded to a limestone slurry flow controller. The standard/default PID algorithm is used for pH control application.

The liquid-to-gas ratio (L/G) is the ratio of the liquid slurry 148 flowing to the absorber tower 132 to the flue gas flow 114. For a given set of subsystem variables, a minimum L/G ratio is required to achieve the desired $SO_2$ absorption, based on the solubility of $SO_2$ in the liquid slurry 148. The L/G ratio changes either when the flue gas 114 flow changes, or when the liquid slurry 148 flow changes, which typically occurs when slurry pumps 133 are turned on or off.

The oxidation of calcium sulfite to form calcium sulfate, i.e. gypsum, is enhanced by forced oxidation, with additional oxygen in the reaction tank of the crystallizer 134. Additional oxygen is introduced by blowing air into the slurry solution in the crystallizer 134. With insufficient oxidation, sulfite—limestone blinding can occur resulting in poor gypsum quality, and potentially subsequent lower $SO_2$ removal efficiency, and a high chemical oxygen demand (COD) in the waste water.

The conventional WFGD process control scheme is comprised of standard control blocks with independent rather than integrated objectives. Currently, the operator, in consultation with the engineering staff, must try to provide overall optimal control of the process. To provide such control, the operator must take the various goals and constraints into account.

Minimized WFGD Operation Costs—Power plants are operated for no other reason than to generate profits for their owners. Thus, it is beneficial to operate the WFGD subsystem at the lowest appropriate cost, while respecting the process, regulatory and byproduct quality constraints and the business environment.

Maximize $SO_2$ Removal Efficiency—Clean air regulations establish $SO_2$ removal requirements. WFGD subsystems should be operated to remove $SO_2$ as efficiently as appropriate, in view of the process, regulatory and byproduct quality constraints and the business environment.

Meet Gypsum Quality Specification—The sale of gypsum as a byproduct mitigates WFGD operating costs and depends heavily on the byproduct purity meeting a desired specification. WFGD subsystems should be operated to produce a gypsum byproduct of an appropriate quality, in view of the process, regulatory and byproduct quality constraints and the business environment.

Prevent Limestone Blinding—Load fluctuations and variations in fuel sulfur content can cause excursions in $SO_2$ in the flue gas 114. Without proper compensating adjustments, this can lead to high sulfite concentrations in the slurry, which in turn results in limestone blinding, lower absorber tower 132 $SO_2$ removal efficiency, poor gypsum quality, and a high chemical oxygen demand (COD) in the wastewater. WFGD subsystems should be operated to prevent limestone binding, in view of the process constraints.

In a typical operational sequence, the WFGD subsystem operator determines setpoints for the WFGD process to balance these competing goals and constraints, based upon conventional operating procedures and knowledge of the WFGD process. The setpoints commonly include pH, and the operational state of the slurry pumps 133 and oxidation air blower 150.

There are complex interactions and dynamics in the WFGD process; as a result, the operator selects conservative operating parameters so that the WFGD subsystem is able to meet/exceed hard constraints on $SO_2$ removal and gypsum purity. In making these conservative selections, the operator often, if not always, sacrifices minimum-cost operation.

For example, FIG. 4 shows $SO_2$ removal efficiency and gypsum purity as a function of pH. As pH is increased, the $SO_2$ removal efficiency increases, however, the gypsum purity decreases. Since the operator is interested in improving both $SO_2$ removal efficiency and gypsum purity, the operator must determine a setpoint for the pH that is a compromise between these competing goals.

In addition, in most cases, the operator is required to meet a guaranteed gypsum purity level, such as 95% purity. Because of the complexity of the relationships shown in FIG. 4, the lack of direct on-line measurement of gypsum purity, the long time dynamics of gypsum crystallization, and random variations in operations, the operator often chooses to enter a setpoint for pH that will guarantee that the gypsum purity level is higher than the specified constraint under any circumstances. However, by guaranteeing the gypsum purity, the operator often sacrifices the $SO_2$ removal efficiency. For instance, based upon the graph in FIG. 4, the operator may select a pH of 5.4 to guarantee of 1% cushion above the gypsum purity constraint of 95%. However, by selecting this setpoint for pH, the operator sacrifices 3% of the $SO_2$ removal efficiency.

The operator faces similar compromises when $SO_2$ load, i.e. the flue gas 114 flow, drops from full to medium. At some point during this transition, it may be beneficial to shut off one or more slurry pumps 133 to save energy, since continued operation of the pump may provide only slightly better $SO_2$ removal efficiency. However, because the relationship between the power costs and $SO_2$ removal efficiency is not well understood by most operators, operators will typically take a conservative approach. Using such an approach, the operators might not adjust the slurry pump 133 line-up, even though it would be more beneficial to turn one or more of the slurry pumps 133 off.

It is also well known that many regulatory emission permits provide for both instantaneous emission limits and some form of rolling-average emission limits. The rolling-average emission limit is an average of the instantaneous emissions value over some moving, or rolling, time-window. The time-window may be as short as 1-hour or as long as 1-year. Some typical time-windows are 1-hour, 3-hours, 8-hours, 24-hours, 1-month, and 1-year. To allow for dynamic process excursions, the instantaneous emission limit is typically higher than rolling average limit. However, continuous operation at the instantaneous emission limit will result in a violation of the rolling-average limit.

Conventionally, the PID 180 controls emissions to the instantaneous limit, which is relatively simple. To do this, the operating constraint for the process, i.e. the instantaneous value, is set well within the actual regulatory emission limit, thereby providing a safety margin.

On the other hand, controlling emissions to the rolling-average limit is more complex. The time-window for the rolling-average is continually moving forward. Therefore, at any given time, several time-windows are active, spanning one time window from the given time back over a period of time, and another time window spanning from the given time forward over a period of time.

Conventionally, the operator attempts to control emissions to the rolling-average limit, by either simply maintaining a sufficient margin between the operating constraint set in the PID 180 for the instantaneous limit and the actual regulatory emission limit, or by using operator judgment to set the operating constraint in view of the rolling-average limit. In either case, there is no explicit control of the rolling-average emissions, and therefore no way to ensure compliance with the rolling-average limit or prevent costly over-compliance.

Selective Catalytic Reduction System:

Briefly turning to another exemplary air pollution control process, the selective catalytic reduction (SCR) system for $NO_x$ removal, similar operating challenges can be identified. An overview of the SCR process is shown in FIG. 20.

The following process overview is from "Control of Nitrogen Oxide Emissions: Selective Catalytic Reduction (SCR)", Topical Report Number 9, Clean Coal Technology, U.S Dept. of Energy, 1997:

Process Overview $NO_x$, which consists primarily of NO with lesser amounts of $NO_2$, is converted to nitrogen by reaction with $NH_3$ over a catalyst in the presence of oxygen. A small fraction of the $SO_2$, produced in the boiler by oxidation of sulfur in the coal, is oxidized to sulfur trioxide ($SO_3$) over the SCR catalyst. In addition, side reactions may produce undesirable by-products: ammonium sulfate, $(NH_4)_2SO_4$, and ammonium bisulfate, $NH_4HSO_4$. There are complex relationships governing the formation of these by-products, but they can be minimized by appropriate control of process conditions.

Ammonia Slip

Unreacted $NH_3$ in the flue gas downstream of the SCR reactor is referred to as $NH_3$ slip. It is essential to hold $NH_3$ slip to below 5 ppm, preferably 2-3 ppm, to minimize formation of $(NH_4)_2SO_4$ and $NH_4HSO_4$, which can cause plugging and corrosion of downstream equipment. This is a greater problem with high-sulfur coals, caused by higher $SO_3$ levels resulting from both higher initial $SO_3$ levels due to fuel sulfur content and oxidation of $SO_2$ in the SCR reactor.

Operating Temperature

Catalyst cost constitutes 15-20% of the capital cost of an SCR unit; therefore it is essential to operate at as high a temperature as possible to maximize space velocity and thus minimize catalyst volume. At the same time, it is necessary to minimize the rate of oxidation of $SO_2$ to $SO_3$, which is more temperature sensitive than the SCR reaction. The optimum operating temperature for the SCR process using titanium and vanadium oxide catalysts is about 650-750° F. Most installations use an economizer bypass to provide flue gas to the reactors at the desired temperature during periods when flue gas temperatures are low, such as low load operation.

Catalysts

SCR catalysts are made of a ceramic material that is a mixture of carrier (titanium oxide) and active components (oxides of vanadium and, in some cases, tungsten). The two leading shapes of SCR catalyst used today are honeycomb and plate. The honeycomb form usually is an extruded ceramic with the catalyst either incorporated throughout the structure (homogeneous) or coated on the substrate. In the plate geometry, the support material is generally coated with catalyst. When processing flue gas containing dust, the reactors are typically vertical, with downflow of flue gas. The catalyst is typically arranged in a series of two to four beds, or layers. For better catalyst utilization, it is common to use three or four layers, with provisions for an additional layer, which is not initially installed.

As the catalyst activity declines, additional catalyst is installed in the available spaces in the reactor. As deactivation continues, the catalyst is replaced on a rotating basis, one layer at a time, starting with the top. This strategy results in maximum catalyst utilization. The catalyst is subjected to periodic soot blowing to remove deposits, using steam as the cleaning agent.

Chemistry:

The chemistry of the SCR process is given by the following:

$$4NO + 4NH_3 + O_2 \rightarrow 4N_2 + 6H_2O$$

$$2NO_2 + 4NH_3 + O_2 \rightarrow 3N_2 + 6H_2O$$

The side reactions are given by:

$$SO_2 + \tfrac{1}{2}O_2 \rightarrow SO_3$$

$$2NH_3 + SO_3 + H_2O \rightarrow (NH_4)2SO_4$$

$$NH_3 + SO_3 + H_2O \rightarrow NH_4HSO_4$$

Process Description

As shown in FIG. 20, dirty flue gas 112 leaves the power generation system 110. This flue gas may be treated by other air pollution control (APC) subsystems 122 prior to entering the selective catalytic reduction (SCR) subsystem 2170. The flue gas may also be treated by other APC subsystems (not shown) after leaving the SCR and prior to exiting the stack 117. $NO_x$ in the inlet flue gas is measured with one or more analyzers 2003. The flue gas with $NO_x$ 2008 is passed through the ammonia (NH3) injection grid 2050. Ammonia 2061 is mixed with dilution air 2081 by an ammonia/dilution air mixer 2070. The mixture 2071 is dosed into the flue gas by the injection grid 2050. A dilution air blower 2080 supplies ambient air 152 to the mixer 2070, and an ammonia storage and supply subsystem 2060 supplies the ammonia to the mixer 2070. The $NO_x$ laden flue gas, ammonia and dilution air 2055 pass into the SCR reactor 2002 and over the SCR catalyst. The SCR catalyst promotes the reduction of $NO_x$ with ammonia to nitrogen and water. $NO_x$ "free" flue gas 2008 leaves the SCR reactor 2002 and exits the plant via potentially other APC subsystems (not shown) and the stack 117.

There are additional $NO_x$ analyzers 2004 on the $NO_x$ "free" flue gas stream 2008 exiting the SCR reactor 2002 or in the stack 117. The measured $NO_x$ outlet value 2111 is combined with the measured $NO_x$ inlet value 2112 to calculate a $NO_x$ removal efficiency 2110. $NO_x$ removal efficiency is defined as the percentage of inlet $NO_x$ removed from the flue gas.

The calculated $NO_x$ removal efficiency 2022 is input to the regulatory control system that resets the ammonia flow rate setpoint 2021A to the ammonia/dilution air mixer 2070 and ultimately, the ammonia injection grid 2050.

SCR Process Controls

A conventional SCR control system relies on the cascaded control system shown in FIG. 20. The inner PID controller loop 2010 is used for controlling the ammonia flow 2014 into the mixer 2070. The outer PID controller loop 2020 is used for controlling NOx emissions. The operator is responsible for entering the NOx emission removal efficiency target 2031 into the outer loop 2020. As shown in FIG. 21, a selector 2030 may be used to place an upper constraint 2032 on the target 2031 entered by the operator. In addition, a feedforward signal 2221 for load (not shown in FIG. 21) is often used so that the controller can adequately handle load transitions. For such implementations, a load sensor 2009 produces a measured load 2809 of the power generation system 110. This measured load 2809 is sent to a controller 2220 which produces the signal 2221. Signal 2221 is combined with the ammonia flow setpoint 2021A to form an adjusted ammonia flow setpoint 2021B, which is sent to PID controller 2010. PID 2010 combines setpoint 2021B with a measured ammonia flow 2012 to form an ammonia flow VP 2011 which controls the amount of ammonia supplied to mixer 2070.

The advantages of this controller are that:
1. Standard Controller: It is a simple standard controller design that is used to enforce requirements specified by the SCR manufacturer and catalyst vendor.
2. DCS-Based Controller: The structure is relatively simple, it can be implemented in the unit's DCS and it is the least-expensive control option that will enforce equipment and catalyst operating requirements.

SCR Operating Challenges:

A number of operating parameters affect SCR operation:
Inlet $NO_x$ load,
Local molar ratio of NOx:ammonia,
Flue gas temperature, and
Catalyst quality, availability, and activity.

The operational challenges associated with the control scheme of FIG. 20 include the following:
1. Ammonia Slip Measurement: Maintaining ammonia slip below a specified constraint is critical to operation of the SCR. However, there is often no calculation or on-line measurement of ammonia slip. Even if an ammonia slip measurement is available, it is often not included directly in the control loop. Thus, one of the most critical variables for operation of an SCR is not measured.

The operating objective for the SCR is to attain the desired level of $NO_x$ removal with minimal ammonia "slip". Ammonia "slip" is defined as the amount of unreacted ammonia in the $NO_x$ "free" flue gas stream. While there is little economic cost associated with the actual quantity of ammonia in the ammonia slip, there are significant negative impacts of ammonia slip:

Ammonia can react with $SO_3$ in the flue gas to form a salt, which deposited on the heat-transfer surfaces of the air preheater. Not only does this salt reduce the heat-transfer across the air preheater it also attracts ash that further reduces the heat-transfer. At a certain point, the heat-transfer of the air preheater has been reduced to the point where the preheater must be removed from service for cleaning (washing). At a minimum, air preheater washing creates a unit de-rate event.

Ammonia is also absorbed in the catalyst (the catalyst can be considered an ammonia sponge). Abrupt decreases in the flue gas/$NO_x$ load can result in abnormally high short-term ammonia slip. This is just a transient condition—outside the scope of the typical control system. While transient in nature, this slipped ammonia still combines with SO3 and the salt deposited on the air preheater—even though short-lived, the dynamic transient can significantly build the salt layer on the air preheater (and promote attraction of fly ash).

Ammonia is also defined as an air pollutant. While ammonia slip is very low, ammonia is very aromatic, so even relatively trace amounts can create an odor problem with the local community.

Ammonia is absorbed onto the fly ash. If the ammonia concentration of the fly ash becomes too great there can be a significant expensive associated with disposal of the fly ash.

2. NOx Removal Efficiency Setpoint: Without an ammonia slip measurement, the NOx removal efficiency setpoint 2031 is often conservatively set by the operator/engineering staff to maintain the ammonia slip well below the slip constraint. By conservatively selecting a setpoint for NOx, the operator/engineer reduces the overall removal efficiency of the SCR. The conservative setpoint for NOx removal efficiency may guarantee that an ammonia slip constraint is not violated but it also results in an efficiency that is lower than would be possible if the system were operated near the ammonia slip constraint.

3. Temperature Effects on the SCR: With the standard control system, no attempt is evident to control SCR inlet gas temperature. Normally some method of ensuring gas temperature is within acceptable limits is implemented, usually preventing ammonia injection if the temperature is below a minimum limit. No attempt to actually control or optimize temperature is made in most cases. Furthermore, no changes to the NOx setpoint are made based upon temperature nor based upon temperature profile.

4. NOx and Velocity Profile: Boiler operations and ductwork contribute to create non-uniform distribution of NOx across the face of the SCR. For minimal ammonia slip, the NOx:ammonia ratio must be controlled and without uniform mixing, this control must be local to avoid spots of high ammonia slip. Unfortunately, the NOx distribution profile is a function of not just the ductwork, but also boiler operation. So, changes in boiler operation impact the NOx distribution. Standard controllers do not account for the fact that the $NO_x$ inlet and velocity profiles to the SCR are seldom uniform or static. This results in over injection of reagent in some portions of the duct cross section in order to ensure adequate reagent in other areas. The result is increased ammonia slip for a given $NO_x$ removal efficiency. Again, the operator/engineer staff often responds to mal-distribution by lowering the NOx setpoint. It should be understood that the NOx inlet and outlet analyzers 2003 and 2004 may be a single analyzer or some form of an analysis array. In addition to the average NOx concentration, a plurality of analysis values would provide information about the NOx distribution/profile. To take advantage of the additional NOx distribution information, it would require a plurality of ammonia flow controllers 2010 with some intelligence to dynamically distribute the total ammonia flow among different regions of the injection grid so that the ammonia flow more closely matches the local NOx concentration.

5. Dynamic Control: The standard controller also fails to provide effective dynamic control. That is, when the inlet conditions to the SCR are changing thus requiring modulation of the ammonia injection rate, it is unlikely that the feedback control of $NO_x$ reduction efficiency will be able to prevent significant excursions in this process variable. Rapid load transients and process time delays are dynamic events, which can cause significant process excursions.

6. Catalyst Decay: The catalyst decays over time reducing the removal efficiency of the SCR and increasing the ammonia slip. The control system needs to take this degradation into account in order to maximize NOx removal rate.

7. Rolling Average Emissions: Many regulatory emission permits provide for both instantaneous and some form of rolling-average emission limits. To allow for dynamic process excursions, the instantaneous emission limit is higher than rolling average limit; continuous operation at the instantaneous emission limit would result in violation of the rolling-average limit. The rolling-average emission limit is an average of the instantaneous emissions value over some moving, or rolling, time-window. The time-window may be as short at 1-hour or as long a 1-year. Some typical time-windows are 1-hour, 3-hours, 24-hours, 1-month, and 1-year. Automatic control of the rolling averages is not considered in the standard controller. Most NOx emission permits are tied back to the regional 8-hour rolling average ambient air NOx concentration limits.

Operators typically set a desired NOx removal efficiency setpoint 2031 for the SCR and make minor adjustments based on infrequent sample information from the fly ash. There is little effort applied to improving dynamic control of the SCR during load transients or to optimizing operation of the SCR. Selecting the optimal instantaneous, and if possible, rolling-average NOx removal efficiency is also an elusive and changing problem due to business, regulatory/credit, and process issues that are similar to those associated with optimal operation of the WFGD.

Other APC processes exhibit problems associated with:
Controlling/optimizing dynamic operation of the process,
Control of byproduct/co-product quality,
Control of rolling-average emissions, and
Optimization of the APC asset.

These problems in other processes are similar to that detailed in the above discussions of the WFGD and the SCR.

BRIEF SUMMARY OF THE INVENTION

In accordance with the invention, a controller directs the operation of an air pollution control system performing a process to control emissions of a pollutant. The air pollution control system could be a wet flue gas desulfurization (WFGD) system, a selective catalytic reduction (SCR) system or another type of air pollution control system. The process has multiple process parameters (MPPs), one or more of which are controllable process parameters (CTPPs), and one of which is an amount of the pollutant (AOP) emitted by the system. A defined AOP value (AOPV) represents an objective or limit on an actual value (AV) of the emitted AOP.

The controller includes a neural network process model or a non-neural network process model. In either case, the model will represent a relationship between each of at least one CTPP and the emitted AOP. The model may, if desired, included a first principle model, a hybrid model, or a regression model. The controller also includes a control processor, which could be or form part of a personal computer (PC) or another type computing device, and may sometimes be referred to as a multivariable process controller. The control processor is configured with the logic, e.g. software programming or another type of programmed logic, to predict, based on the one model, how changes to a current value of each of at least one of the CTPPs will affect a future AV of emitted AOP. The processor then selects one of the changes in one CTPP based on the predicted affect of that change and on the AOPV, and directs control of the one CTPP in accordance with the selected change for that CTPP. If the model is a non-neural network process model, the control processor may also have the logic to derive the model based on empirical data representing prior AVs of the MPPs.

Preferably, the controller includes a data storage medium, which could be electrical, optical or of some other type, configured to store historical data corresponding to prior AVs of the emitted AOP. If so, the control processor may select the one change in the one CTPP based also on the stored historical data.

Advantageously, the control processor has the logic to predict, based on the model, how the changes to the current value of each of the at least one CTPP will also affect a future value of a non-process parameter, such as parameter associated with the operation of the system to perform the process, e.g. the amount of power or the cost of a reactant used by the process. In such a case, it may be desirable for the control processor to select the one change in the one CTPP based also on a non-process parameter.

For example, the system might be a wet flue gas desulfurization (WFGD) system that receives $SO_2$ laden wet flue gas, applies limestone slurry to remove $SO_2$ from the received $SO_2$ laden wet flue gas and thereby control emissions of $SO_2$, and exhausts desulfurized flue gas. If so, the AOP is likely to be the amount of $SO_2$ in the exhausted desulfurized flue gas, and the at least one CTPP may include one or more of a parameter corresponding to a pH of the limestone slurry applied and a parameter corresponding to a distribution of the limestone slurry applied.

In some case, the WFGD system will also apply oxidation air to crystallize the $SO_2$ removed from the received $SO_2$ laden wet flue gas and thereby produce gypsum as a by-product of the removal of the $SO_2$ from the received $SO_2$ laden wet flue gas. In such a case, the at least one CTPP may include one or more of the parameter corresponding to the pH of the limestone slurry applied, the parameter corresponding to the distribution of the limestone slurry applied, and a parameter corresponding to an amount of the oxidation air applied. The control processor can predict, based on the one model, how changes to the current value of each CTPP will affect a future quality of the produced gypsum by-product. The control processor beneficially will also select the one change in the one CTPP based also on a quality constraint on the produced gypsum by-product.

On the other hand, the system could be a selective catalytic reduction (SCR) system that receives $NO_x$ laden flue gas, applies ammonia and dilution air to remove $NO_x$ from the received $NO_x$ laden flue gas and thereby control emissions of $NO_x$, and exhausts reduced $NO_x$ flue gas. If so, the AOP will often be the amount of $NO_x$ in the exhausted flue gas, and the CTPP to be controlled may be a parameter corresponding to an amount of the ammonia applied. In such a case, the control processor can predict, based on the model, how changes to the current value of that CTPP will affect a future amount of $NO_x$ $NO_x$ in the exhausted flue gas, and select the one change based on a constraint on the amount of $NO_x$ in the exhausted flue gas.

BRIEF DESCRIPTION OF THE DRAWINGS

FIG. 14B depicts another DCS screen for entering lab and/or other values, in accordance with the present invention.

DETAILED DESCRIPTION OF PREFERRED EMBODIMENT(S) OF THE INVENTION

Figure 1:
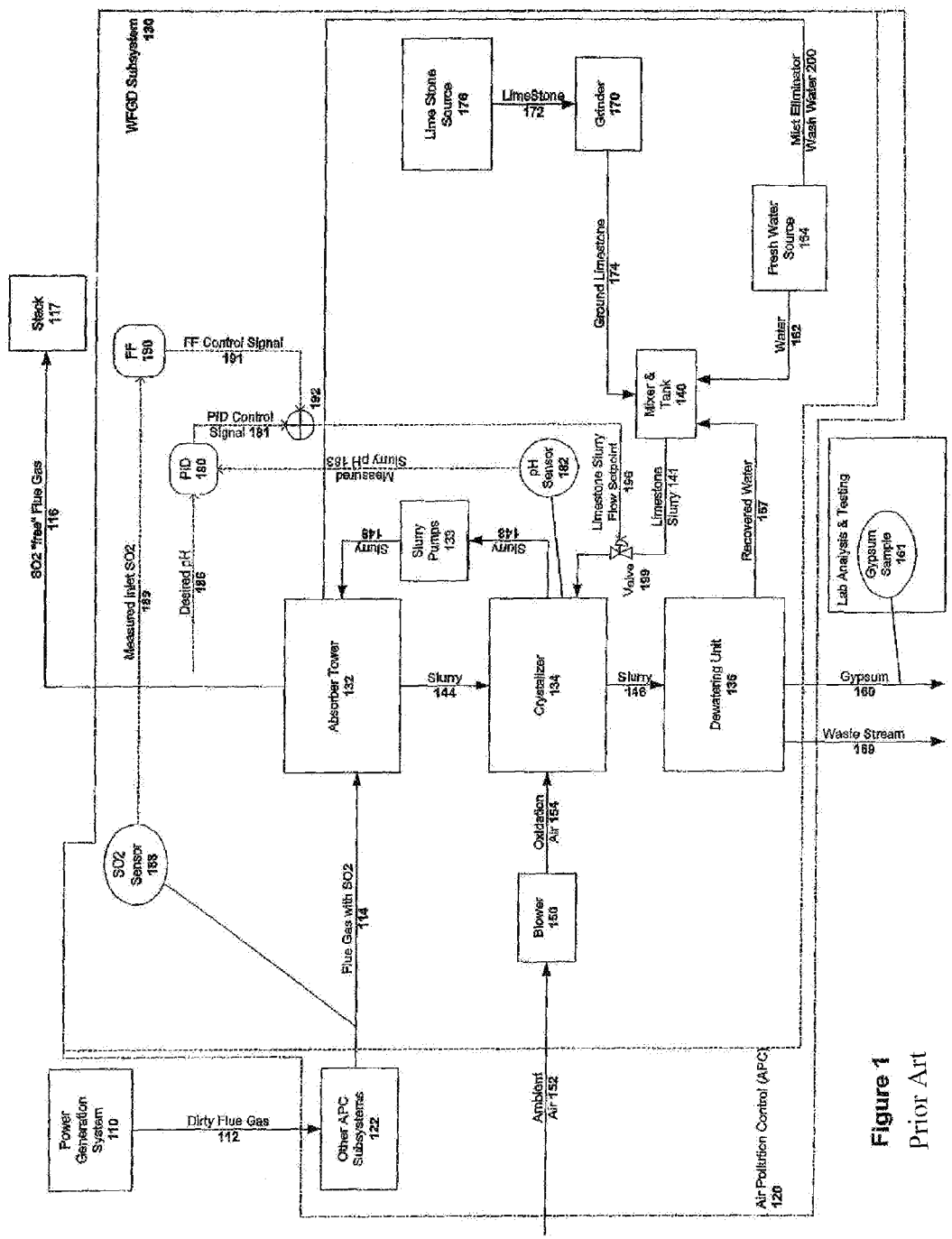
FIG. 1 is a block diagram depicting an overview of a conventional wet flue gas desulfurization (WFGD) subsystem.
Figure 2:
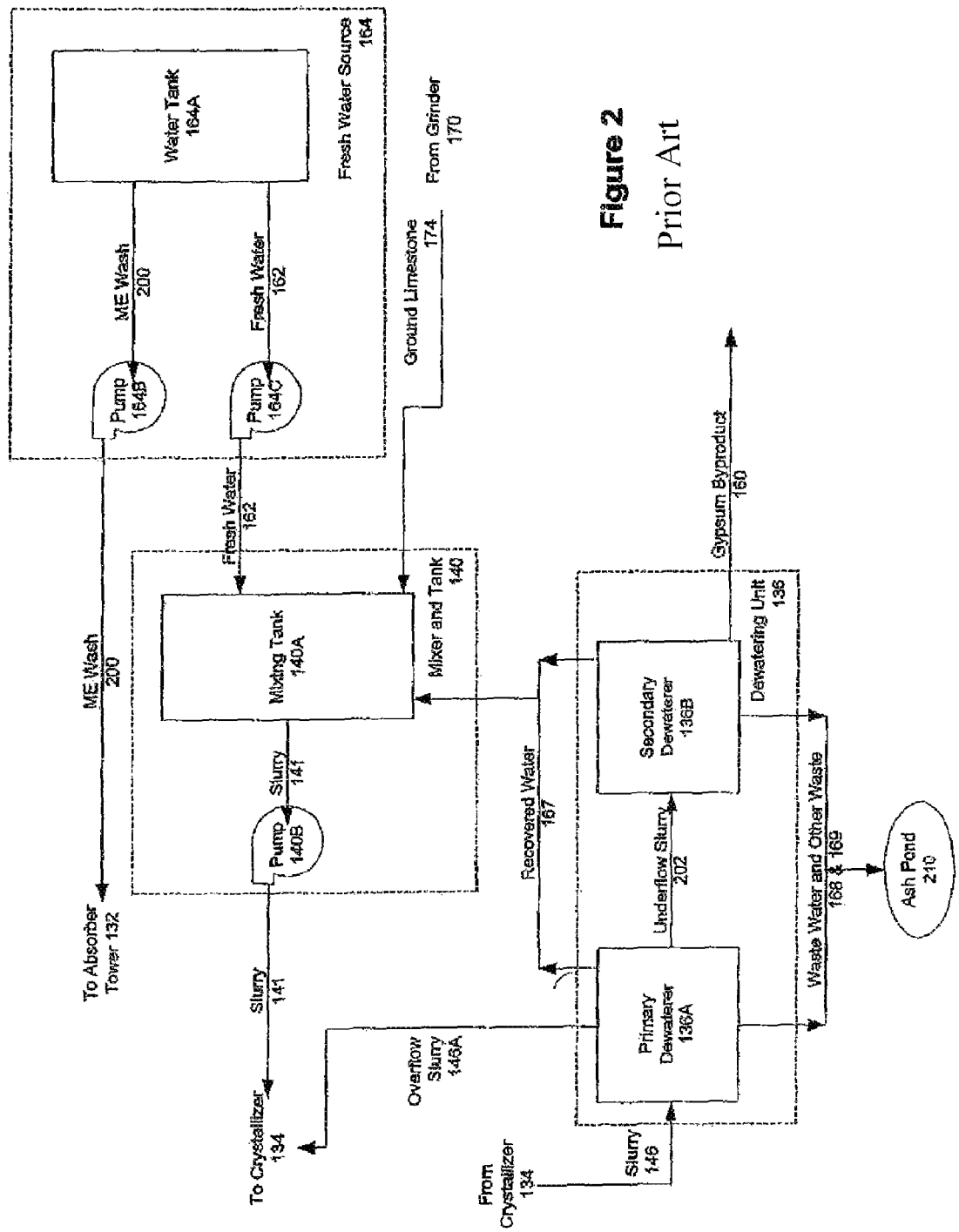
FIG. 2 depicts further details of certain aspects of the WFGD subsystem shown in FIG. 1.

As demonstrated, efficient and effective operation of WFGD and similar subsystems is now more complex than ever before. Furthermore, it is likely that this complexity will continue to increase in coming years with additional competitive pressures and additional pollutant regulation. Conventional process control strategies and techniques are incapable of dealing with these complexities and hence are incapable of optimal control of such operations.

In a business environment that is dynamically changing over the course of a subsystem's useful operating life, it is desirable to maximize the commercial value of the subsystem operations at any given time. This asset optimization may be based on factors that are not even considered in the conventional process control strategy. For example, in a business environment in which a market exists for trading regulatory credits, efficient subsystem operation may dictate that additional regulatory credits can be created and sold to maximize the value of the subsystem, notwithstanding the additional operational costs that may be incurred to generate such credits.

Thus, rather than a simple strategy of maximizing $SO_2$ absorption, minimizing operational costs and meeting the byproduct quality specification, a more complex strategy can be used to optimize subsystem operations irrespective of whether or not $SO_2$ absorption is maximized, operational costs are minimized or the byproduct quality specification is met. Furthermore, not only can tools be provided to substantially improve subsystem control, such as improved subsystem control can be fully automated. Thus, operations can be automated and optimized for not only operational parameters and constraints, but also the business environment. The subsystem can be automatically controlled to operate very close to or even precisely at the regulatory permit level, when the market value of generated regulatory credits is less than the additional operational cost for the subsystem to produce such credits. However, the subsystem can also be automatically controlled to adjust such operations so as to operate below the regulatory permit level, and thereby generate regulatory credits, when the market value of generated regulatory credits is greater than the additional operational cost for the subsystem to produce such credits. Indeed, the automated control can direct the subsystem to operate to remove as much $SO_2$ as possible up to the marginal dollar value, i.e. where the value of the emission credit equals processing cost to create the credit.

To summarize, optimized operation of WFGD and similar subsystems requires consideration of not only complex process and regulatory factors, but also complex business factors, and dynamic changes in these different types of factors. Optimization may require consideration of business factors which are local, e.g. one of the multiple WFGD processing units being taken off-line, and/or regional, e.g. another entity's WFGD processing unit operating within the region being taken off-line, or even global. Widely and dynamically varying market prices of, for example, long-term and short-term $SO_2$ regulatory credits may also need to be taken that into account in optimizing operations.

Thus, the controls should preferably be capable of adjusting operation to either minimize $SO_2$ removal, subject to the regulatory permit, or to maximum $SO_2$ removal. The ability to make such adjustments will allow the subsystem owner to take advantage of a dynamic change in the regulatory credit value, and to generate credits with one subsystem to offset out-of-permit operation by another of its subsystems or to take advantage of another subsystem owner's need to purchase regulatory credits to offset out-of-permit operation of that subsystem. Furthermore, the controls should also preferably be capable of adjusting operations again as soon as the generation of further regulatory credits is no longer beneficial. Put another way, the control system should continuously optimize operation of the APC asset subject to equipment, process, regulatory, and business constraints.

Since there is no incentive to exceed the required purify of the gypsum by-product, the controls should preferably facilitate operational optimization to match the quality of the gypsum byproduct with the gypsum quality specification or other sales constraint. Optimized control should facilitate the avoidance of limestone blinding by anticipating and directing actions to adjust the $O_2$ level in view of the desired $SO_2$ absorption level, and gypsum production requirements.

As discussed above, controlling emissions to a rolling-average is a complex problem. This is because, at least in part, the time-window for the rolling-average is always moving forward, and at any given time, multiple time-windows are active. Typically, active windows extend from the given time to times in the past and other active windows extend from the given time to times in the future.

Management of the rolling-average emissions requires integration of all emissions during the time window of the rolling-average. Thus, to optimize emissions against a rolling-average target requires that an instantaneous emission target be selected that takes into account the actual past emissions and predicted future emissions or operating plans, for all of the "active" time-windows.

For example, optimization of a four-hour rolling average requires the examination of multiple time-windows, the first of which starts 3 hours and 59 minutes in the past and ends at the current time, and the last of which starts at the current time and ends 4 hours into the future. It should be recognized that with a one-minute "resolution" of each time-window, optimization of this relative-short four-hour rolling-average would involve selecting an instantaneous target that satisfies constraints of 479 time-windows.

Determining the rolling-average emission target for a single integrated time window involves first calculating the total of past emissions in the integrated time window, and then, for example, predicting a rate of future emissions for the reminder of that single integrated time window that will result in the average emissions during that single integrated time window being at or under the rolling-average limit. The future emissions start with the current point in time. However, to be accurate, the future emissions must also include a prediction of the emissions from operations during the reminder of the single integrated time window.

It will be understood that the longer the time-window, the more difficult it is to predict future emissions. For example, emissions from operations over the next few hours can be predicted fairly accurately, but the emissions from operations over the next 11 months is more difficult to predict because factors such as seasonal variation and planned outages must be taken into account. Additionally, it may be necessary to add a safety margin for unplanned outages or capacity limitations placed on the subsystem.

Accordingly to optimize the WFGD process, e.g. to minimize the operational cost and/or maximize $SO_2$ removal while maintaining the process within the operating constraints, optimal setpoints for the WFGD process must be automatically determined.

In the embodiments of the invention described in detail below, a model-based multivariable predictive control (MPC) approach is used to provide optimal control of the WFGD process. In general, MPC technology provides multiple-input, multiple-output dynamic control of processes. As will be recognized by those skilled in the art, MPC technology was originally developed in the later half of the 1970's. Technical innovation in the field continues today. MPC encompasses a number of model-based control techniques or methods. These methods allow the control engineer to deal with complex, interacting, dynamic processes more effectively than is possible with conventional PID type feedback control systems. MPC techniques are capable of controlling both linear and non-linear processes.

All MPC systems explicitly use dynamic models to predict the process behavior into the future. A specific control action is then calculated for minimizing an objective function. Finally, a receding horizon is implemented whereby at each time increment the horizon is displaced one increment towards the future. Also, at each increment, the application of the first control signal, corresponding to the control action of the sequence calculated at that step, is made. There are a number of commercial programs available to control engineers such as Generalized Predictive Control (GPC), Dynamic Matrix Control (DMC) and Pegasus' Power Perfecter™. Comancho and Bordons provide an excellent overview on the subject of MPC in *Model Predictive Control*, Springer-Verlag London, Ltd. 1999, while Lennart Ljund's *System Identification. Theory for the User*, Prentice-Hall, Inc. $2^{nd}$ Edition, 1999, is the classic work on the dynamic modeling of a process which is necessary to actually implement MPC.

MPC technology is most often used in a supervisory mode to perform operations normally done by the operator rather than replacing basic underlying regulatory control implemented by the DCS. MPC technology is capable of automatically balancing competing goals and process constraints using mathematical techniques to provide optimal setpoints for the process.

The MPC will typically include such features as:

Dynamic Models: A dynamic model for prediction, e.g. a nonlinear dynamic model. This model is easily developed using parametric and step testing of the plant. The high quality of the dynamic model is the key to excellent optimization and control performance.

Dynamic Identification: Process dynamics, or how the process changes over time, are identified using plant step tests. Based upon these step tests, an optimization-based algorithm is used to identify the dynamics of the plant.

Steady State Optimization: The steady state optimizer is used to find the optimal operating point for the process.

Dynamic Control: The dynamic controller is used to compute the optimal control moves around a steady state solution. Control moves are computed using an optimizer. The optimizer is used to minimize a user specified cost function that is subject to a set of constraints. The cost function is computed using the dynamic model of the process. Based upon the model, cost function and constraints, optimal control moves can be computed for the process.

Dynamic Feedback: The MPC controller uses dynamic feedback to update the models. By using feedback, the effects of disturbances, model mismatch and sensor noise can be greatly reduced.

Advanced Tuning Features: The MPC controller provides a complete set of tuning capabilities. For manipulated variables, the user can set the desired value and coefficient; movement penalty factor; a lower and upper limit; rate of change constraints; and upper and lower hard constraints. The user can also use the output of the steady state optimizer to set the desired value of a manipulated variable. For controlled variables, the user may set the desired value and coefficient; error weights; limits; prioritized hard and trajectory funnel constraints.

Simulation Environment: An off-line simulation environment is provided for initial testing and tuning of the controller. The simulation environment allows investigation of model mismatch and disturbance rejection capabilities.

On-line System: The MPC control algorithm is preferably implemented in a standardized software server that can be run on a standard commercial operating system. The server communicates with a DCS through a standardized interface. Engineers and operators may advantageously view the output predictions of the MPC algorithm using a graphical user interface (GUI).

Robust Error Handling: The user specifies how the MPC algorithm should respond to errors in the inputs and outputs. The controller can be turned off if errors occur in critical variables or the last previous known good value can be used for non-critical variables. By properly handling errors, controller up-time operation can be maximized.

Virtual On-Line Analyzers: In cases where direct measurements of a process variable are not available, the environment provides the infrastructure for implementing a software-based virtual on-line analyzer (VOA). Using this MPC tool, a model of the desired process variable may be developed using historical data from the plant, including, if appropriate, lab data. The model can then be fed real-time process variables and predict, in real-time, an unmeasured process variable. This prediction can then be used in the model predictive controller.

Optimizing the WFGD Process

As will be described in more detail below, in accordance with the present invention, the $SO_2$ removal efficiency can be improved. That is, the $SO_2$ removal rate from the unit can be maximized and/or optimized, while meeting the required or desired constraints, such as a gypsum purity constraint, instantaneous emissions limit and rolling emissions limit. Furthermore, operational costs can also or alternatively be minimized or optimized. For example, slurry pumps can be automatically turned off when the flue gas load to the WFGD is reduced. Additionally, oxidation air flow and $SO_2$ removal can also or alternatively be dynamically adjusted to prevent limestone blinding conditions. Using the MPC controller described herein, the WFGD process can be managed closer to the constraints, and achieve enhanced performance as compared to conventionally controlled WFGD processes.

Figure 5A:
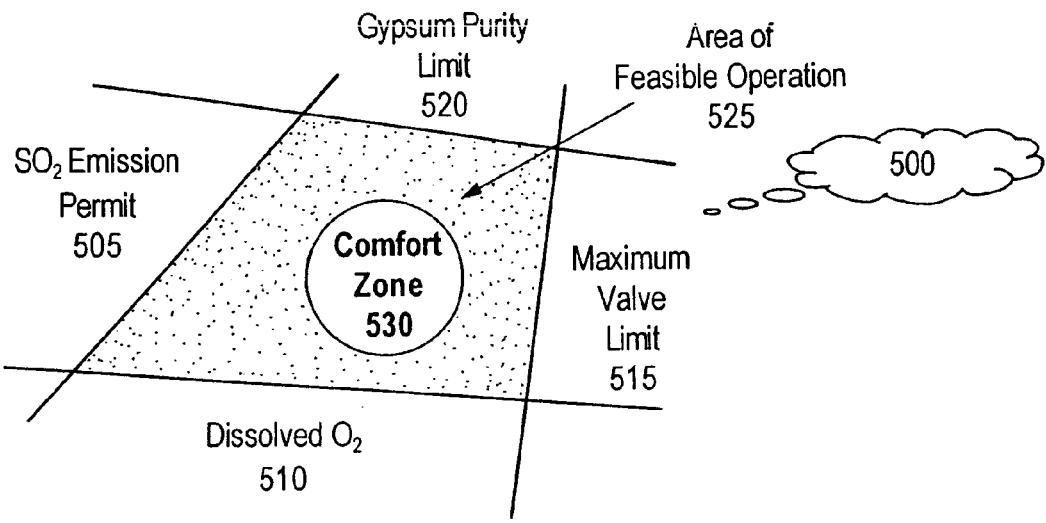
FIG. 5A depicts a WFGD constraint box with WFGD process performance within a comfort zone.
Figure 5B:
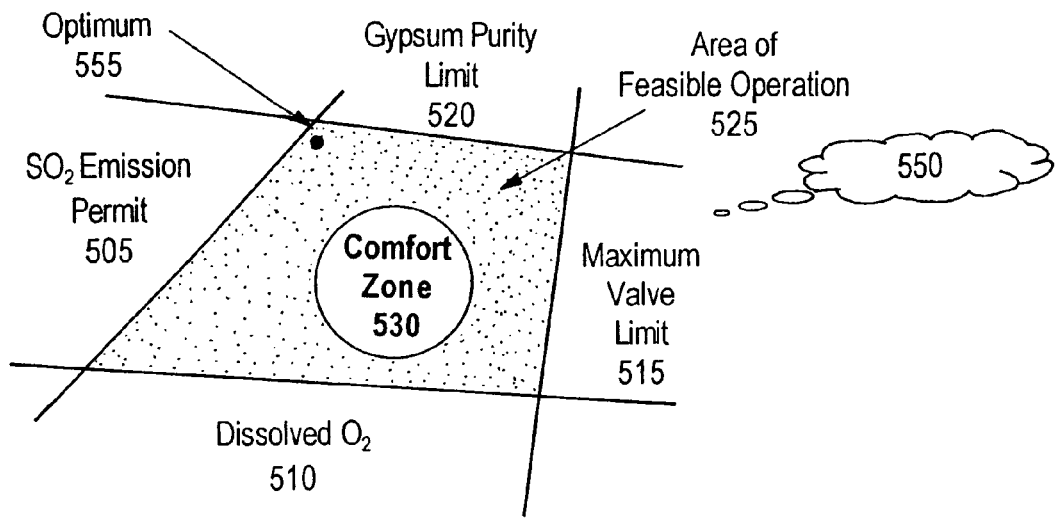
FIG. 5B depicts the WFGD constraint box of FIG. 5A with WFGD process performance optimized, in accordance with the present invention.

FIGS. 5A and 5B depict WFGD "constraint" boxes 500 and 550. As shown, by identifying process and equipment constraints 505-520, and using process-based steady-state relationships between multiple independent variables (MVs) and the identified constraints, i.e. the dependent/controlled variables, it is possible to map the constraints onto a common "space" in terms of the MVs. This space is actually an n-dimensional space where n is equal to the number of degrees of freedom or number of manipulated MVs in the problem. However, if for purposes of illustration, we assume that we have two degrees of freedom, i.e. two MVs, then it is possible to represent the system constraints and relationships using a two-dimensional (X-Y) plot.

Beneficially the process and equipment constraints bound a non-null solution space, which is shown as the areas of feasible operation 525. Any solution in this space will satisfy the constraints on the WFGD subsystem.

All WFGD subsystems exhibit some degree of variability. Referring to FIG. 5A, the typical conventional operating strategy is to comfortably place the normal WFGD subsystem variability within a comfort zone 530 of the feasible solution space 525—this will generally ensure safe operating. Keeping the operations within the comfort zone 530 keeps the operations away from areas of infeasible/undesirable operation, i.e. away from areas outside the feasible region 525. Typically, distributed control system (DCS) alarms are set at or near the limits of measurable constraints to alert operators of a pending problem.

While it is true that any point within the feasible space 525 satisfies the system constraints 505-520, different points within the feasibility space 525 do not have the same operating cost, $SO_2$ absorption efficiency or gypsum byproduct production capability. To maximize profit, $SO_2$ absorption efficiency or production/quality of gypsum byproduct, or to minimize cost, requires identifying the economically optimum point for operation within the feasible space 525.

In accordance with the present invention, the process variables and the cost or benefit of maintaining or changing the values of these variables can, for example, be used to create an objective function which represents profit, which can in some cases be considered negative cost. As shown in FIG. 5B, using either linear, quadratic or nonlinear programming solution techniques, as will described further below, it is possible to identify an optimum feasible solution point 555, such as the least-cost or maximum profit solution point within the area of feasible operation 525. Since constraints and/or costs can change at any time, it is beneficial to re-identify the optimum feasible solution point 555 in real time, e.g. every time the MPC controller executes.

Thus, the present invention facilitates the automatic re-targeting of process operation from the conventional operating point within the comfort zone 530 to the optimum operating point 555, and from optimum operating point 555 to another optimum operating point when a change occurs in the constraints of costs. Once the optimum point is determined, the changes required in the values of the MVs to shift the process to the optimum operating point, are calculated. These new MV values become target values. The target values are steady-state values and do not account for process dynamics. However, in order to safely move the process, process dynamics need to be controlled and managed as well—which brings us to the next point.

To move the process from the old operating point to the new optimum operating point, predictive process models, feedback, and high-frequency execution are applied. Using MPC techniques, the dynamic path or trajectory of controlled variables (CVs) is predicted. By using this prediction and managing manipulated MV adjustments not just at the current time, but also into the future, e.g. the near-term future, it is possible to manage the dynamic path of the CVs. The new target values for the CVs can be calculated. Then, dynamic error across the desired time horizon can also be calculated as the difference between the predicted path for the CV and the new CV target values. Once again, using optimization theory, an optimum path, which minimizes error, can be calculated. It should be understood that in practice the engineer is preferably allowed to weight the errors so that some CVs are controlled more tightly than others. The predictive process models also allow control of the path or trajectory from one operating point to the next—so, dynamic problems can be avoided while moving to the new optimum operating point.

In summary, the present invention allows operations to be conducted at virtually any point within the area of feasible operation 525 as might be required to optimize the process to obtain virtually any desired result. That is, the process can be optimized whether the goal is to obtain the lowest possible emissions, the highest quality or quantity of byproduct, the lowest operating costs or some other result.

In order to closely approach the optimum operating point 555, the MPC preferably reduces process variability so that small deviations do not create constraint violations. For example, through the use of predictive process models, feedback, and high-frequency execution, the MPC can dramatically reduce the process variability of the controlled process.

Steady State and Dynamic Models

As described in the previous paragraphs, a steady state and dynamic models are used for the MPC controller. In this section, these models are further described.

Steady State Models: The steady state of a process for a certain set of inputs is the state, which is described by the set of associated process values, that the process would achieve if all inputs were to be held constant for a long period of time such that previous values of the inputs no longer affect the state. For a WFGD, because of the large capacity of and relatively slow reaction in the crystallizer in the processing unit, the time to steady state is typically on the order of 48 hours. A steady state model is used to predict the process values associated with the steady state for a set of process inputs.

First Principles Steady State Model: One approach to developing a steady state model is to use a set of equations that are derived based upon engineering knowledge of the process. These equations may represent known fundamental relationships between the process inputs and outputs. Known physical, chemical, electrical and engineering equations may be used to derive this set of equations. Because these models are based upon known principles, they are referred to as first principle models.

Most processes are originally designed using first principle techniques and models. These models are generally accurate enough to provide for safe operation in a comfort zone, as described above with reference to FIG. 5A. However, providing highly accurate first principles based models is often time consuming and expensive. In addition, unknown influences often have significant effects on the accuracy of first principles models. Therefore, alternative approaches are often used to build highly accurate steady state models.

Empirical Models: Empirical models are based upon actual data collected from the process. The empirical model is built using a data regression technique to determine the relationship between model inputs and outputs. Often times, the data is collected in a series of plant tests where individual inputs are moved to record their affects upon the outputs. These plant tests may last days to weeks in order to collect sufficient data for the empirical models.

Linear Empirical Models: Linear empirical models are created by fitting a line, or a plane in higher dimensions, to a set of input and output data. Algorithms for fitting such models are commonly available, for example, Excel provides a regression algorithm for fitting a line to a set of empirical data. Neural Network Models: Neural network models are another form of empirical models. Neural networks allow more complex curves than a line to be fit to a set of empirical data. The architecture and training algorithm for a neural network model are biologically inspired. A neural network is composed of nodes that model the basic functionality of a neuron. The nodes are connected by weights which model the basic interactions between neurons in the brain. The weights are set using a training algorithm that mimics learning in the brain. Using neural network based models, a much richer and complex model can be developed than can be achieved using linear empirical models. Process relationships between inputs (Xs) and outputs (Ys) can be represented using neural network models. Future references to neural networks or neural network models in this document should be interpreted as neural network-based process models.

Hybrid Models: Hybrid models involve a combination of elements from first principles or known relationships and empirical relationships. For example, the form of the relationship between the Xs and Y may be known (first principle element). The relationship or equations include a number of constants. Some of these constants can be determined using first principle knowledge. Other constants would be very difficult and/or expensive to determine from first principles. However, it is relatively easy and inexpensive to use actual process data for the Xs and Y and the first principle knowledge to construct a regression problem to determine the values for the unknown constants. These unknown constants represent the empirical/regressed element in the hybrid model. The regression is much smaller than an empirical model and empirical nature of a hybrid model is much less because the model form and some of the constants are fixed based on the first principles that govern the physical relationships.

Dynamic Models: Dynamic models represent the effects of changes in the inputs on the outputs over time. Whereas steady state models are used only to predict the final resting state of the process, dynamic models are used to predict the path that will be taken from one steady state to another. Dynamic models may be developed using first principles knowledge, empirical data or a combination of the two. However, in most cases, models are developed using empirical data collected from a series of step tests of the important variables that affect the state of the process.

Pegasus Power Perfecter Model: Most MPC controllers only allow the use of linear empirical models, i.e. the model is composed of a linear empirical steady state model and a linear empirical dynamic model. The Pegasus Power Perfecter™ allows linear, nonlinear, empirical and first principles models to be combined to create the final model that is used in the controller, and is accordingly preferably used to implement the MPC. One algorithm for combining different types of models to create a final model for the Pegasus Power Perfecter is described in U.S. Pat. No. 5,933,345.

WFGD Subsystem Architecture

Figure 6:
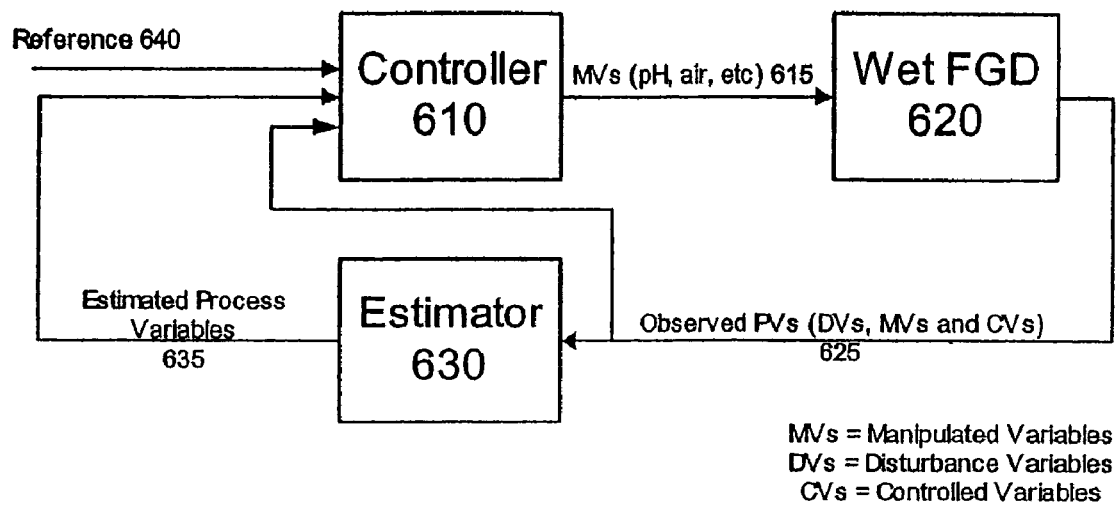
FIG. 6 depicts a functional block diagram of an exemplary MPC control architecture, in accordance with the present invention.

FIG. 6 depicts a functional block diagram of a WFGD subsystem architecture with model predictive control. The controller 610 incorporates logic necessary to compute real-time setpoints for the manipulated MVs 615, such as pH and oxidation air, of the WFGD process 620. The controller 610 bases these computations upon observed process variables (OPVs) 625, such as the state of MVs, disturbance variables (DVs) and controlled variables (CVs). In addition, a set of reference values (RVs) 640, which typically have one or more associated tuning parameters, will also be used in computing the setpoints of the manipulated MVs 615.

An estimator 630, which is preferably a virtual on-line analyzer (VOA), incorporates logic necessary to generate estimated process variables (EPVs) 635. EPV's are typically process variables that cannot be accurately measured. The estimator 630 implements the logic to generate a real-time estimate of the operating state of the EPVs of the WFGD process based upon current and past values of the OPVs. It should be understood that the OPVs may include both DCS process measurements and/or lab measurements. For example, as discussed above the purity of the gypsum may be determined based on lab measurements. The estimator 630 may beneficially provide alarms for various types of WFGD process problems.

The controller 610 and estimator 630 logic may be implemented in software or in some other manner. It should be understood that, if desired, the controller and estimator could be easily implemented within a single computer process, as will be well understood by those skilled in the art.

Model Predictive Control Controller (MPCC)

The controller 610 of FIG. 6 is preferably implemented using a model predictive controller (MPCC). The MPCC provides real-time multiple-input, multiple-output dynamic control of the WFGD process. The MPCC computes the setpoints for the set of MVs based upon values of the observed and estimated PVs 625 and 635. A WFGD MPCC may use any of, or a combination of any or all of such values, measured by:

pH Probes
Slurry Density Sensors
Temperature Sensors
Oxidation-Reduction Potential (ORP) Sensors
Absorber Level Sensors
$SO_2$ Inlet and Outlet/Stack Sensors
Inlet Flue Gas Velocity Sensors
Lab Analysis of Absorber Chemistry (Cl, Mg, Fl)
Lab Analysis of Gypsum Purity
Lab Analysis of Limestone Grind and Purity The WFGD MPCC may also use any, or a combination of any or all of the computed setpoints for controlling the following:

Limestone feeder
Limestone pulverizers
Limestone slurry flow
Chemical additive/reactant feeders/valves
Oxidation air flow control valves or dampers or blowers
pH valve or setpoint
Recycle pumps
Make up water addition and removal valves/pumps
Absorber Chemistry (Cl, Mg, Fl)

The WFGD MPCC may thereby control any, or a combination of any or all of the following CVs:

$SO_2$ Removal Efficiency
Gypsum Purity
pH
Slurry Density
Absorber Level
Limestone Grind and Purity
Operational Costs The MPC approach provides the flexibility to optimally compute all aspects of the WFGD process in one unified controller. A primary challenge in operating a WFGD is to maximize operational profit and minimize operational loss by balancing the following competing goals:

Maintaining the $SO_2$ removal rate at an appropriate rate with respect to the desired constraint limit, e.g. the permit limits or limits that maximize $SO_2$ removal credits when appropriate.

Maintaining gypsum purity at an appropriate value with respect to a desired constraint limit, e.g. the gypsum purity specification limit.

Maintaining operational costs at an appropriate level with respect to a desired limit, e.g. the minimum electrical consumption costs.

Figure 7:
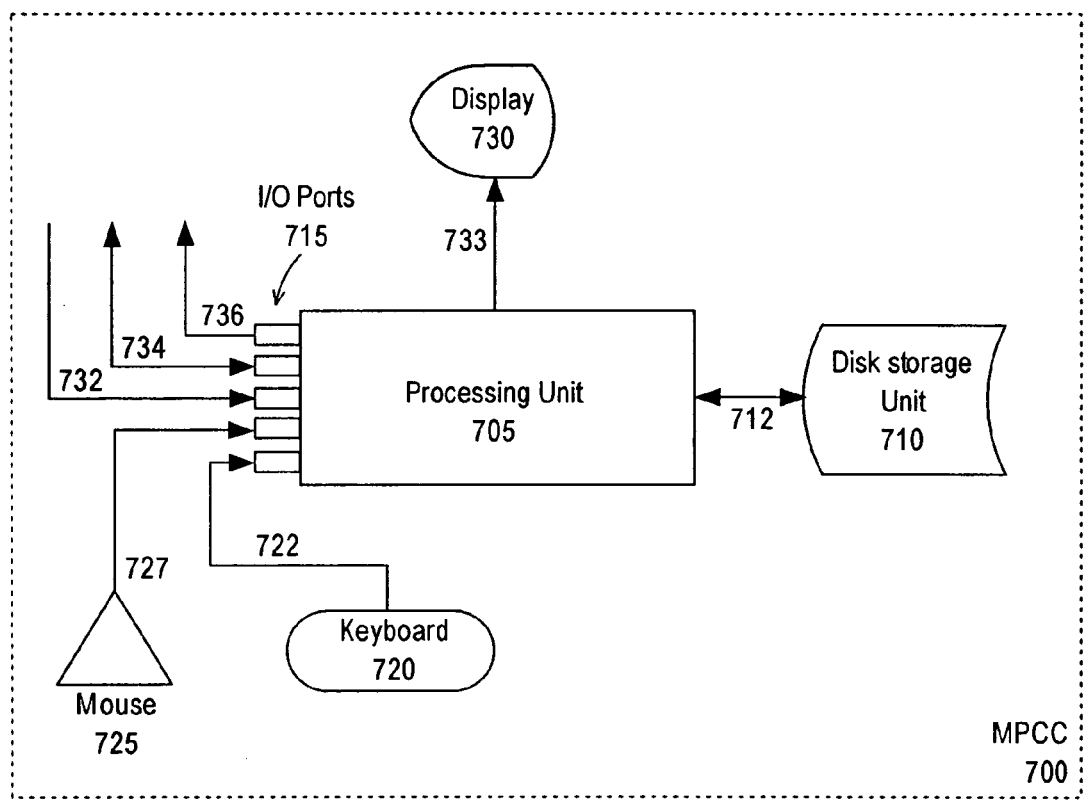
FIG. 7 depicts components of an exemplary MPC controller and estimator suitable for use in the architecture of FIG. 6.

FIG. 7 depicts an exemplary MPCC 700, which includes both a controller and estimator similar to those described with reference to FIG. 6. As will be described further below, the MPCC 700 is capable of balancing the competing goals described above. In the preferred implementation, the MPCC 700 incorporates Pegasus Power Perfecter™ MPC logic and neural based network models, however other logic and non-neural based models could instead be utilized if so desired, as discussed above and as will be well understood by those skilled in the art.

As shown in FIG. 7, MPCC 700 includes a processing unit 705, with multiple I/O ports 715, and a disk storage unit 710. The disk storage 710 unit can be one or more device of any suitable type or types, and may utilize electronic, magnetic, optical, or some other form or forms of storage media. It will also be understood that although a relatively small number of I/O ports are depicted, the processing unit may include as many or as few I/O ports as appropriate for the particular implementation. It should also be understood that process data from the DCS and setpoints sent back to the DCS may be packaged together and transmitted as a single message using standard inter-computer communication protocols—while the underlying data communication functionality is essential for the operation of the MPCC, the implementation details are well known to those skilled in the art and not relevant to the control problem being addressed herein. The processing unit 705 communicates with the disk storage unit 710 to store and retrieve data via a communications link 712.

The MPCC 700 also includes one or more input devices for accepting user inputs, e.g. operator inputs. As shown in FIG. 7, a keyboard 720 and mouse 725 facilitate the manual inputting of commands or data to the processing unit 705, via communication links 722 and 727 and I/O ports 715. The MPCC 700 also includes a display 730 for presenting information to the user. The processing unit 705 communicates the information to be presented to the user on the display 730 via the communications link 733. In addition to facilitating the communication of user inputs, the I/O ports 715 also facilitate the communication of non-user inputs to the processing unit 705 via communications links 732 and 734, and the communication of directives, e.g. generated control directives, from the processing unit 715 via communication links 734 and 736.

Processing Unit, Logic and Dynamic Models

Figure 8:
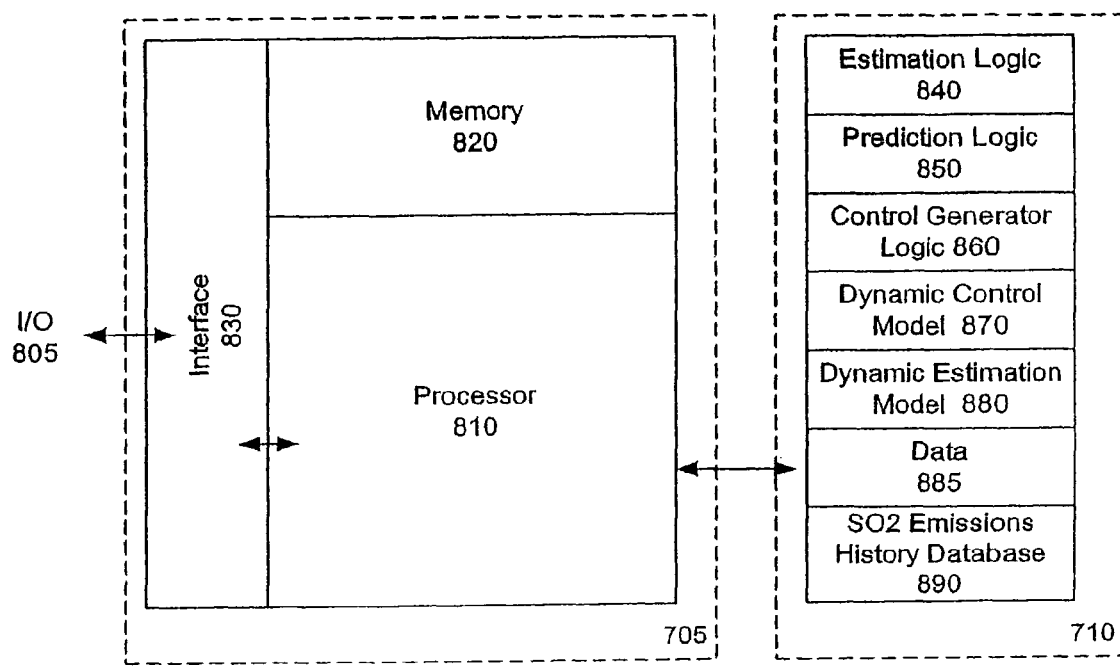
FIG. 8 further details the processing unit and storage disk of the MPC controller shown in FIG. 7, in accordance with the present invention.

As shown in FIG. 8, the processing unit 705 includes a processor 810, memory 820, and an interface 830 for facilitating the receipt and transmission of I/O signals 805 via the communications links 732-736 of FIG. 7. The memory 820 is typically a type of random access memory (RAM). The interface 830 facilitates interactions between the processor 810 and the user via the keyboard 720 and/or mouse 725, as well as between the processor 810 and other devices as will be described further below.

As also shown in FIG. 8, the disk storage unit 710 stores estimation logic 840, prediction logic 850, control generator logic 860, a dynamic control model 870, and a dynamic estimation model 880. The stored logic is executed in accordance with the stored models to control of the WFGD subsystem so as to optimize operations, as will be described in greater detail below. The disk storage unit 710 also includes a data store 885 for storing received or computed data, and a database 890 for maintaining a history of SO$_2$ emissions.

A control matrix listing the inputs and outputs that are used by the MPCC 700 to balance the three goals listed above is shown in Table 1 below.

TABLE 1

| Control Matrix | | | |
|---|---|---|---|
| | SO$_2$ Removal | Gypsum Purity | Operational Cost |
| Manipulated Variables | | | |
| PH | X | x | |
| Blower Air Amps | | x | X |
| Recycle Pump Amps | X | | X |
| Disturbance Variables | | | |
| Inlet SO$_2$ | | | X |
| Flue Gas Velocity | | | X |
| Chloride | X | x | |
| Magnesium | X | x | |
| Fluoride | X | x | |

TABLE 1-continued

| Control Matrix | | | |
|---|---|---|---|
| | SO$_2$ Removal | Gypsum Purity | Operational Cost |
| Limestone Purity and Grind | | x | X |
| Internal Power Cost | | | X |
| Limestone Cost | | | X |
| Gypsum Price | | | X |

In the exemplary implementation described herein, the MPCC 700 is used to control CVs consisting of the SO$_2$ removal rate, gypsum purity and operational costs. Setpoints for MVs consisting of pH level, the load on the oxidation air blower and the load on the recycle pumps are manipulated to control the CVs. The MPCC 700 also takes a number of DVs into account.

The MPCC 700 must balance the three competing goals associated with the CVs, while observing a set of constraints. The competing goals are formulated into an objective function that is minimized using a nonlinear programming optimization technique encoded in the MPCC logic. By inputting weight factors for each of these goals, for instance using the keyboard 720 or mouse 725, the WFGD subsystem operator or other user can specify the relative importance of each of the goals depending on the particular circumstances.

For example, under certain circumstances, the SO$_2$ removal rate may be weighted more heavily than gypsum purity and operational costs, and the operational costs may be weighted more heavily than the gypsum purity. Under other circumstances operational costs may be weighted more heavily than gypsum purity and the SO$_2$ removal rate, and gypsum purity may be weighted more heavily than the SO$_2$ removal rate. Under still other circumstances the gypsum purity may be weighted more heavily than the SO$_2$ removal rate and operational costs. Any number of weighting combinations may be specified.

The MPCC 700 will control the operations of the WFGD subsystem based on the specified weights, such that the subsystem operates at an optimum point, e.g. the optimum point 555 shown in FIG. 5B, while still observing the applicable set of constraints, e.g. constraints 505-520 shown in FIG. 5B.

For this particular example, the constraints are those identified in Table 2 below. These constraints are typical of the type associated with the CVs and MVs described above.

TABLE 2

| Controlled and Manipulated Variable Constraints. | | | |
|---|---|---|---|
| Controlled Variables: | Minimum Constraint | Maximum Constraint | Desired Value |
| SO$_2$ Removal | 90% | 100% | Maximize |
| Gypsum Purity | 95% | 100% | Minimize |
| Operation Cost | None | none | Minimize |
| Manipulated Variables: | Minimum Constraint | Maximum Constraint | |
| pH | 5.0 | 6.0 | computed |
| Blower Air | 0% | 100% | computed |
| Recycle Pump #1 | Off | On | computed |
| Recycle Pump #2 | Off | On | computed |
| Recycle Pump #3 | Off | On | computed |
| Recycle Pump #4 | Off | On | computed |

Dynamic Control Model

As noted above, the MPCC 700 requires a dynamic control model 870, with the input-output structure shown in the control matrix of Table 1. In order to develop such a dynamic model, a first principles model and/or an empirical model based upon plant tests of the WFGD process are initially developed. The first principles model and/or empirical models can be developed using the techniques discussed above.

In the case of the exemplary WFGD subsystem under discussion, a steady state model (first principle or empirical) of the WFGD process for $SO_2$ removal rate and gypsum purity is preferably developed. Using the first principle approach, a steady state model is developed based upon the known fundamental relationships between the WFGD process inputs and outputs. Using a neural network approach, a steady state $SO_2$ removal rate and gypsum purity model is developed by collecting empirical data from the actual process at various operating states. A neural network based model, which can capture process nonlinearity, is trained using this empirical data. It is again noted that although a neural network based model may be preferable in certain implementations, the use of such a model is not mandatory. Rather, a non-neural network based model may be used if desired, and could even be preferred in certain implementations.

In addition, the steady state model for operational costs is developed from first principles. Simply, costs factors are used to develop a total cost model. In the exemplary implementation under discussion, the cost of various raw materials, such as limestone, and the cost of electrical power are multiplied by their respective usage amounts to develop the total cost model. An income model is determined by the $SO_2$ removal credit price multiplied by $SO_2$ removal tonnage and gypsum price multiplied by gypsum tonnage. The operational profit (or loss) can be determined by subtracting the cost from the income. Depending on the pump driver (fixed vs. variable speed), optimization of the pump line-up may involve binary OFF-ON decisions; this may require a secondary optimization step to fully evaluate the different pump line-up options.

Even though accurate steady state models can be developed, and could be suitable for a steady state optimization based solution, such models do not contain process dynamics, and hence are not particularly suitable for use in MPCC 700. Therefore, step tests are performed on the WFGD subsystem to gather actual dynamic process data. The step-test response data is then used to build the empirical dynamic control model 870 for the WFGD subsystem, which is stored by the processor 810 on the disk storage unit 710, as shown in FIG. 8.

Dynamic Estimation Model and Virtual On-Line Analyzer

Figure 9:
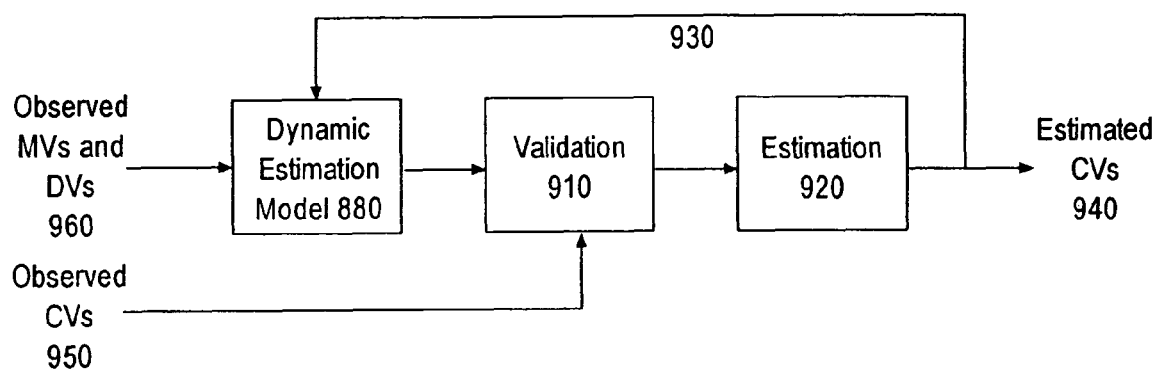
FIG. 9 depicts a functional block diagram of the estimator incorporated in the MPC controller detailed in FIG. 8.

FIG. 6 illustrates how an estimator, such as that incorporated in the MPCC 700, is used in the overall advanced control of the WFGD process. In the MPCC 700, the estimator is preferably in the form of a virtual on-line analyzer (VOA). FIG. 9 further details the estimator incorporated in the MPCC 700.

As shown in FIG. 9, observed MVs and DVs are input into the empirical dynamic estimation model 880 for the WFGD subsystem that is used in executing the estimation logic 840 on the processor 810. In this regard, the processor 810 executes the estimation logic 840 in accordance with the dynamic estimation model 880. In this case, estimation logic 840 computes current values of the CVs, e.g. $SO_2$ removal efficiency, gypsum purity and operational cost.

Table 3 shows the structure for the dynamic estimation model 880. It should be noted that the control matrix and dynamic estimation model 880 used in the MPCC 700 have the same structure.

TABLE 3

Process model for the estimator.

|  | $SO_2$ Removal | Gypsum Purity |
|---|---|---|
| Manipulated Variables | | |
| PH | X | x |
| Blower Air Amps | | x |
| Recycle Pump Amps | X | |
| Disturbance Variables | | |
| Inlet $SO_2$ | | |
| Flue Gas Velocity | | |
| Chloride | x | x |
| Magnesium | x | x |
| Fluoride | x | x |
| Limestone Purity and Grind | | x |

The output of the estimation logic 840 execution is open loop values for $SO_2$ removal and gypsum purity. The dynamic estimation model 880 for the VOA is developed using the same approach described above to develop the dynamic control model 870. It should be noted that although the dynamic estimation model 880 and dynamic control model 870 are essentially the same, the models are used for very different purposes. The dynamic estimation model 880 is applied by processor 810 in executing the estimation logic 840 to generate an accurate prediction of the current values of the process variables (PVs), e.g. the estimated CVs 940. The dynamic control model 870 is applied by the processor 810 in executing the prediction logic 850 to optimally compute the manipulated MV setpoints 615 shown in FIG. 6.

As shown in FIG. 9, a feedback loop 930 is provided from the estimation block 920, which represents the estimated CVs generated by the processor 810 as a result of the execution of the estimation logic 840. Thus, the best estimate of CVs is feed back to the dynamic estimation model 880 via the feedback loop 930. The best estimate of CVs from the previous iteration of the estimator is used as starting points for biasing the dynamic estimation model 880 for the current iteration.

The validation block 910 represents a validation of the values of observed CVs 950 from, for example, sensor measurements and lab analysis, by the processor 810 using results of the execution of the estimation logic 840, in accordance with the dynamic estimation model 880, and observed MVs and DVs 960. The validation represented by block 910 is also used to identify potential limestone blinding conditions. For example, if the observed MVs is a pH value measured by one of a pH sensor, the validation 910 of the measured pH based on a pH value estimated in accordance with the dynamic estimation model 880 may indicate that the pH sensor is failing. If the observed $SO_2$ removal, gypsum purity or pH is identified to be in error, the processor 810 will not use the value in the estimation 920. Rather, a substitute value, preferably the output resulting from the estimation based on the dynamic estimation model, will instead be used. In addition, an alarm may be sent to the DCS.

To compute the estimation 920, the processor 810 combines the result of the execution of the estimation logic 840 based on the dynamic estimation model 880, with the observed and validated CVs. A Kalman filter approach is preferably used for combining the estimation result with the observed, validated data. In this case, the validated $SO_2$ removal rate, computed from the inlet and outlet $SO_2$ sensors, is combined with the generated removal rate value to produce an estimated value of the true $SO_2$ removal. Because of the accuracy of the $SO_2$ sensors, the estimation logic 840 preferably places a heavy bias towards a filtered version of the observed data over the generated value.

Gypsum purity is only measured at most every few hours. The processor 810 will also combine new observations of gypsum purity with the generated estimated gypsum purity value. During periods between gypsum sample measurements, the processor 810, in accordance with the dynamic estimation model 880, will run open-loop updated estimates of the gypsum purity based upon changes in the observed MVs and DVs 960. Thus, the processor 810 also implements a real-time estimation for the gypsum purity.

Finally, the processor 810 executes the estimation logic 840, in accordance with the dynamic estimation model 880, to compute the operational cost of the WFGD. Since there is no direct on-line measurement of cost, the processor 810 necessarily implements the real-time estimation of the operational costs.

Emissions Management

As discussed above, the operational permits issued in the United States generally set limits for both instantaneous emissions and the rolling-average emissions. There are two classes of rolling-average emission problems that are beneficially addressed by the MPCC 700 in the control of the WFGD subsystem. The first is class of problem arises when the time-window of the rolling-average is less than or equal to the time-horizon of the prediction logic 850 executed by the processor 810 of the MPCC 700. The second class of problem arises when the time-window of the rolling-average is greater than the time-horizon of the prediction logic 850.

Single Tier MPCC Architecture

The first class of problem, the short time-window problem, is solved by adapting the normal constructs of the MPCC 700 to integrate the emission rolling-average as an additional CV in the control implemented by the MPCC 700. More particularly, the prediction logic 850 and the control generator logic 860 will treat the steady-state condition as a process constraint that must be maintained at or under the permit limit, rather than as an economic constraint, and will also enforce a dynamic control path that maintains current and future values of the rolling-average in the applicable time-window at or under the permit limit. In this way, the MPCC 700 is provided with a tuning configuration for the emission rolling-average.

Consideration of Disturbance Variables

Furthermore, DVs for factors such as planned operating events, e.g. load changes, that will impact emissions within an applicable horizon are accounted for in the prediction logic 850, and hence in the MPCC 700 control of the WFGD process. In practice, the actual DVs, which are stored as part of the data 885 in the storage disk unit 710, will vary based on the type of WFGD subsystem and the particular operating philosophy adopted for the subsystem, e.g. base load vs. swing. The DVs can be adjusted, from time to time, by the operator via inputs entered using the keyboard 720 and mouse 725, or by the control generator logic 860 itself, or by an external planning system (not shown) via the interface 830.

However, the DVs are typically not in a form that can be easily adjusted by operators or other users. Therefore, an operational plan interface tool is preferably provided as part of the prediction logic 850 to aid the operator or other user in setting and maintaining the DVs.

Figure 11A:
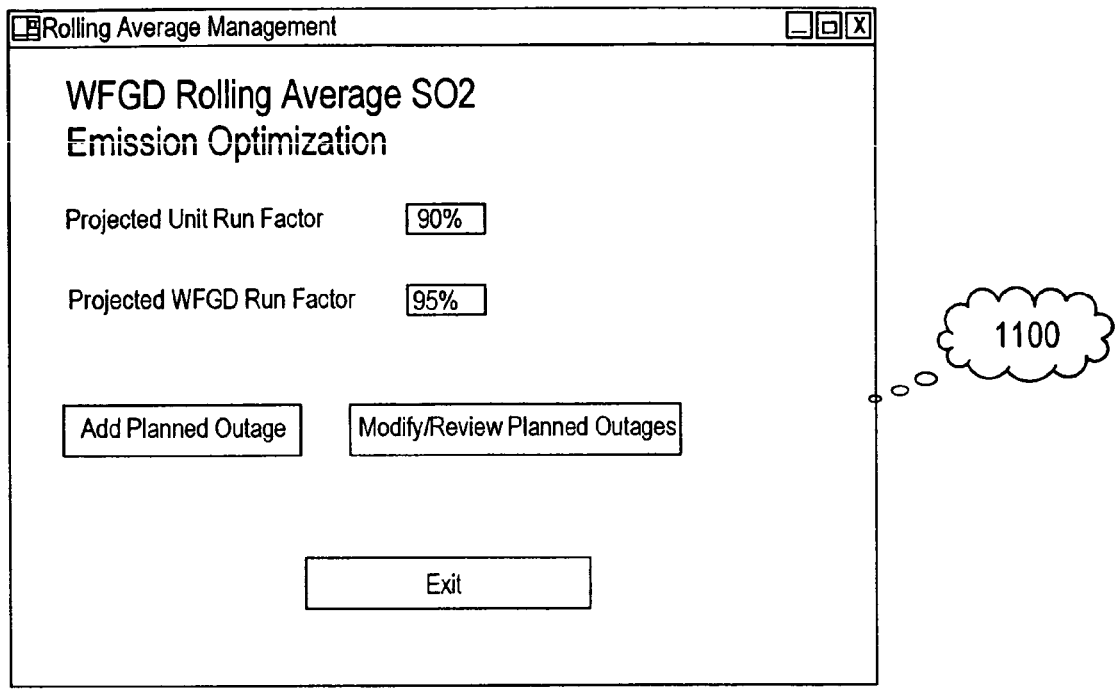
FIG. 11A depicts an interface screen presented by a multi-tier MPC controller to the user, in accordance with the present invention.
Figure 11B:
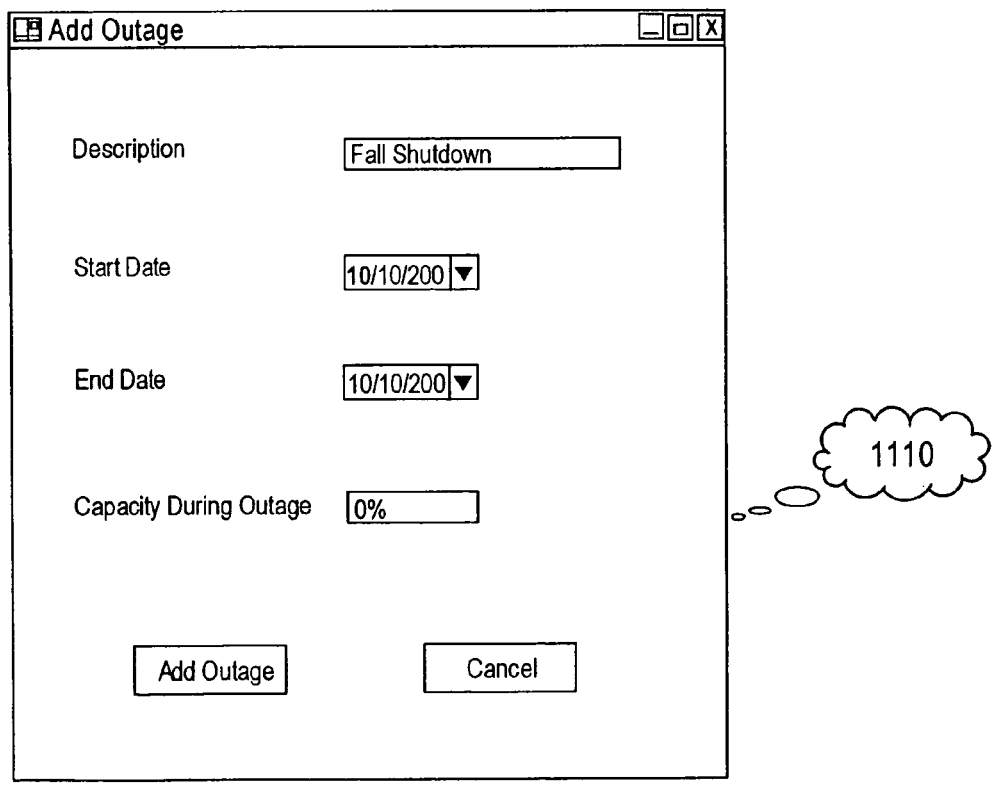
FIG. 11B depicts another interface screen presented by a multi-tier MPC controller for review, modification and/or addition of planned outages, in accordance with the present invention.

FIGS. 11A and 11B depict the interface presented on the display 730 for inputting a planned outage. As shown in FIG. 11A a screen 1100 is presented which displays the projected power generation system run factor and the projected WFGD subsystem run factor to the operator or other user. Also displayed are buttons allowing the user to input one or more new planned outages, and to display previously input planned outages for review or modification.

If the button allowing the user to input a planned outage is selected using the mouse 725, the user is presented with the screen 1110 shown in FIG. 11B. The user can then input, using the keyboard 720 various details regarding the new planned outage as shown. By clicking on the add outage button provided, the new planned outage is added as a DV and accounted for by the prediction logic 850. The logic implementing this interface sets the appropriate DVs so that the future operating plan is communicated to the MPCC processing unit 705.

Whatever the actual DVs, the function of the DVs will be the same, which is to embed the impact of the planned operating events into the prediction logic 850, which can then be executed by the MPCC processor 810 to predict future dynamic and steady-state conditions of the rolling-average emission CV. Thus, the MPCC 700 executes the prediction logic 850 to compute the predicted emission rolling-average. The predicted emission rolling average is in turn used as an input to the control generator logic 860, which is executed by the MPCC processor 810 to account for planned operating events in the control plan. In this way, the MPCC 700 is provided with a tuning configuration for the emission rolling-average in view of planned operating events, and therefore with the capability to control the operation of the WFGD within the rolling-average emission permit limit notwithstanding planned operating events.

Two Tier MPCC Architecture

The second class of problem, the long time-window problem, is beneficially addressed using a two-tiered MPCC approach. In this approach the MPCC 700 includes multiple, preferably two, cascaded controller processors.

Figure 10:
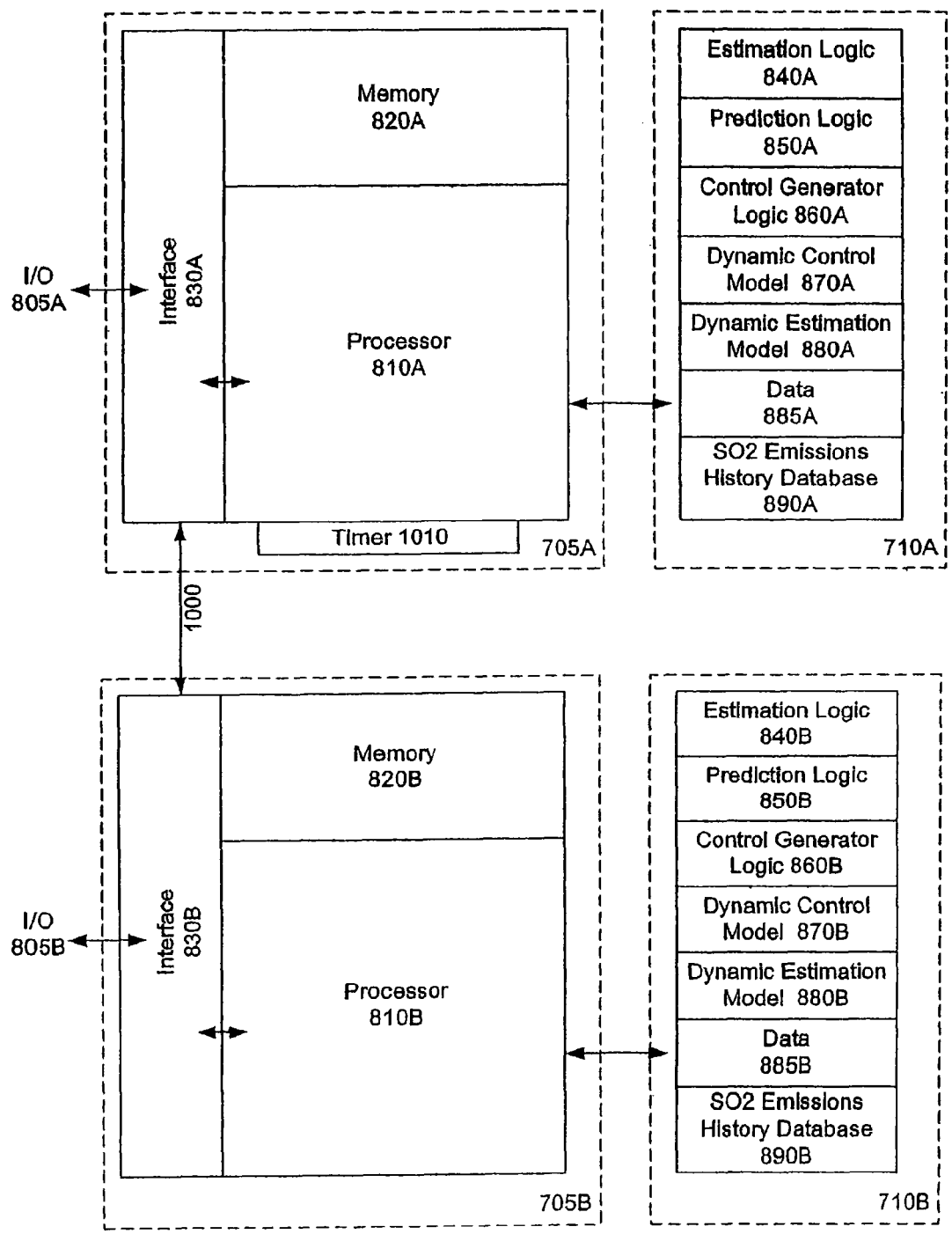
FIG. 10 depicts a multi-tier MPCC architecture, in accordance with the present invention.

Referring now to FIG. 10, a tier 1 controller processing unit (CPU) 705A operates to solve the short-term, or short time-window problem, in the manner described above with reference to the single tier architecture. As shown in FIG. 10, the CPU 705A includes a processor 810A. The processor 810A executes prediction logic 850A stored at disk storage unit 710A to provide dynamic rolling-average emission management within a time-window equal to the short term of applicable time horizon. A CV representing the short term or applicable control horizon rolling-average emission target is stored as part of the data 885A in the storage device unit 710A of the CPU 705A.

The CPU 705A also includes memory 820A and interface 830A similar to memory 820 and interface 830 described above with reference to FIG. 8. The interface 830A receives a subset of the MPCC 700 I/O signals, i.e. I/O signals 805A. The storage disk unit 710A also stores the estimation logic 840A and dynamic estimation model 880A, the control generator logic 860A and dynamic control model 870A, and the $SO_2$ emissions history database 890A, all of which are described above with reference to FIG. 8. The CPU 705A also includes a timer 1010, typically a processor clock. The function of the timer 1010 will be described in more detail below.

The tier 2 CPU 705B operates to solve the long-term, or long time-window problem. As shown in FIG. 10, the CPU 705B includes a processor 810B. The processor 810B executes prediction logic 850B to also provide dynamic rolling-average emission management. However, the prediction logic 850B is executed to manage the dynamic rolling-average emission in view of the full future time-window of the rolling-average emission constraint, and to determine the optimum short-term or applicable time horizon, rolling-average emission target, i.e. the maximum limit, for the tier 1 CPU 705A. Accordingly, the CPU 705B serves as a long-term rolling average emission optimizer and predicts the emission rolling average over the applicable time horizon for control of the emission rolling-average over the full future time window.

The CV representing the long term time horizon rolling-average emission constraint is stored as part of the data 885B in the disk storage unit 710B. The CPU 705B also includes memory 820B and interface 830B, similar to memory 820 and interface 830 described above. The interface 830B receives a subset of the MPCC 700 I/O signals, i.e. I/O signals 805B.

Although the two-tier architecture in FIG. 10 includes multiple CPUs, it will be recognized that the multi-tier prediction logic can, if desired, be implemented in other ways. For example, in FIG. 10, tier 1 of the MPCC 700 is represented by CPU 705A, and tier 2 of the MPCC 700 is represented by CPU 705B. However, a single CPU, such as CPU 705 of FIG. 8, could be used to execute both prediction logic 850A and prediction logic 850B, and thereby determine the optimum short-term or applicable time horizon rolling-average emission target, in view of the predicted optimum the long-term rolling average emission to solve the long-term, or long time-window problem, and to optimize the short-term or applicable term rolling average emission in view of the determined target.

As noted above, the CPU 705B looks to a long-term time horizon, sometimes referred to as the control horizon, corresponding to the time-window of the rolling average. Advantageously, CPU 705B manages the dynamic rolling-average emission in view of the full future time-window of the rolling-average emission, and determines the optimum short-term rolling-average emission limit. The CPU 705B executes at a frequency fast enough to allow it to capture changes to the operating plan over relatively short periods.

The CPU 705B utilizes the short-term or applicable term rolling average emission target, which is considered a CV by CPU 705A, as an MV, and considers the long term emission rolling average a CV. The long term emission rolling average is therefore stored as part of the data 885B in disk storage unit 710B. The prediction logic 850B will treat the steady-state condition as a process constraint that must be maintained at or under the permit limit, rather than as an economic constraint, and will also enforce a dynamic control path that maintains current and future values of the rolling-average in the applicable time-window at or under the permit limit. In this way, the MPCC 700 is provided with a tuning configuration for the emission rolling-average.

Furthermore, DVs for factors such planned operating events, e.g. load changes, that will impact emissions within an applicable horizon are accounted for in the prediction logic 850B, and hence in the MPCC 700 control of the WFGD process. As noted above, in practice the actual DVs, which are stored as part of the data 885B in the storage disk 710B, will vary based on the type of WFGD subsystem and the particular operating philosophy adopted for the subsystem, and can be adjusted by the operator, or by the CPU 705B executing the control generator logic 860B, or by an external planning system (not shown) via the interface 830B. However, as discussed above, the DVs are typically not in a form that can be easily adjusted by operators or other users, and therefore an operational plan interface tool, such as that shown in FIGS. 11A and 11B, is preferably provided as part of the prediction logic 850A and/or 850B to aid the operator or other user in setting and maintaining the DVs.

However, here again, whatever the actual DVs, the function of the DVs will be the same, which is to embed the impact of the planned operating events into the prediction logic 850B, which can then be executed by the MPCC processor 810B to predict future dynamic and steady-state conditions of the long term rolling-average emission CV.

Thus, the CPU 705B executes the prediction logic 850B to determine the optimum short-term or applicable term rolling-average emission limit in view of the planned operating events in the control plan. The optimum short-term or applicable term rolling-average emission limit is transmitted to CPU 705A via communications link 1000. In this way, the MPCC 700 is provided with a tuning configuration for optimizing the emission rolling-average in view of planned operating events, and therefore with the capability to optimize control of the operation of the WFGD within the rolling-average emission permit limit notwithstanding planned operating events.

Figure 12:
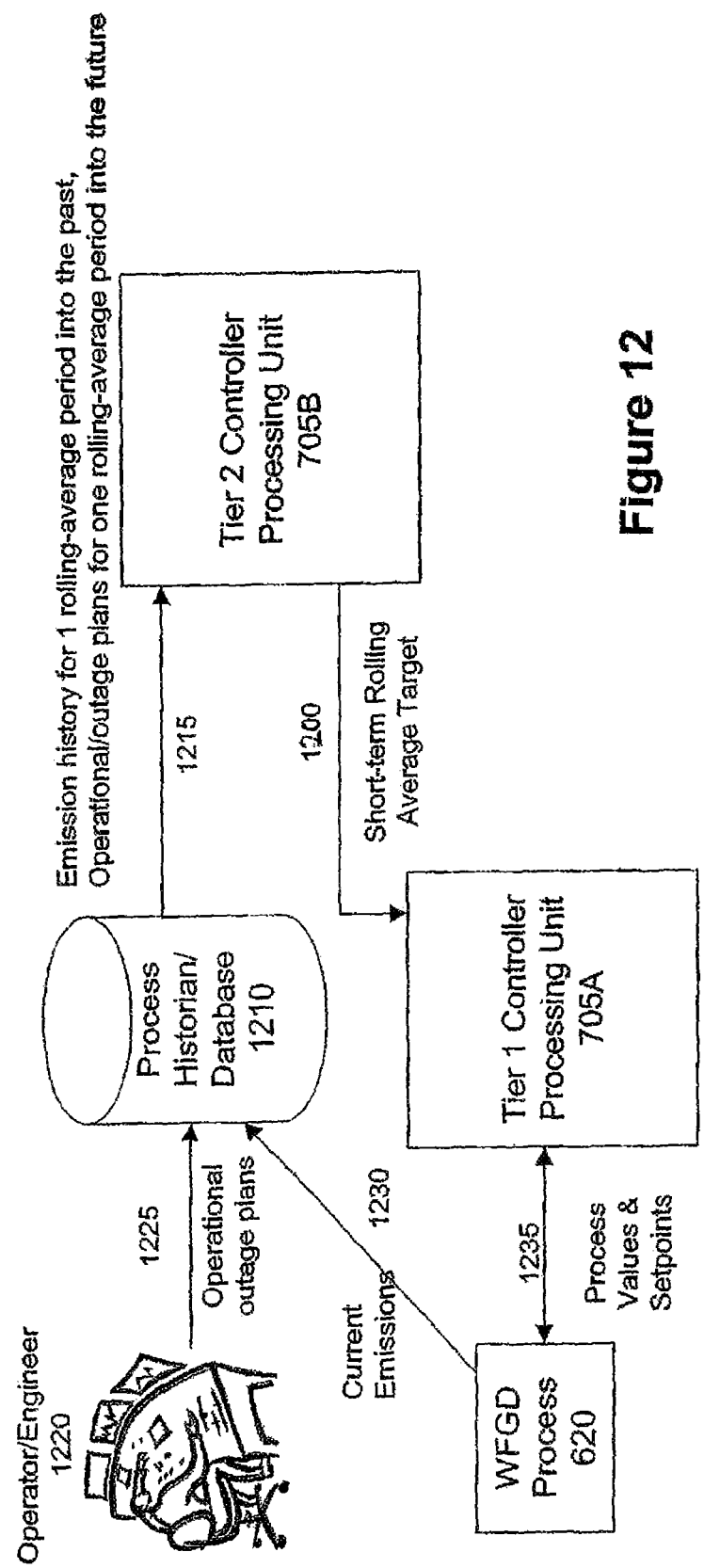
FIG. 12 depicts an expanded view of the multi-tier MPCC architecture of FIG. 10, in accordance with the present invention.

FIG. 12 depicts an expanded view of the multi-tier MPCC architecture. As shown, an operator or other user utilizes a remote control terminal 1220 to communicate with both a process historian database 1210 and the MPCC 700 via communications links 1225 and 1215. The MPCC 700 includes CPU 705A and CPU 705B of FIG. 10, which are interconnected via the communications link 1000. Data associated with the WFGD process is transmitted, via communications link 1230, to the process historian database 1210, which stores this data as historical process data. As further described further below, necessary stored data is retrieved from the database 1210 via communications link 1215 and processed by CPU 705B. Necessary data associated with the WFGD process is also transmitted, via communications link 1235 to, and processed by CPU 705A.

As previously described, the CPU 705A receives CV operating targets corresponding to the current desired long term rolling average target from CPU 705B via communications link 1000. The communicated rolling average target is the optimized target for the long-term rolling average generated by the CPU 705B executing the prediction logic 850B. The communications between CPU 705A and CPU 705B are handled in the same manner as communications between an MPC controller and a real-time optimizer.

CPU 705A and CPU 705B beneficially have a handshaking protocol which ensures that if CPU 705B stops sending optimized targets for the long-term rolling average to CPU 705A, CPU 705A will fall-back, or shed, to an intelligent and conservative operating strategy for the long-term rolling average constraint. The prediction logic 850A may include a tool for establishing such a protocol, thereby ensuring the necessary handshaking and shedding. However, if the prediction logic 850A does not include such a tool, the typical features and functionality of the DCS can be adapted in a manner well known to those skilled in the art, to implement the required handshaking and shedding.

The critical issue is to ensure that CPU 705A is consistently using a timely, i.e. fresh—not stale, long-term rolling average target. Each time CPU 705B executes the prediction logic 850B, it will calculate a fresh, new, long-term rolling average target. CPU 705A receives the new target from CPU 705B via communications link 1000. Based on receipt of the new target, CPU 705A executes the prediction logic 850A to re-set the timer 1010. If CPU 705A fails to timely receive a new target from CPU 705B via communications link 1000, the timer 1010 times out, or expires. Based on the expiration of the timer 1010, CPU 750A, in accordance with the prediction logic, considers the current long-term rolling average target to be stale and sheds back to a safe operating strategy until it receives a fresh new long-term rolling average target from CPU 705B.

Preferably, the minimum timer setting is a bit longer than the execution frequency of CPU 705B to accommodate computer load/scheduling issues. Due to the non-scheduled operation of many real-time optimizers, it is common conventional practice to set the communications timers at a half to two times the time to steady-state of a controller. However, since execution of the prediction logic by CPU 705B is scheduled, the recommended guideline for setting timer 1010 is not that of a steady-state optimization link, but should, for example, be no more than twice the execution frequency of the controller running on CPU 705B plus about 3 to 5 minutes.

If CPU 705A determines that the current long-term rolling average target is stale and sheds, the long-term rolling average constraint must be reset. Without CPU 705B furnishing a fresh new long-term rolling average target, CPU 705A has no long-term guidance or target. Accordingly, in such a case CPU 705A increases the safety margin of process operations.

For example, if the rolling-average period is relatively short, e.g. 4 to 8 hours, and the subsystem is operating under base-load conditions, CPU 705A might increase the stale rolling average removal target, by 3 to 5 weight percent, in accordance with the prediction logic 850A. Such an increase should, under such circumstances, establish a sufficient safety margin for continued operations. With respect to operator input necessary to implement the increase, all that is required is entry of a single value, e.g. 3 weight percent, to the prediction logic.

On the other hand, if the rolling-average period is relative long, e.g. 24 or more hours, and/or the subsystem is operating under a non-constant load, the CPU 705A might shed back to a conservative target, in accordance with the prediction logic 850A. One way this can be done is for CPU 705A to use an assumed constant operation at or above the planned subsystem load across the entire period of the rolling average time window. The CPU 705A can then calculate, based on such constant operation, a constant emission target and add a small safety margin or comfort factor that can be determined by site management. To implement this solution in CPU 705A, the prediction logic 850A must include the noted functionality. It should, however, be recognized that, if desired, the functionality to set this conservative target could be implemented in the DCS rather than the CPU 705A. It would also be possible to implement the conservative target as a secondary CV in the tier 1 controller 705A and only enable this CV when the short-term rolling average target 1200 is stale.

Thus, whether the rolling-average period is relative short or long and/or the subsystem is operating under a constant or non-constant load, preferably the prediction logic 850A includes the shed-limits, so that operator action is not required. However, other techniques could also be employed to establish a shed limit—so long as the technique establishes safe/conservative operation with respect to the rolling average constraint during periods when the CPU 705B is not providing fresh, new, long-term rolling average targets.

It should be noted that actual $SO_2$ emissions are tracked by the MPCC 700 in the process historian database 1210 whether or not the CPU 705B is operating properly or furnishing fresh, new, long-term rolling average targets to CPU 705A. The stored emissions can therefore be used by CPU 705B to track and account for $SO_2$ emissions that occur even when CPU 705B is not operating or communicating properly with CPU 705A. However, after the CPU 705B is once again operating and capable of communicating properly, it will, in accordance with the prediction logic 850B, re-optimize the rolling average emissions and increase or decrease the current rolling average emission target being utilized by CPU 705A to adjust for the actual emissions that occurred during the outage, and provide the fresh, new, long-term rolling average target to CPU 705A via communications link 1000.

On-Line Implementation

Figure 13:
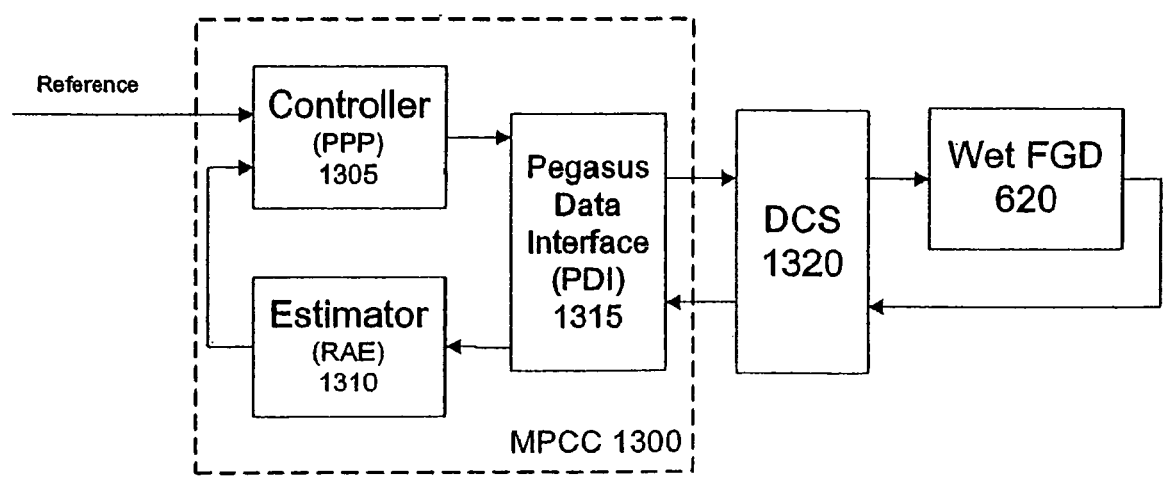
FIG. 13 depicts a functional block diagram of the interfacing of an MPCC, incorporating an estimator, with the DCS for the WFGD process, in accordance with the present invention.

FIG. 13 depicts a functional block diagram of the interfacing of an MPCC 1300 with the DCS 1320 for the WFGD process 620. The MPCC 1300 incorporates both a controller 1305, which may be similar to controller 610 of FIG. 6, and an estimator 1310, which may be similar to estimator 630 of FIG. 6. The MPCC 1300 could, if desired, be the MPCC shown in FIGS. 7 and 8. The MPCC 1300 could also be configured using a multi-tier architecture, such as that shown in FIGS. 10 and 12.

As shown, the controller 1305 and estimator 1310 are connected to the DCS 1320 via a data Interface 1315, which could be part of the interface 830 of FIG. 8. In this preferred implementation, the data interface 1315 is implemented using a Pegasus™ Data Interface (PDI) software module. However, this is not mandatory and the data interface 1315 could be implemented using some other interface logic. The data interface 1315 sends setpoints for manipulated MVs and read PVs. The setpoints may be sent as I/O signals 805 of FIG. 8.

In this preferred implementation, the controller 1305 is implemented using the Pegasus™ Power Perfecter (PPP), which is composed of three software components: the data server component, the controller component and the graphical user interface (GUI) component. The data server component is used to communicate with PDI and collect local data related to the control application. The controller component executes the prediction logic 850 to perform model predictive control algorithmic calculations in view of the dynamic control model 870. The GUI component displays, e.g. on display 730, the results of these calculations and provides an interface for tuning the controller. Here again, the use of the Pegasus™ Power Perfecter is not mandatory and the controller 1305 could be implemented using some other controller logic.

In this preferred implementation, the estimator 1310 is implemented using the Pegasus™ Run-time Application Engine (RAE) software module. The RAE communicates directly with the PDI and the PPP. The RAE is considered to provide a number of features that make it a very cost-effective environment to host the VOA. Functionality for error checking logic, heartbeat monitoring, communication and computer process watchdog capability, and alarming facilities are all beneficially implemented in the RAE. However, once again, the use of the Pegasus™ Run-time Application Engine is not mandatory and the estimator 1315 could be implemented using some other estimator logic. It is also possible, as will be recognized by those skilled in the art, to implement a functionally equivalent VOA in the DCS for the WFGD 620, if so desired.

The controller 1305, estimator 1310 and PDI 1315 preferably execute on one processor, e.g. processor 810 of FIG. 8 or 810A of FIG. 10, that is connected to a control network including the DCS 1320 for the WFGD process 620, using an Ethernet connection. Presently, it is typically that the processor operating system be Microsoft Windows™ based, although this is not mandatory. The processor may also be part of high power workstation computer assembly or other type computer, as for example shown in FIG. 7. In any event, the processor, and its associated memory must have sufficient computation power and storage to execute the logic necessary to perform the advanced WFGD control as described herein.

DCS Modifications

As described above with reference to FIG. 13, the controller processor executing the prediction logic 850 interfaces to the DCS 1320 for the WFGD process 620 via interface 1315. To facilitate proper interfacing of the controller 1305 and DCS 1320, a conventional DCS will typically require modification. Accordingly, the DCS 1320 is beneficially a conventional DCS that has been modified, in a manner well understood in the art, such that it includes the features described below.

The DCS 1320 is advantageously adapted, i.e. programmed with the necessary logic typically using software, to enable the operator or other user to perform the following functions from the DCS interface screen:

Change the CONTROL MODE of the PPP between auto and manual.
View the CONTROLLER STATUS.
View status of WATCHDOG TIMER ("HEARTBEAT").
View MV attributes for STATUS, MIN, MAX, CURRENT VALUE.
ENABLE each MV or turn each MV to off.
View CV attributes for MIN, MAX, and CURRENT value.
Enter lab values for gypsum purity, absorber chemistry and limestone characteristics.

Figure 14A:
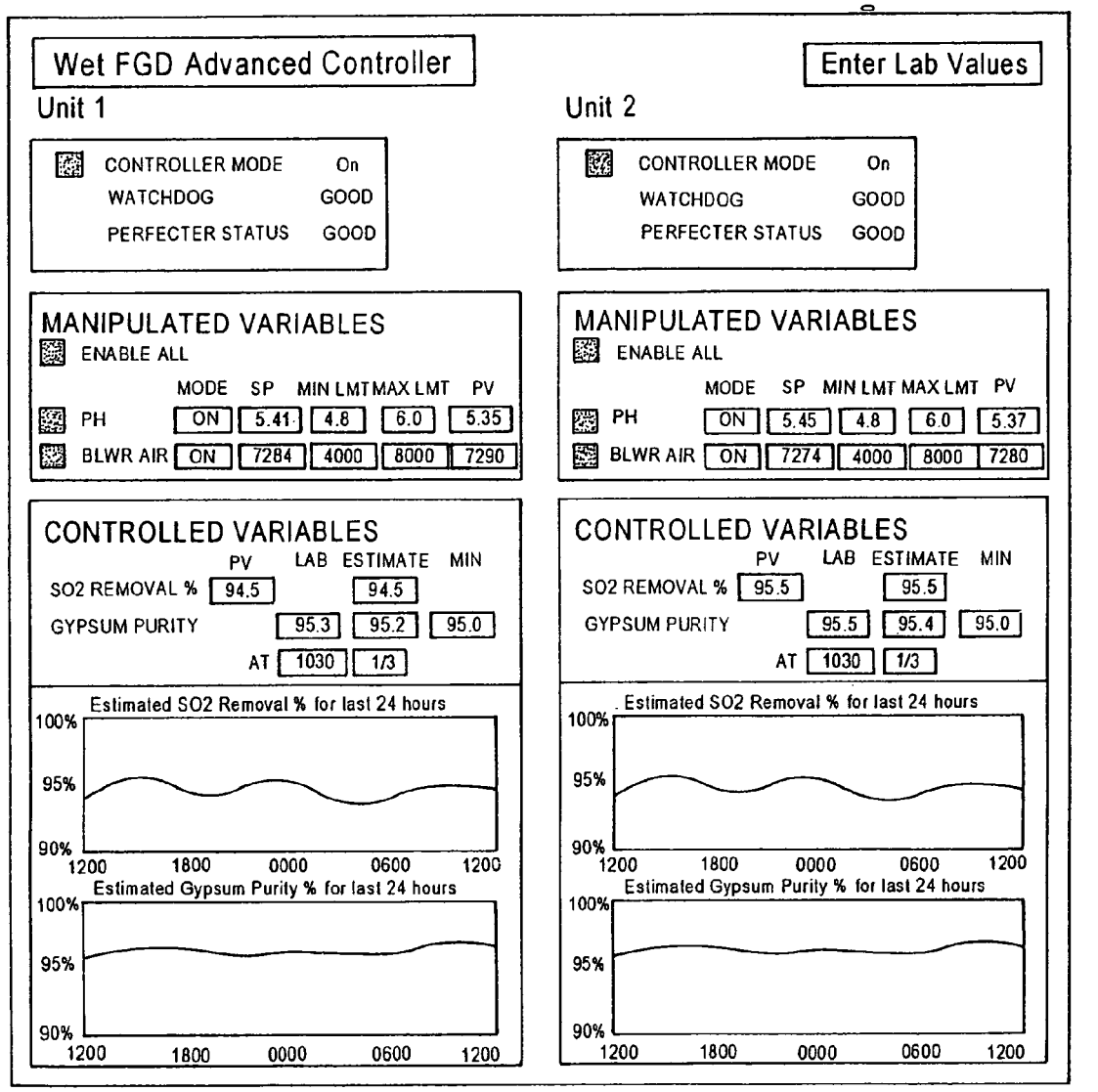
FIG. 14A depicts a DCS screen for monitoring the MPCC control, in accordance with the present invention.

As an aid for user access to this functionality, the DCS 1320 is adapted to display two new screens, as shown in FIGS. 14A and 14B. The screen 1400 in FIG. 14A is used by the operator or other user to monitor the MPCC control and the screen 1450 in FIG. 14B is used by the operator or other user to enter lab and/or other values as may be appropriate.

For convenience and to avoid complexity unnecessary to understanding the invention, items such as operational costs are excluded from the control matrix for purposes of the following description. However, it will be understood that operational costs are easily, and may in many cases be preferably, included in the control matrix. In addition for convenience and to simplify the discussion, recycle pumps are treated as DVs rather than MVs. Here again, those skilled in the art will recognize that, in many cases, it may be preferable to treat the recycle pumps as MVs. Finally, it should be noted that in the following discussion it is assumed that the WFGD subsystem has two absorber towers and two associated MPCCs (one instance of the MPCC for each absorber in the WFGD subsystem).

Advanced Control DCS Screens

Referring now to FIG. 14A, as shown the screen 1400 includes a CONTROLLER MODE that is an operator/user-selected tag that can be in auto or manual. In AUTO, the controller 1305 executing the prediction logic 850, e.g. Pegasus™ Power Perfecter, computes MV movements and executes the control generator logic 860 to direct control signals implementing these movements to the DCS 1320. The controller 1305 executing the prediction logic 850 will not calculate MV moves unless the variable is enabled, i.e. is designated AUTO.

The controller 1305 executing prediction logic 850, such as Pegasus™ Power Perfecter, includes a watchdog timer or "heartbeat" function that monitors the integrity of the communications interface 1315 with the DCS 1320. An alarm indicator (not shown) will appear on the screen if the communications interface 1315 fails. The controller 1305 executing prediction logic 850 will recognize an alarm status, and based on the alarm status will initiate shedding of all enabled, i.e. active, selections to a lower level DCS configuration.

The screen 1400 also includes a PERFECTER STATUS, which indicates whether or not the prediction logic 850 has been executed successfully by the controller 1305. A GOOD status (as shown) is required for the controller 1305 to remain in operation. The controller 1305 executing prediction logic 850 will recognize a BAD status and, responsive to recognizing a BAD status, will break all the active connections, and shed, i.e. return control to the DCS 1320.

As shown, MVs are displayed with the following information headings:

ENABLED—This field can be set by an operator or other user input to the controller 1305 executing prediction logic 850, to enable or disable each MV. Disabling the MV corresponds to turning the MV to an off status.

SP—Indicates the prediction logic 850 setpoint.

MODE—Indicates whether prediction logic 850 recognizes the applicable MV as being on, on hold, or completely off.

MIN LMT—Displays the minimum limit being used by the prediction logic 850 for the MV. It should be noted that preferably these values cannot be changed by the operator or other user.

MAX LMT—Displays the maximum limit being used by the prediction logic 850 for the MV. Here again, preferably these values cannot be changed.

PV—Shows the latest or current value of each MV as recognized by the prediction logic 850.

The screen 1400 further includes details of the MV status field indicators as follows:

The controller 1305 executing prediction logic 850 will only adjust a particular MV if it's MODE is ON. Four conditions must be met for this to occur. First, the enable box must be selected by the operator or other user. The DCS 1320 must be in auto mode. The shed conditions must be false, as computed by the controller 1305 executing prediction logic 850. Finally, hold conditions must be false, as computed by the controller 1305 executing prediction logic 850.

The controller 1305 executing prediction logic 850 will change and display an MV mode status of HOLD if conditions exist that will not allow controller 1305 to adjust that particular MV. When in HOLD status, the controller 1305, in accordance with the prediction logic 850, will maintain the current value of the MV until it is able to clear the hold condition. For the MV status to remain in HOLD, four conditions must be satisfied. First, the enable box must be selected by the operator or other user. The DCS 1320 must be in auto mode. The shed conditions must be false, as computed by the controller 1305 executing prediction logic 850. Finally, the hold conditions must be true, as computed by the controller 1305 executing prediction logic 850.

The controller 1305 executing prediction logic 850 will change the MV mode status to off, and display on off mode status, if conditions exist that will not allow controller 1305 to adjust that particular MV based on any of the following conditions. First, the enable box for the control mode is deselected by the operator or other user. The DCS mode is not in auto, e.g. is in manual. Any shed condition is true, as computed by the controller 1305 executing prediction logic 850.

The controller 1305, executing prediction logic 850, will recognize various shed conditions, including the failure of the estimator 1310 to execute and the failure to enter lab values during a predefined prior period, e.g. in last 12 hours. If the controller 1305, executing prediction logic 850, determines that any of the above shed conditions are true, it will return control of the MV to the DCS 1320.

As also shown in FIG. 14A, CVs are displayed with the following information headings:

PV—Indicates the latest sensed value of the CV received by the controller 1305.

LAB—Indicates the latest lab test value along with time of the sample received by the controller 1305.

ESTIMATE—Indicates the current or most recent CV estimate generated by the estimator 1310, executing the estimation logic 840 based on the dynamic estimation model.

MIN—Displays the minimum limit for the CV.

MAX—Displays the maximum limit for the CV.

In addition, the screen 1400 displays trend plots over some predetermined past period of operation, e.g. over the past 24 hours of operation, for the estimated values of the CVs.

Lab Sample Entry Form

Referring now to FIG. 14B, a prototype Lab Sample Entry Form DCS screen 1450 is displayed to the operator or other user. This screen can be used by the operator or other user to enter the lab sample test values that will be processed by the estimator 1310 of FIG. 13, in accordance with the estimation logic 840 and dynamic estimation model 880, as previously described with reference to FIG. 8.

As shown in FIG. 14B, the following values are entered along with an associated time stamp generated by the estimator 1310:

Unit 1 Lab Sample Values:
Gypsum Purity
Chloride
Magnesium
Fluoride
Unit 2 Lab Sample Values:
Gypsum Purity
Chloride
Magnesium
Fluoride
Unit 1 and Unit 2 Combined Lab Sample Values:
Gypsum Purity
Limestone Purity
Limestone Grind The operator or other user enters the lab test values along with the associated sample time, for example using the keyboard 720 shown in FIG. 7. After entry of these values, the operator will activate the update button, for example using the mouse 725 shown in FIG. 7. Activation of the update button will cause the estimator 1310 to update the values for these parameters during the next execution of the estimation logic 840. It should be noted that, if desired, these lab test values could alternatively be automatically fed to the MPCC 1300 from the applicable lab in digitized form via the interface of the MPCC processing unit, such as the interface 830 shown in FIG. 8. Furthermore, the MPCC logic could be easily adapted, e.g. programmed, to automatically activate the update function represented by the update button responsive to the receipt of the test values in digitized form from the applicable lab or labs.

To ensure proper control of the WFGD process, lab test values for gypsum purity should be updated every 8 to 12 hours. Accordingly, if the purity is not updated in that time period, the MPCC 1300 is preferably configured, e.g. programmed with the necessary logic, to shed control and issue an alarm.

In addition, absorber chemistry values and limestone characteristic values should be updated at least once a week. Here again, if these values are not updated on time, the MPCC 1300 is preferably configured to issue an alarm.

Validation logic is included in the estimation logic 840 executed by the estimator 1310 to validate the operator input values. If the values are incorrectly input, the estimator 1310, in accordance with the estimation logic 840, will revert to the previous values, and the previous values will continue to be displayed in FIG. 14B and the dynamic estimation model will not be updated.

Overall WFGD Operations Control

The control of the overall operation of a WFGD subsystem by an MPCC, of any of the types discussed above, will now be described with references to FIG. 15A, 15B, 16, 17, 18 and 19.

Figure 15A:
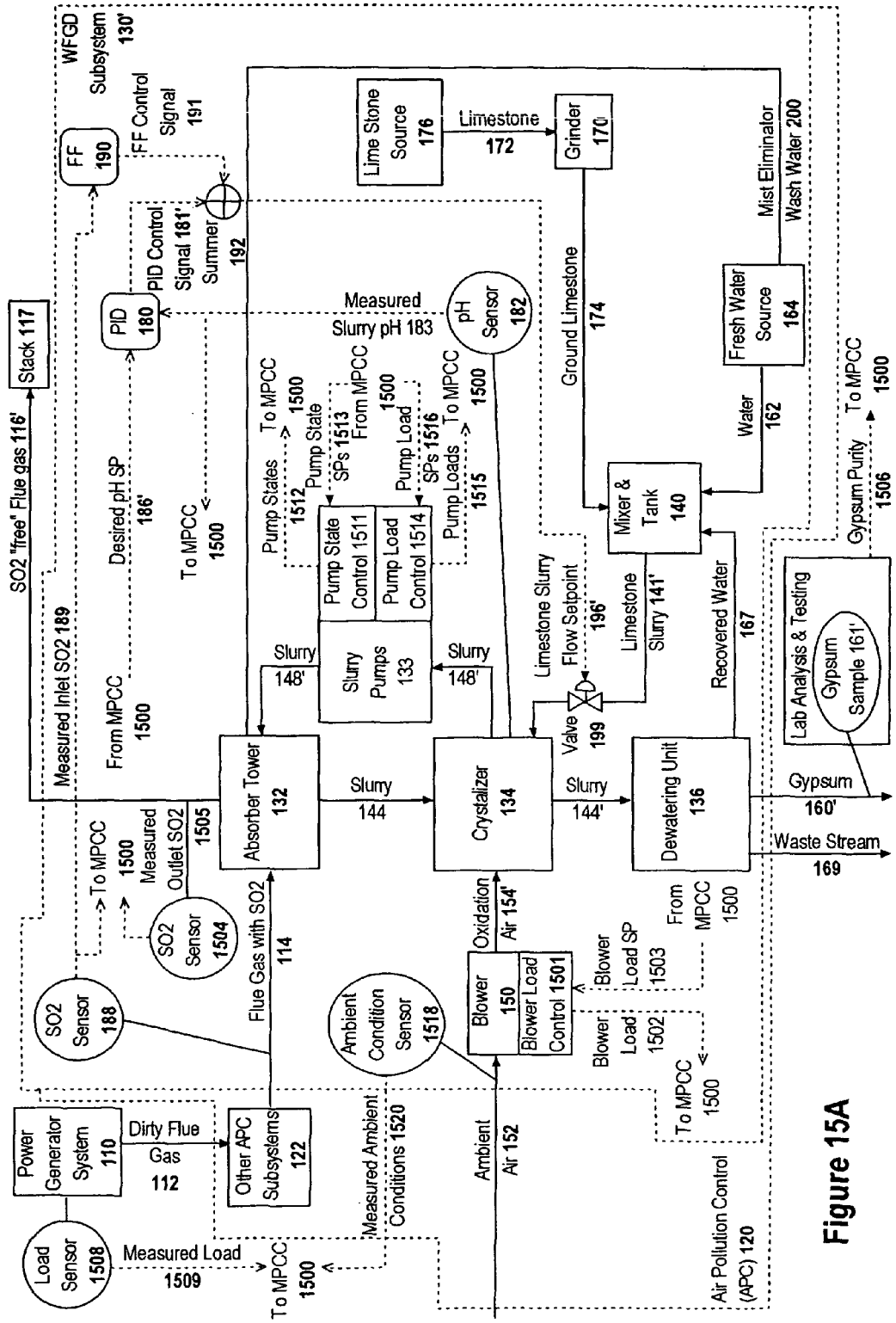
FIG. 15A depicts a WFGD subsystem with overall operations of the subsystem controlled by an MPCC, in accordance with the present invention.

FIG. 15A depicts a power generation system (PGS) 110 and air pollution control (APC) system 120 similar to that described with reference to FIG. 1, with like reference numerals identifying like elements of the systems, some of which may not be further described below to avoid unnecessary duplication.

As shown, the WFGD subsystem 130' includes a multivariable control, which in this exemplary implementation is performed by MPCC 1500, which may be similar to MPCC 700 or 1300 describe above and which, if desired, could incorporate a multi-tier architecture of the type described with reference to FIGS. 10-12.

Flue gas 114 with $SO_2$ is directed from other APC subsystems 122 to the absorber tower 132. Ambient air 152 is compressed by a blower 150 and directed as compressed oxidation air 154' to the crystallizer 134. A sensor 1518 detects a measure of the ambient conditions 1520. The measured ambient conditions 1520 may, for example, include temperature, humidity and barometric pressure. The blower 150 includes a blower load control 1501 which is capable of providing a current blower load value 1502 and of modifying the current blower load based on a received blower load SP 1503.

As also shown, limestone slurry 148', is pumped by slurry pumps 133 from the crystallizer 134 to the absorber tower 132. Each of the slurry pumps 133 includes a pump state control 1511 and pump load control 1514. The pump state control 1511 is capable of providing a current pump state value 1512, e.g. indicating the pump on/off state, and of changing the current state of the pump based on a received pump state SP 1513. The pump load control 1514 is capable of providing a current pump load value 1515 and of changing the current pump load based on a pump load SP 1516. The flow of fresh limestone slurry 141' from the mixer & tank 140 to the crystallizer 134 is controlled by a flow control valve 199 based on a slurry flow SP 196'. The slurry flow SP 196' is based on a PID control signal 181' determined based on a pH SP 186', as will be discussed further below. The fresh slurry 141' flowing to the crystallizer 134 serves to adjust the pH of the slurry used in the WFGD process, and therefore to control the removal of $SO_2$ from the $SO_2$ laden flue gas 114 entering the absorber tower 132.

As has been previously discussed above, the $SO_2$ laden flue gas 114 enters the base of the absorber tower 132. $SO_2$ is removed from the flue gas 114 in the absorber tower 132. The clean flue gas 116', which is preferably free of $SO_2$, is directed from the absorber tower 132 to, for example the stack 117. An $SO_2$ analyzer 1504, which is shown to be at the outlet of the absorber tower 132 but could be located at the stack 117 or at another location downstream of the absorber tower 132, detects a measure of the outlet $SO_2$ 1505.

Figure 15B:
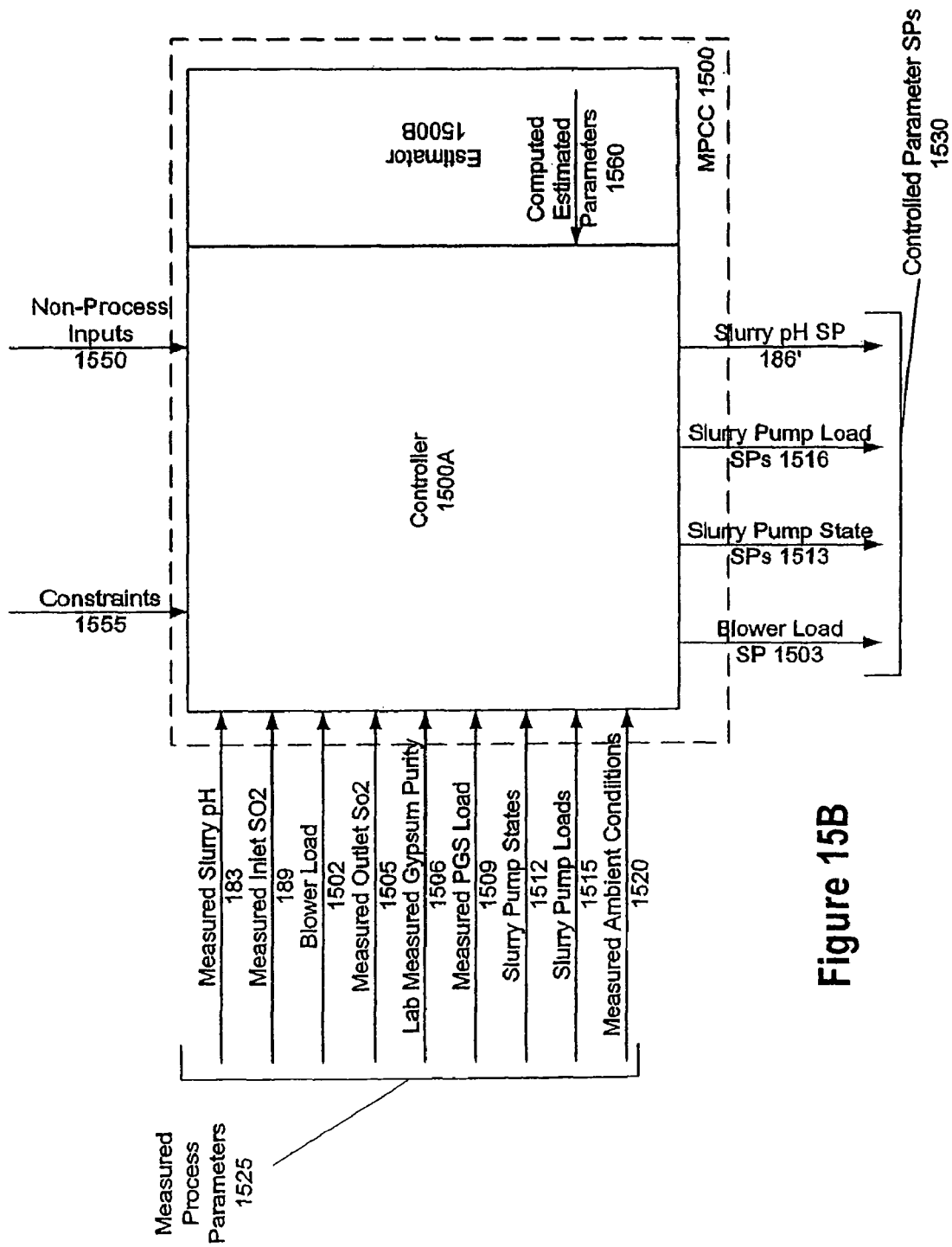
FIG. 15B depicts the MPCC which controls the WFGD subsystem shown in FIG. 15A, in accordance with the present invention.

On the control side of the subsystem 130', the multivariable process controller for the WFGD process, i.e. MPCC 1500 shown in FIG. 15B, receives various inputs. The inputs to the MPCC 1500 include the measured slurry pH 183, measured inlet $SO_2$ 189, the blower load value 1502, the measured outlet $SO_2$ 1505, the lab tested gypsum purity value 1506, the measured PGS load 1509, the slurry pump state values 1512, the slurry pump load values 1515, and the measured ambient conditions values 1520. As will be described further below, these process parameter inputs, along with other inputs including non-process inputs 1550 and constraint inputs 1555, and computed estimated parameter inputs 1560, are used by the MPCC 1500 to generate controlled parameter setpoints (SPs) 1530.

In operation, $SO_2$ analyzer 188, located at or upstream of the WFGD absorber tower 132, detects a measure of the inlet $SO_2$ in the flue gas 114. The measured value 189 of the inlet $SO_2$ is fed to the feed forward unit 190 and MPCC 1500. The load of the power generation system (PGS) 110 is also detected by a PGS load sensor 1508 and fed, as measured PGS load 1509, to the MPCC 1500. Additionally, $SO_2$ analyzer 1504 detects a measure of the outlet $SO_2$ in the flue gas leaving the absorber tower 132. The measured value 1505 of the outlet $SO_2$ is also fed to the MPCC 1500.

Estimating Gypsum Quality

Figure 19:
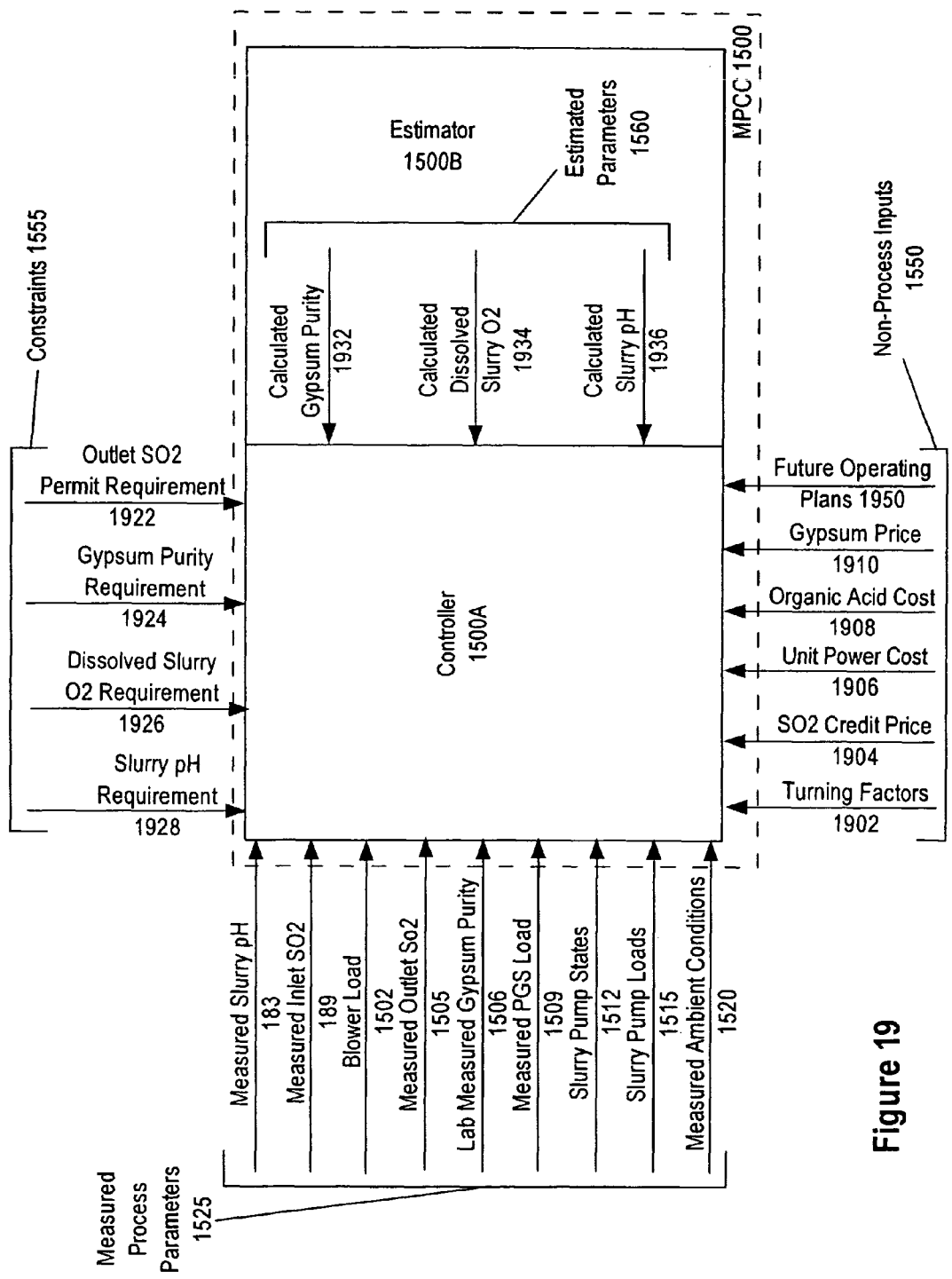
FIG. 19 further details aspects of the MPCC shown in FIG. 15B, in accordance with the present invention.

Referring now also to FIG. 19, the parameters input to the MPCC 1500 include parameters reflecting the ongoing conditions within the absorber tower 132. Such parameters can be use by the MPCC 1500 to generate and update a dynamic estimation model for the gypsum. The dynamic estimation model for the gypsum could, for example, form a part of dynamic estimation model 880.

As there is no practical way to directly measure gypsum purity on-line, the dynamic gypsum estimation model can be used, in conjunction with estimation logic executed by the estimator 1500B of MPCC 1500, such as estimation logic 840, to compute an estimation of the gypsum quality, shown as calculated gypsum purity 1932. The estimator 1500B is preferably a virtual on-line analyzer (VOA). Although the controller 1500A and estimator 1500B are shown to be housed in a single unit, it will be recognized that, if desired, the controller 1500A and estimator 1500B could be housed separately and formed of separate components, so long as the controller 1500A and estimator 1500B units were suitably linked to enable the required communications. The computed estimation of the gypsum quality 1932 may also reflect adjustment by the estimation logic based on gypsum quality lab measurements, shown as the gypsum purity value 1506, input to the MPCC 1500.

The estimated gypsum quality 1932 is then passed by the estimator 1500B to the controller 1500A of the MPCC 1500. The controller 1500A uses the estimated gypsum quality 1932 to update a dynamic control model, such as dynamic control model 870. Prediction logic, such as prediction logic 850, is executed by the controller 1500A, in accordance with the dynamic control model 870, to compare the adjusted estimated gypsum quality 1932 with a gypsum quality constraint representing a desired gypsum quality. The desired gypsum quality is typically established by a gypsum sales contract specification. As shown, the gypsum quality constraint is input to the MPCC 1500 as gypsum purity requirement 1924, and is stored as data 885.

The controller 1500A, executing the prediction logic, determines if, based on the comparison results, adjustment to the operation of the WFGD subsystem 130' is required. If so, the determined difference between the estimated gypsum quality 1932 and the gypsum quality constraint 1924 is used by the prediction logic being executed by the controller 1500A, to determine the required adjustments to be made to the WFGD subsystem operations to bring the quality of the gypsum 160' within the gypsum quality constraint 1924.

Maintaining Compliance with Gypsum Quality Requirements

To bring the quality of the gypsum 160' into alignment with the gypsum quality constraint 1924, the required adjustments to the WFGD operations, as determined by the prediction logic, are fed to control generator logic, such as control generator logic 860, which is also executed by controller 1500A. Controller 1500A executes the control generator logic to generate control signals corresponding to required increase or decrease in the quality of the gypsum 160'.

These control signals might, for example, cause an adjustment to the operation of one or more of valve 199, the slurry pumps 133 and the blower 150, shown in FIG. 15A, so that a WFGD subsystem process parameter, e.g. the measured pH value of slurry 148' flowing from the crystallizer 134 to the absorber tower 132, which is represented by measured slurry pH value 183 detected by pH sensor 182 in FIG. 15A, corresponds to a desired setpoint (SP), e.g. a desired pH value. This adjustment in the pH value 183 of the slurry 148' will in turn result in a change in the quality of the gypsum byproduct 160' actually being produce by WFGD subsystem 130', and in the estimated gypsum quality 1932 computed by the estimator 1500B, to better correspond to the desired gypsum quality 1924.

Figure 16:
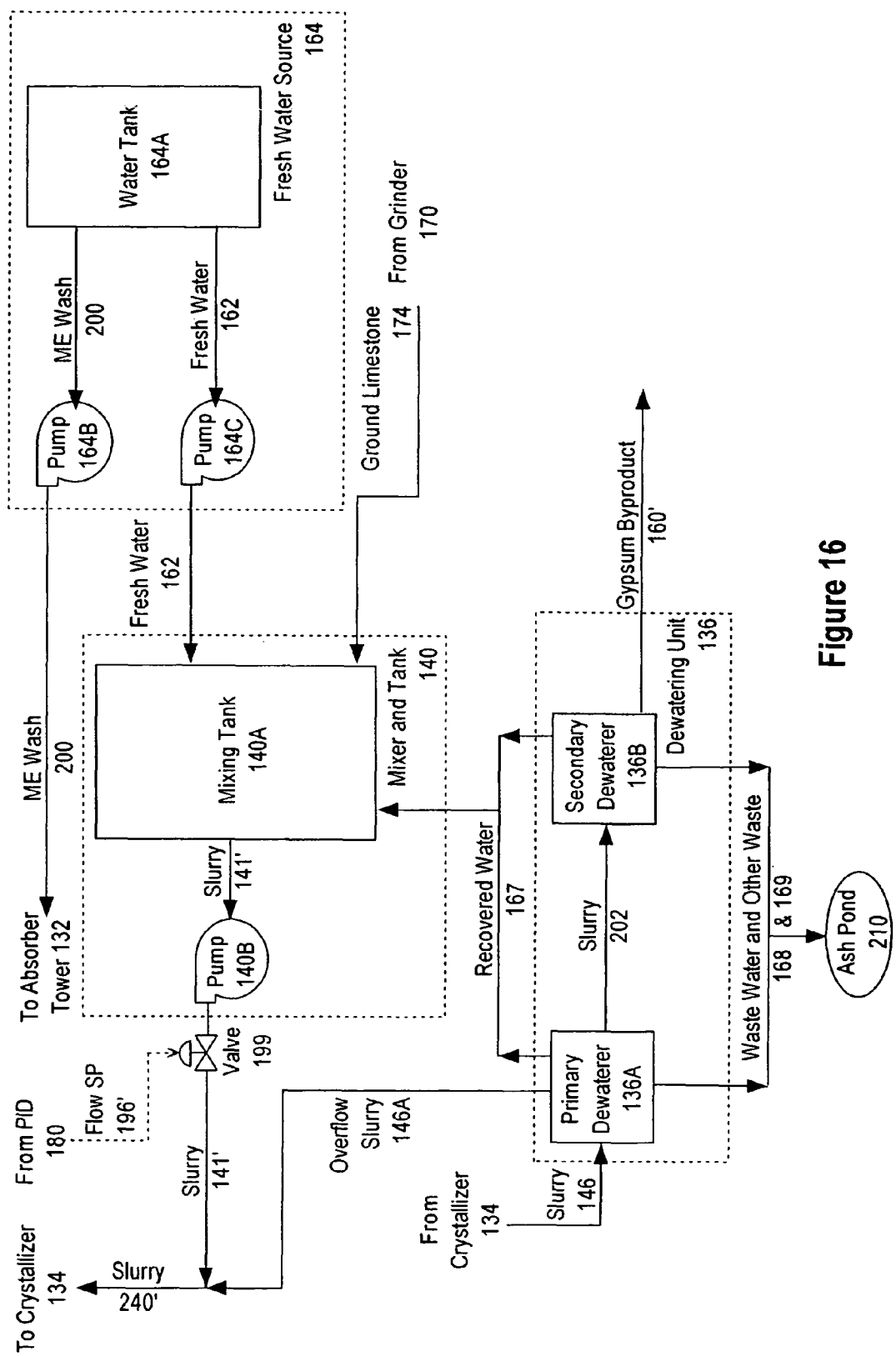
FIG. 16 depicts further details of certain aspects of the WFGD subsystem shown in FIG. 15A in accordance with the present invention, which correspond to those shown in FIG. 2.

Referring now also to FIG. 16, which further details the structure and operation of the fresh water source 164, mixer/tank 140 and dewatering unit 136. As shown, the fresh water source 164 includes a water tank 164A from which an ME wash 200 is pumped by pump 164B to the absorber tower 132 and a fresh water source 162 is pumped by pump 164C to the mixing tank 140A.

Operation and control of the dewatering unit 136 is unchanged by addition of the MPCC 1500.

Operation and control of the limestone slurry preparation area, including the grinder 170 and the Mixer/Tank 140, are unchanged by addition of the MPCC 1500.

Referring now to FIGS. 15A, 15B and 16, the controller 1500A may, for example, execute the control generator logic to direct a change in the flow of limestone slurry 141' to the crystallizer 134. The volume of slurry 141' that flows to the crystallizer 134, is controlled by opening and closing valve 199. The opening and closing of the valve 199 is controlled by PID 180. The operation of the PID 180 to control the operation of the valve 199 is based on an input slurry pH setpoint.

Accordingly, to properly control the flow of slurry 141' to the crystallizer 134, the controller 1500A determines the slurry pH setpoint that will bring the quality of the gypsum 160' into alignment with the gypsum quality constraint 1924. As shown in FIGS. 15A and 16, the determined slurry pH setpoint, shown as pH SP 186', is transmitted to the PID 180. The PID 180 then controls the operation of valve 199 to modify the slurry flow 141' to correspond with the received pH SP 186'.

To control the operation of valve 199, the PID 180 generates a PID control signal 181', based on the received slurry pH SP 186' and the received pH value 183 of the slurry 141' measured by the pH sensor 182. The PID control signal 181' is combined with the feed forward (FF) control signal 191, which is generated by the FF unit 190. As is well understood in the art, the FF control signal 191 is generated based on the measured inlet $SO_2$ 189 of the flue gas 114, received from an $SO_2$ analyzer 188 located upstream of the absorber tower 132. PID control signal 181' and (FF) control signal 191 are combined at summation block 192, which is typically included as a built-in feature in the DCS output block that communicates to the valve 199. The combined control signals leaving the summation block 192 are represented by the slurry flow setpoint 196'.

The slurry flow setpoint 196' is transmitted to valve 199. Conventionally, the valve 199 valve includes another PID (not shown) which directs the actual opening or closing of the valve 199 based on the received slurry flow setpoint 196', to modify the flow of slurry 141' through the valve. In any event, based on the received slurry flow setpoint 196', the valve 199 is opened or closed to increase or decreases the volume of slurry 141', and therefore the volume of slurry 141', flowing to the crystallizer 134, which in turn modifies pH of the slurry in the crystallizer 134 and the quality of the gypsum 160' produced by the WFGD subsystem 130'.

Factors to be considered in determining when and if the MPCC 1500 is to reset/update the pH setpoint at the PID 180 and/or the PID 180 is to reset/update the limestone slurry flow setpoint at the valve 199 can be programmed, using well know techniques, into the MPCC 1500 and/or PID 180, as applicable. As is well understood by those skilled in the art, factors such as the performance of PID 180 and the accuracy of the pH sensor 182 are generally considered in such determinations.

The controller 1500A generates the pH SP 186' by processing the measured pH value of the slurry 148' flowing from the crystallizer 134 to the absorber tower 132 received from the pH sensor 182, represented by slurry pH 183, in accordance with a gypsum quality control algorithm or look-up table, in the dynamic control model 870. The algorithm or look-up table represents an established linkage between the quality of the gypsum 160' and the measured pH value 183.

The PID 180 generates the PID control signal 181' by processing the deference between the pH SP 186' received from the controller 1500A and the measured pH value of the slurry 148' received from the pH sensor 182, represented by slurry pH 183, in accordance with a limestone flow control algorithm or look-up table. This algorithm or look-up table represents an established linkage between the amount of change in the volume of the slurry 141' flowing from the mixer/tank 140 and the amount of change in the measured pH value 183 of the slurry 148' flowing from the crystallizer 134 to the absorber tower 132. It is perhaps worthwhile to note that although in the exemplary embodiment shown in FIG. 16, the amount of ground limestone 174 flowing from the grinder 170 to the mixing tank 140A is managed by a separate controller (not shown), if beneficial this could also be controlled by the MPCC 1500. Additionally, although not shown the MPCC 1500 could, if desired, also control the dispensing of additives into the slurry within the mixing tank 140A Accordingly, based on the received pH SP 186' from the controller 1500A of the MPCC 1500, the PID 180 generates a signal, which causes the valve 199 to open or close, thereby increasing or decreasing the flow of the fresh limestone slurry into the crystallizer 134. The PID continues control of the valve adjustment until, the volume of limestone slurry 141' flowing through the valve 199 matches the MVSP represented by the limestone slurry flow setpoint 196'. It will be understood that preferably the matching is performed by a PID (not shown) included as part of the valve 199. However, alternatively, the match could be performed by the PID 180 based on flow volume data measured and transmitted back from the valve.

Maintaining Compliance with SO$_2$ Removal Requirements

By controlling the pH of the slurry 148', the MPCC 1500 can control the removal of SO$_2$ from the SO$_2$ laden flue gas 114 along with the quality of the gypsum byproduct 160' produced by the WFGD subsystem. Increasing the pH of the slurry 148' by increasing the flow of fresh limestone slurry 141' through valve 199 will result in the amount of SO$_2$ removed by the absorber tower 132 from the SO$_2$ laden flue gas 114 being increased. On the other hand, decreasing the flow limestone slurry 141' through valve 199 decreases the pH of the slurry 148'. Decreasing the amount of absorbed SO$_2$ (now in the form of calcium sulfite) flowing to the crystallizer 134 will also will result in a higher percentage of the calcium sulfite being oxidized in the crystallizer 134 to calcium sulfate, hence yielding a higher gypsum quality.

Thus, there is a tension between two primary control objectives, the first being to remove the SO$_2$ from the SO$_2$ laden flue gas 114, and the second being to produce a gypsum byproduct 160' having the required quality. That is, there may be a control conflict between meeting the SO$_2$ emission requirements and the gypsum specification.

Figure 3:
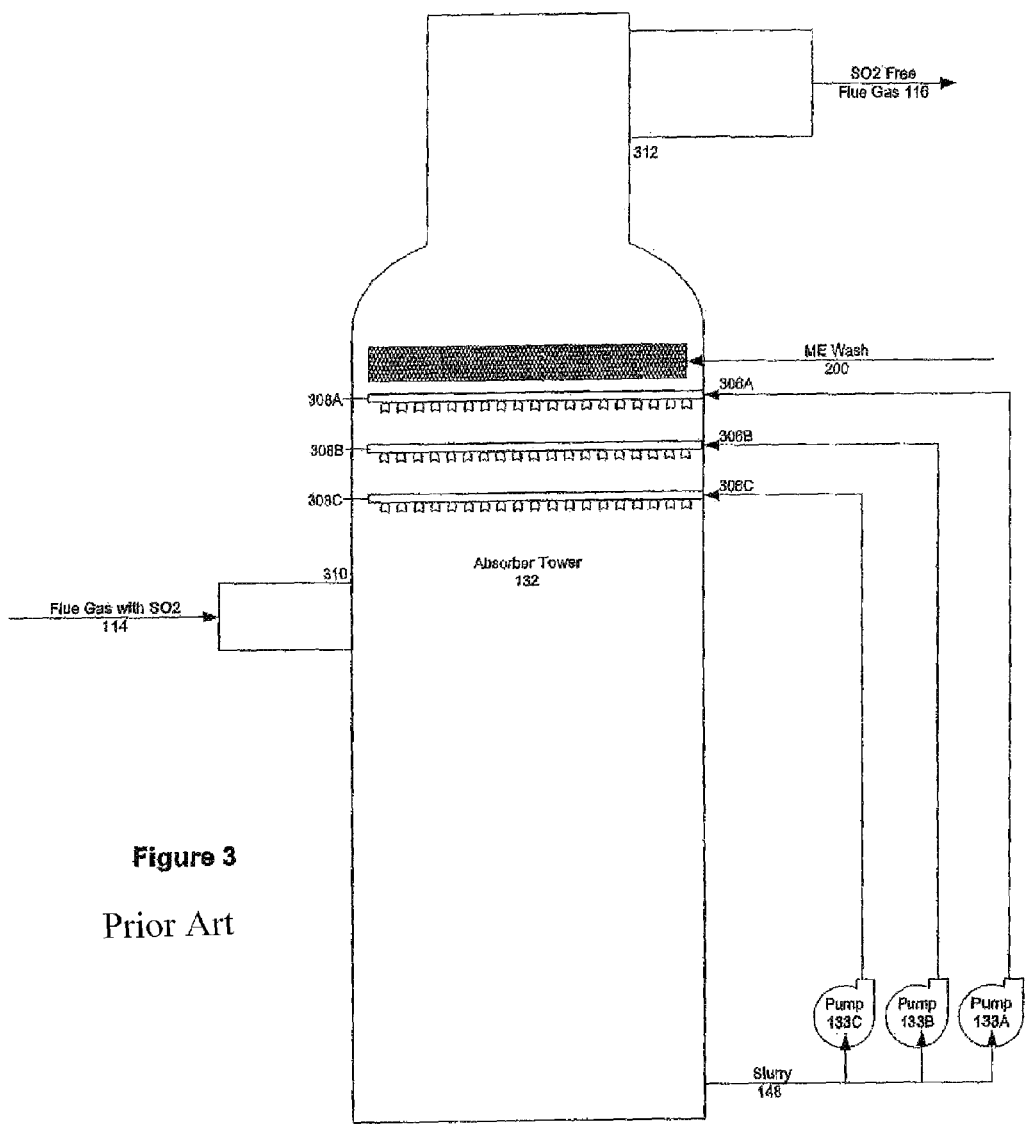
FIG. 3 further details other aspects of the WFGD subsystem shown in FIG. 1.
Figure 4:
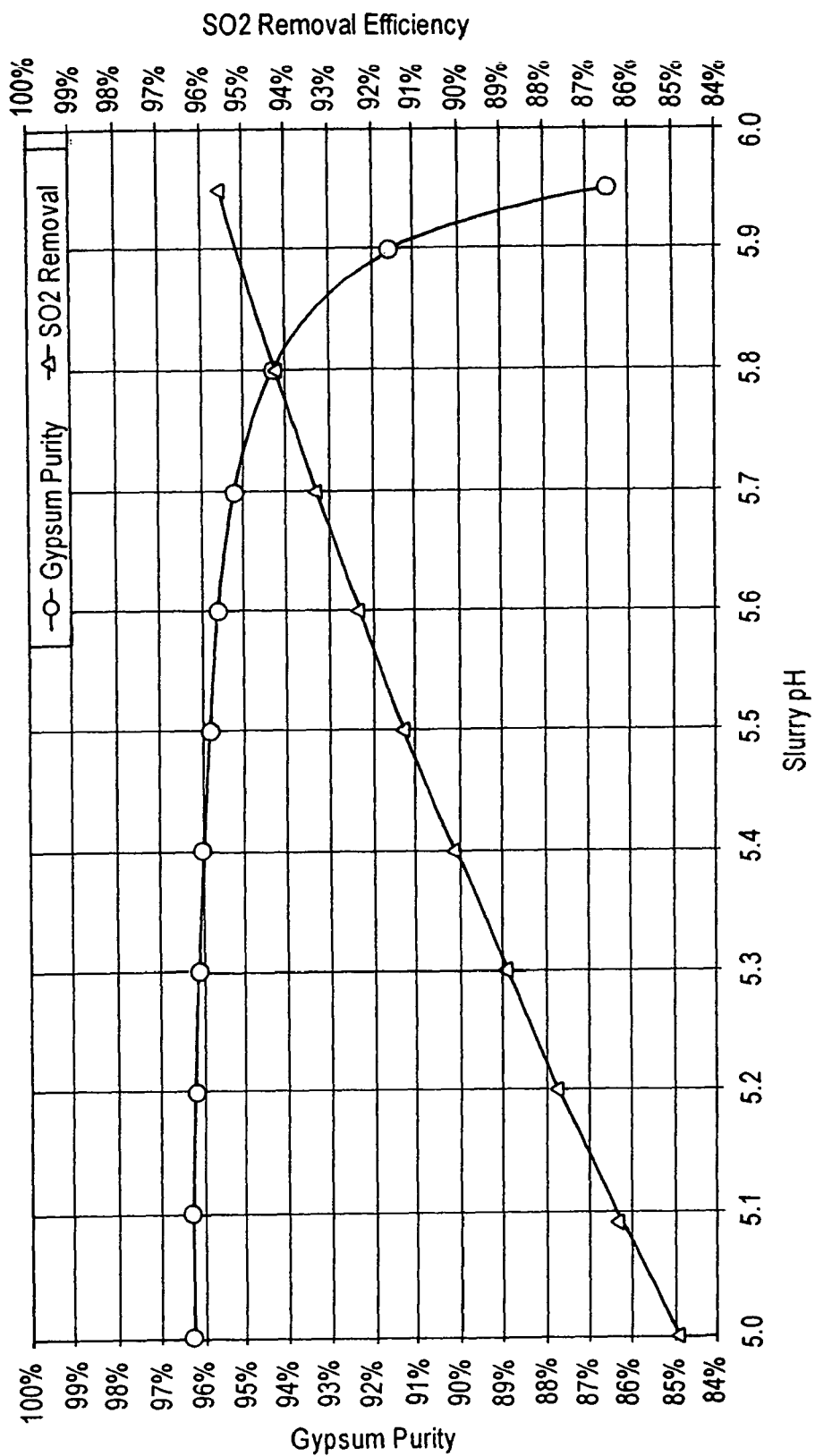
FIG. 4 is a graph of $SO_2$ removal efficiency vs. gypsum purity as a function of pH.
Figure 17:
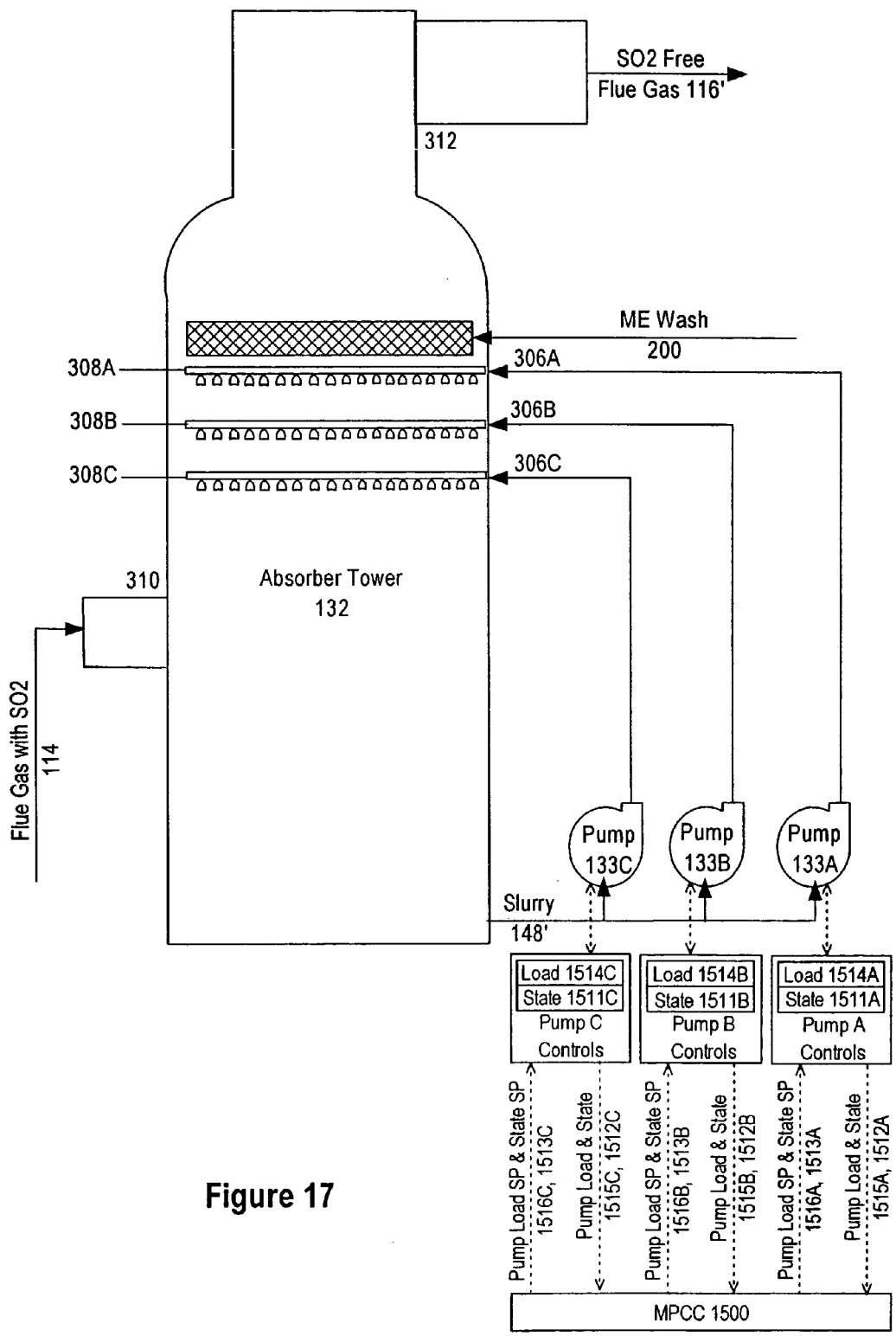
FIG. 17 further details other aspects of the WFGD subsystem shown in FIG. 15A in accordance with the present invention, which correspond to those shown in FIG. 3.

Referring now also to FIG. 17, which further details the structure and operation of the slurry pumps 133 and absorber tower 132. As shown, the slurry pumps 133 include multiple separate pumps, shown as slurry pumps 133A, 133B and 133C in this exemplary embodiment, which pump the slurry 148' from the crystallizer 134 to the absorber tower 132. As previously described with reference to FIG. 3, each of the pumps 133A-133C directs slurry to a different one of the multiple levels of absorber tower slurry level nozzles 306A, 306B and 306C. Each of the slurry level 306A-306C, directs slurry to a different one of the multiple levels of slurry sprayers 308A, 308B and 308C. The slurry sprayers 308A-308C spray the slurry, in this case slurry 148', into the SO$_2$ laden flue gas 114, which enters the absorber tower 132 at the gas inlet aperture 310, to absorb the SO$_2$. The clean flue gas 116' is then exhausted from the absorber tower 132 at the absorber outlet aperture 312. As also previously described, an ME spray wash 200 is directed into the absorber tower 132. It will be recognized that although 3 different levels of slurry nozzles and sprayers, and three different pumps, are shown, the number of levels of nozzles and sprayers and the number of pumps can and in all likelihood will very depending on the particular implementation.

As shown in FIG. 15A, the pump state values 1512 are fed back from a pump state controls 1511, such as on/off switches, and pump load values 1515 are fed back from pump load controls 1514, such as a motor, to the MPCC 1500 for input to the dynamic control model. As also shown, the pump state setpoints 1513, such as a switch on or off instructions, are fed to the pump state controls 1511, and pump load setpoints 1516 are fed to the pump load controls 1514 by the MPCC 1500 to control the state, e.g. on or off, and load of each of pumps 133A-133C, and thereby control which levels of nozzles the slurry 148' is pumped to and the amount of slurry 148' that is pumped to each level of nozzles. It should be recognized that in most current WFGD applications, the slurry pumps 133 do not include variable load capabilities (just On/Off), so the pump load setpoints 1516 and load controls 1514 would not be available for use or adjustment by the MPCC 1500.

As detailed in the exemplary implementation depicted in FIG. 17, pump state controls 1511 include an individual pump state control for each pump, identified using reference numerals 1511A, 1511B and 1511C. Likewise, pump load controls 1514 include an individual pump state control for each pump, identified using reference numerals 1514A, 1514B and 1514C. Individual pump state values 1512A, 1512B, and 1512C are fed to MPCC 1500 from pump state controls 1511A, 1511B, and 1511C, respectively, to indicate the current state of that slurry pump. Similarly, individual pump load values 1515A, 1515B, and 1515C are fed to MPCC 1500 from pump load controls 1514A, 1514B, and 1514C, respectively, to indicate the current state of that slurry pump. Based on the pump state values 1512A, 1512B, and 1512C, the MPCC 1500, executes the prediction logic 850, to determine the current state of each of pumps 133A, 133B and 133C, and hence what is commonly referred to as the pump line-up, at any given time.

As discussed previously above, a ratio of the flow rate of the liquid slurry 148' entering the absorber tower 132 over the flow rate of the flue gas 114 entering the absorber tower 132, is commonly characterized as the L/G. L/G is one of the key design parameters in WFGD subsystems. Since the flow rate of the flue gas 114, designated as G, is set upstream of the WFGD processing unit 130', typically by the operation of the power generation system 110, it is not, and cannot be, controlled. However, the flow rate of the liquid slurry 148', designated as L, can be controlled by the MPCC 1500 based on the value of G.

One way in which this is done is by controlling the operation of the slurry pumps 133A, 133B and 133C. Individual pumps are controlled by the MPCC 1500, by issuing pump state setpoints 1513A, 1513B and 1513C to the pump state controls 1511A of pump 133A, 1511B of pump 133B and 1511C of pump 133C, respectively, to obtain the desired pump line-up, and hence the levels at which slurry 148' will enter the absorber tower 132. If available in the WFGD subsystem, the MPCC 1500 could also issues pump load control setpoints 1516A, 1516B and 1516C to the pump load controls 1514A of pump 133A, 1514B of pump 133B and 1514C of pump 133C, respectively, to obtain a desired volume of flow of slurry 148' into the absorber tower 132 at each active nozzle level. Accordingly, the MPCC 1500 controls the flow rate, L, of the liquid slurry 148' to the absorber tower 132 by controlling which levels of nozzles 306A-306C the slurry 148' is pumped to and the amount of slurry 148' that is pumped to each level of nozzles. It will be recognized that the greater the number of pumps and levels of nozzles, the greater the granularity of such control.

Pumping slurry 148' to higher level nozzles, such as nozzles 306A, will cause the slurry, which is sprayed from slurry sprayers 308A, to have a relatively long contact period with the $SO_2$ laden flue gas 114. This will in turn result in the absorption of a relatively larger amount of $SO_2$ from the flue gas 114 by the slurry than slurry entering the absorber at lower spray levels. On the other hand, pumping slurry to lower level nozzles, such as nozzles 306C, will cause the slurry 148', which is sprayed from slurry sprayers 308C, to have a relatively shorter contact period with the $SO_2$ laden flue gas 114. This will result in the absorption of a relatively smaller amount of $SO_2$ from the flue gas 114 by the slurry. Thus, a greater or lesser amount of $SO_2$ will be removed from the flue gas 114 with the same amount and composition of slurry 148', depending on the level of nozzles to which the slurry is pumped.

However, to pump the liquid slurry 148' to higher level nozzles, such as nozzles 306A, requires relative more power, and hence greater operational cost, than that required to pump the liquid slurry 148' to lower level nozzles, such as nozzles 306C. Accordingly, by pumping more liquid slurry to higher level nozzles to increase absorption and thus removal of sulfur from the flue gas 114, the cost of operation of the WFGD subsystem are increased.

Pumps 133A-133C are extremely large pieces of rotating equipment. These pumps can be started and stopped automatically by the MPCC 1500 by issuing pump state SPs, or manually by the subsystem operator or other user. If the flow rate of the flue gas 114 entering the absorber tower 132 is modified due to a change in the operation of the power generation system 110, MPCC 1500, executing the prediction logic 850, in accordance with the dynamic control model 870, and the control generator logic 860, will adjust the operation of one or more of the slurry pumps 133A-133C. For example, if the flue gas flow rate were to fall to 50% of the design load, the MPCC might issue one or more pump state SPs to shut down, i.e. turn off, one or more of the pumps currently pumping slurry 148' to the absorber tower nozzles at one or more of the spray levels, and/or one or more pump load control SPs to reduce the pump load of one or more of the pumps currently pumping slurry to the absorber tower nozzles at one or more spray level.

Additionally, if a dispenser (not shown) for organic acid or the like is included as part of the mixer/pump 140 or as a separate subsystem that fed the organic acid directly to the process, the MPCC 1500 might also or alternatively issue control SP signals (not shown) to reduce the amount of organic acid or other like additive being dispensed to the slurry to reduce the ability of the slurry to absorb and therefore remove $SO_2$ from the flue gas. It will be recognized that these additives tend to be quite expensive, and therefore their use has been relatively limited, at least in the United States of America. Once again, there is a conflict between $SO_2$ removal and operating cost: the additives are expensive, but the additives can significantly enhance $SO_2$ removal with little to no impact on gypsum purity. If the WFGD subsystem includes an additive injection subsystem, it would therefore be appropriate to allow the MPCC 1500 to control the additive injection in concert with the other WFGD process variables such that the MPCC 1500 operates the WFGD process at the lowest possible operating cost while still within equipment, process, and regulatory constraints. By inputting the cost of such additives to the MPCC 1500, this cost factor can be included in the dynamic control model and considered by the executing prediction logic in directing the control of the WFGD process.

Avoiding Limestone Binding

As previously discussed, in order to oxidize the absorbed $SO_2$ to form gypsum, a chemical reaction must occur between the $SO_2$ and the limestone in the slurry in the absorber tower 132. During this chemical reaction, oxygen is consumed to form the calcium sulfate. The flue gas 114 entering the absorber tower 132 is $O_2$ poor, so additional $O_2$ is typically added into the liquid slurry flowing to the absorber tower 132.

Figure 18:
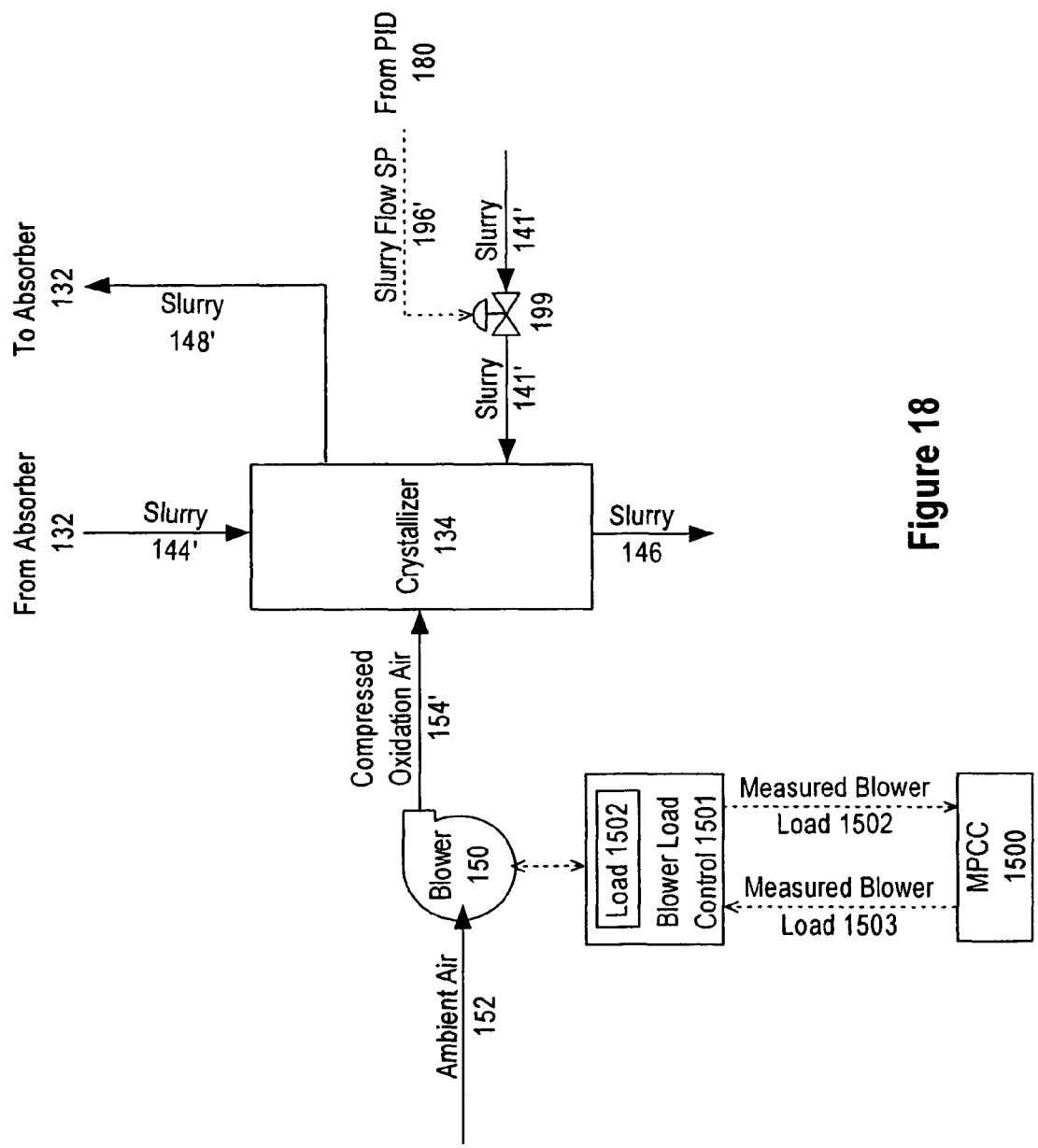
FIG. 18 further details still other aspects of the WFGD subsystem shown in FIG. 15A in accordance with the present invention.

Referring now also to FIG. 18, a blower 150, which is commonly characterized as a fan, compresses ambient air 152. The resulting compressed oxidation air 154' is directed to the crystallizer 134 and applied to the slurry within the crystallizer 134 which will be pumped to the absorber 132, as has been previously discussed with reference to FIG. 17. The addition of the compressed oxidation air 154' to the slurry within the crystallizer 134 results in the recycled slurry 148', which flows from the crystallizer 134 to the absorber 132 having an enhance oxygen content which will facilitate oxidization and thus the formation of calcium sulfate.

Preferably, there is an excess of oxygen in the slurry 148', although it will be recognized that there is an upper limit to the amount of oxygen that can be absorbed or held by slurry. To facilitate oxidation, it is desirable to operate the WFGD with a significant amount of excess $O_2$ in the slurry.

It will also be recognized that if the $O_2$ concentration within the slurry becomes too low, the chemical reaction between the $SO_2$ in the flue gas 114 and the limestone in the slurry 148' will slow and eventually cease to occur. When this occurs, it is commonly referred to as limestone blinding.

The amount of $O_2$ that is dissolved in the recyclable slurry within the crystallizer 134 is not a measurable parameter. Accordingly, the dynamic estimation model 880 preferably includes a model of the dissolved slurry $O_2$. The estimation logic, e.g. estimation logic 840 executed by the estimator 1500B of MPCC 1500, in accordance with the dynamic estimation model 880, computes an estimate of the dissolved $O_2$ in the recyclable slurry within the crystallizer 134. The computed estimate is passed to controller 1500A of MPCC 1500, which applies the computed estimate to update the dynamic control model, e.g. dynamic control model 870. The controller 1500A then executes the prediction logic, e.g. prediction logic 850, which compares the estimated dissolved slurry $O_2$ value with a dissolved slurry $O_2$ value constraint, which has been input to MPCC 1500. The dissolved slurry $O_2$ value constraint is one of the constraints 1555 shown in FIG. 15B, and is depicted more particularly in FIG. 19 as the dissolved slurry $O_2$ requirement 1926.

Based on the result of the comparison, the controller 1500A, still executing the prediction logic, determines if any adjustment to the operations of the WFGD subsystem 130' is required in order to ensure that the slurry 148' which is pumped to the absorber tower 132 does not become starved for $O_2$. It will be recognized that ensuring that the slurry 148' has a sufficient amount of dissolved $O_2$, also aids in ensuring that the $SO_2$ emissions and the quality of the gypsum by-product continue to meet the required emissions and quality constraints.

As shown in FIGS. 15A and 18, the blower 150 includes a load control mechanism 1501, which is sometimes referred to as a blower speed control mechanism, which can adjust the flow of oxidation air to the crystallizer 134. The load control mechanism 1501 can be used to adjust the load of the blower 150, and thus the amount of compressed oxidation air 154' entering the crystallizer 134, and thereby facilitate any required adjustment to the operations of the WFGD subsystem 130' in view of the comparison result. Preferably, the operation of the load control mechanism 1501 is controlled directly by the controller 1500A. However, if desired, the load control mechanism 1501 could be manually controlled by a subsystem operator based on an output from the controller 1500A directing the operator to undertake the appropriate manual control of the load control mechanism. In either case, based on the result of the comparison, the controller 1500A executes the prediction logic 850, in accordance with the dynamic control model 870, to determine if an adjustment to the amount of compressed oxidation air 154' entering the crystallizer 134 is required to ensure that the slurry 148' being pumped to the absorber tower 132 does not become starved for $O_2$ and, if so, the amount of the adjustment. The controller 1500A then executes control generator logic, such as control generator logic 860, in view of the blower load value 1502 received by the MPCC 1500 from the load control mechanism 1501, to generate control signals for directing the load control mechanism 1501 to modify the load of the blower 150 to adjust the amount of compressed oxidation air 154' entering the crystallizer 134 to a desired amount that will ensure that the slurry 148' being pumped to the absorber tower 132 does not become starved for $O_2$.

As has been noted previously, $O_2$ starvation is particularly of concern during the summer months when the heat reduces the amount of compressed oxidation air 154' that can be forced into the crystallizer 134 by the blower 150. The prediction logic 850 executed by the controller 1500A may, for example, determine that the speed or load of blower 150, which is input to the MPCC 1500 as the blower load value 1502, should be adjusted to increase the volume of compressed oxidation air 154' entering the crystallizer 134 by a determined amount. The control generator logic executed by the controller 1500A then determines the blower load SP 1503 which will result in the desired increase the volume of compressed oxidation air 154'. Preferably, the blower load SP 1503 is transmitted from the MPCC 1500 to the load control mechanism 1501, which directs an increase in the load on the blower 150 corresponding to the blower load SP 1503, thereby avoiding limestone blinding and ensuring that the $SO_2$ emissions and the quality of the gypsum by-product are within the applicable constraints.

Increasing the speed or load of the blower 150 will of course also increase the power consumption of the blower, and therefore the operational costs of the WFGD subsystem 130'. This increase in cost is also preferably monitored by the MPCC 1500 while controlling the operations of the WFGD subsystem 130', and thereby provide an economic incentive for controlling the blower 150 to direct only the necessary amount of compressed oxidation air 154' into the crystallizer 134.

As shown in FIG. 19, the current cost/unit of power, depicted as unit power cost 1906, is preferably input to the MPCC 1500 as one of the non-process inputs 1550 shown in FIG. 15B, and included in the dynamic control model 870. Using this information, the controller 1500A of the MPCC 1500 can also compute and display to the subsystem operator or others the change in the cost of operation based on the adjustment of the flow of compressed oxidation air 154' to the crystallizer 134.

Accordingly, provided that there is excess blower 150 capacity, the controller 1500A will typically control the flow of compressed oxidation air 154' to the crystallizer 134 to ensure that it is sufficient to avoid binding. However, if the blower 150 is operating at full load and the amount of compressed oxidation air 154' flowing to the crystallizer 134 is still insufficient to avoid binding, i.e. addition air (oxygen) is needed for oxidation of all the $SO_2$ being absorbed in absorber tower 132, the controller 1500A will need to implement an alternative control strategy. In this regard, once the $SO_2$ is absorbed into the slurry, it must be oxidized to gypsum—however, if there is no additional oxygen to oxidize the marginal $SO_2$, then it is best not to absorb the $SO_2$ because if the absorbed $SO_2$ can not be oxidized, limestone blinding will eventually occur.

Under such circumstances, the controller 1500A has another option which can be exercised in controlling the operation of the WFGD subsystem 130', to ensure that binding does not occur. More particularly, the controller 1500A, executing the prediction logic 850 in accordance with the dynamic control model 870 and the control generator logic 860, can control the PID 180 to adjust the pH level of the slurry 141' flowing to the crystallizer 134, and thereby control the pH level of the slurry 148' being pumped to the absorber tower 132. By directing a decrease in the pH level of the slurry 148' being pumped to the absorber tower 132, the additional marginal $SO_2$ absorption will be reduced and binding can be avoided.

Still another alternative strategy which can be implemented by the controller 1500A, is to operate outside of the constraints 1555 shown in FIG. 15B. In particular, the controller 1500A could implement a control strategy under which not as much of the $SO_2$ in the slurry 148' in the crystallizer 134 is oxidized. Accordingly the amount of $O_2$ required in the crystallizer 134 will be reduced. However, this action will in turn degrade the purity of the gypsum byproduct 160' produced by the WFGD subsystem 130'. Using this strategy, the controller 1500A overrides one or more of the constraints 1555 in controlling the operation of the WFGD subsystem 130'. Preferably, the controller maintains the hard emission constraint on $SO_2$ in the clean flue gas 116', which is depicted as outlet $SO_2$ permit requirement 1922 in FIG. 19, and overrides, and effectively lowers the specified purity of the gypsum byproduct 160', which is depicted as gypsum purity requirement 1924 in FIG. 19.

Accordingly, once the maximum blower capacity limit has been reached, the controller 1500A may control the operation of the WFGD subsystem 130' to decrease pH of the slurry 148' entering the absorber tower 132 and thereby reduce $SO_2$ absorption down to the emission limit, i.e. outlet $SO_2$ permit requirement 1922. However, if any further reduction in $SO_2$ absorption will cause a violation of the outlet $SO_2$ permit requirement 1922 and there is insufficient blower capacity to provide the needed amount of air (oxygen) to oxidize all of the absorbed $SO_2$ that must be removed, the physical equipment, e.g. the blower 150 and/or crystallizer 134, is undersized and it is not possible to meet both the $SO_2$ removal requirement and the gypsum purity. Since the MPCC 1500 cannot "create" the required additional oxygen, it must consider an alternate strategy. Under this alternate strategy, the controller 1500A controls the operation of the WFGD subsystem 130' to maintain a current level of $SO_2$ removal, i.e. to meet the outlet $SO_2$ permit requirement 1922, and to produce gypsum meeting a relaxed gypsum purity constraint, i.e. meeting a gypsum purity requirement which is less than the input gypsum purity requirement 1924. Beneficially the controller 1500A minimizes the deviation between the reduced gypsum purity requirement and the desired gypsum purity requirement 1924. It should be understood that a still further alternative is for the controller 1500A to control the operation of the WFGD subsystem 130' in accordance with a hybrid strategy which implements aspects of both of the above. These alternative control strategies can be implemented by setting standard tuning parameters in the MPCC 1500.

MPCC Operations

As has been described above, MPCC 1500 is capable of controlling large WFGD subsystems for utility applications within a distributed control system (DCS). The parameters which can be controlled by the MPCC 1500 are virtually unlimited, but preferably include at least one or more of: (1) the pH of the slurry 148' entering the absorber tower 132, (2) the slurry pump line-up that delivers liquid slurry 148' to the different levels of the absorber tower 132, and (3) the amount of compressed oxidation air 154' entering the crystallizer 134. As will be recognized, it is the dynamic control model 870 that contains the basic process relationships that will be utilized by the MPCC 1500 to direct control of the WFGD process. Accordingly, the relationships established in the dynamic control model 870 are of primary importance to the MPCC 1500. In this regard, the dynamic control model 870 relates various parameters, such as the pH and oxidation air levels, to various constraints, such as the gypsum purity and $SO_2$ removal levels, and it is these relationships which allow the dynamic and flexible control of the WFGD subsystem 130' as will be further detailed below.

FIG. 19 depicts, in greater detail, the preferred parameters and constraints that are input and used by the controller 1500A of the MPCC 1500. As will be described further below, the controller 1500A executes prediction logic, such as prediction logic 850, in accordance with the dynamic control model 870 and based on the input parameters and constraints, to predict future states of the WFGD process and to direct control of the WFGD subsystem 130' so as to optimize the WFGD process. The controller 1500A then executes control generator logic, such as control generator logic 860, in accordance with the control directives from the prediction logic, to generate and issue control signals to control specific elements of the WFGD subsystem 130'.

As previously described with reference to FIG. 15B, the input parameters include measured process parameters 1525, non-process parameters 1550, WFGD process constraints 1555, and estimated parameters 1560 computed by the MPCC estimator 1500B executing estimation logic, such as estimation logic 840, in accordance with the dynamic estimation model 880.

In the preferred implementation shown in FIG. 19, the measured process parameters 1525 include the ambient conditions 1520, the measured power generation system (PGS) load 1509, the measured inlet $SO_2$ 189, the blower load value 1502, the measured slurry pH 183, the measured outlet $SO_2$ 1505, the lab measured gypsum purity 1506, the slurry pump state values 1512 and the slurry pump load values 1515. The WFGD process constraints 1555 include the outlet $SO_2$ permit requirement 1922, the gypsum purity requirement 1924, the dissolved slurry $O_2$ requirement 1926 and the slurry pH requirement 1928. The non-process inputs 1550 include tuning factors 1902, the current $SO_2$ credit price 1904, the current unit power cost 1906, the current organic acid cost 1908, the current gypsum sale price 1910 and the future operating plans 1950. The estimated parameters 1560 computed by the estimator 1500B include the calculated gypsum purity 1932, the calculated dissolved slurry $O_2$ 1934, and the calculated slurry PH 1936. Because of the inclusion of non-process parameter inputs, e.g. the current unit power cost 1906, the MPCC 1500 can direct control of the WFGD subsystem 130' not only based on the current state of the process, but also based on the state of matters outside of the process.

Determining Availability of Additional $SO_2$ Absorption Capacity

As previously discussed with reference to FIG. 17, the MPCC 1500 can control the state and load of the pumps 133A-133C and thereby control the flow of slurry 148' to the different levels of the absorber tower 132. The MPCC 1500 may can also compute the current power consumption of the pumps 133A-133C based on the current pump line-up and the current pump load values 1515A-1515C, and additionally the current operational cost for the pumps based on the computed power consumption and the current unit power cost 1906.

The MPCC 1500 is preferably configured to execute the prediction logic 850, in accordance with dynamic control model 870 and based on the current pump state values 1512A-1512C and current pump load values 1515A-1515C, to determine the available additional capacity of pumps 133A-133C. The MPCC 1500 then determines, based on the determined amount of available additional pump capacity, the additional amount of $SO_2$ which can be removed by adjusting the operation of the pumps e.g. turning on a pump to change the pump line-up or increasing the power to a pump.

Determining the Additional Amount of $SO_2$ Available for Removal

As noted above, in addition to the measured inlet $SO_2$ composition 189 detected by sensor 188, the load 1509 of the power generation system (PGS) 110 is preferably detected by load sensor 1508 and also input as a measured parameter to the MPCC 1500. The PGS load 1509 may, for example, represent a measure of the BTUs of coal being consumed in or the amount of power being generated by the power generation system 110. However, the PGS load 1509 could also represent some other parameter of the power generation system 110 or the associated power generation process, as long as such other parameter measurement reasonably corresponds to the inlet flue gas load, e.g. some parameter of the coal burning power generation system or process which reasonably corresponds to the quantity of inlet flue gas going to the WFGD subsystem 130'.

The MPCC 1500 is preferably configured to execute the prediction logic 850, in accordance with dynamic control model 870, to determine the inlet flue gas load, i.e. the volume or mass of the inlet flue gas 114, at the absorber tower 132, that corresponds to the PGS load 1509. The MPCC 1500 may, for example, compute the inlet flue gas load at the absorber tower 132 based on the PGS load 1509. Alternatively, a PGS load 1509 could itself serve as the inlet flue gas load, in which case no computation is necessary. In either event, the MPCC 1500 will then determine the additional amount of $SO_2$ that is available for removal from the flue gas 114 based on the measured inlet $SO_2$ composition 189, the inlet flue gas load, and the measured outlet $SO_2$ 1505.

It should be recognized that the inlet flue gas load could be directly measured and input to the MPCC 1500, if so desired. That is, an actual measure of the volume or mass of the inlet flue gas 114 being directed to the absorber tower 132 could, optionally, be sensed by sensor (not shown) located upstream of the absorber tower 132 and downstream of the other APC subsystems 122 and fed to the MPCC 1500. In such a case, there might be no need for the MPCC 1500 to determine the inlet flue gas load that corresponds to the PGS load 1509.

Instantaneous and Rolling Average $SO_2$ Removal Constraints

As described, with reference to FIG. 12, a process historian database 1210 includes an $SO_2$ emission history database 890 as, for example, described with reference to FIG. 8. The process historian database 1210 interconnects to the MPCC 1500. It should be understood that MPCC 1500 could be of the type shown, for example, in FIG. 8, or could be a multi-tier type controller, such as a two tier controller as shown in FIG. 10.

The $SO_2$ emission history database 890 stores data representing the $SO_2$ emissions, not just in terms of the composition of the $SO_2$ but also the pounds of $SO_2$ emitted, over the last rolling average period. Accordingly, in addition to having access to information representing the current $SO_2$ emissions via the input measured outlet $SO_2$ 1505 from the $SO_2$ analyzer 1504, by interconnecting to the process historian database 1210 the MPCC 1500 also has access to historical information representing the $SO_2$ emissions, i.e. the measured outlet $SO_2$, over the last rolling-average time window via the $SO_2$ emissions history database 890. It will be recognized that, while the current $SO_2$ emissions correspond to a single value, the $SO_2$ emissions over the last rolling-average time window correspond to a dynamic movement of the $SO_2$ emissions over the applicable time period.

Determining the Availability of Additional $SO_2$ Oxidation Capacity

As shown in FIG. 19 and discussed above, input to the MPCC 1500 are measured values of (1) the outlet $SO_2$ 1505, (2) the measured blower load 1502, which corresponds to the amount of oxidation air entering the crystallizer 134, (3) the slurry pump state values 1512, i.e. the pump lineup, and the slurry pump load values 1515, which correspond to the amount of the limestone slurry flowing to the absorber tower 132, (4) the measured pH 183 of the slurry flowing to the absorber tower 132. Additionally input to the MPCC 1500 are limit requirements on (1) the purity 1924 of the gypsum byproduct 160', (2) the dissolved $O_2$ 1926 in the slurry within the crystallizer 134, which corresponds to the amount of dissolved $O_2$ in the slurry necessary to ensure sufficient oxidation and avoid blinding of the limestone, and (3) the outlet $SO_2$ 1922 in the flue gas 116' exiting the WFGD subsystem 130'. Today, the outlet $SO_2$ permit requirement 1922 will typically include constraints for both the instantaneous $SO_2$ emissions and the rolling average $SO_2$ emissions. Also input to MPCC 1500 are non-process inputs, including (1) the unit power cost 1906, e.g. the cost of a unit of electricity, and (2) the current and/or anticipated value of an $SO_2$ credit price 1904, which represents the price at which such a regulatory credit can be sold. Furthermore, the MPCC 1500 computes an estimate of (1) the current purity 1932 of the gypsum byproduct 160', (2) the dissolved $O_2$ 1934 in the slurry within the crystallizer 134, and (3) the PH 1936 of the slurry flowing to the absorber tower 132.

The MPCC 1500, executing the prediction logic in accordance with the dynamic control logic, processes these parameters to determine the amount Of $SO_2$ being reacted on by the slurry in the absorber tower 132. Based on this determination, the MPCC 1500 can next determine the amount of non-dissolved $O_2$ that remains available in the slurry within the crystallizer 134 for oxidation of the calcium sulfite to form calcium sulfate.

Determining Whether to Apply Additional Available Capacity

If the MPCC 1500 has determined that additional capacity is available to absorb and oxidize additional $SO_2$ and there is additional $SO_2$ available for removal, the MPCC 1500 is also preferably configured to execute the prediction logic 850, in accordance with the dynamic control model 870, to determine whether or not to control the WFGD subsystem 130' to adjust operations to remove additional available $SO_2$ from the flue gas 114. To make this determination, the MPCC 1500 may, for example, determine if the generation and sale of such $SO_2$ credits will increase the profitability of the WFGD subsystem 130' operations, because it is more profitable to modify operations to remove additional $SO_2$, beyond that required by the operational permit granted by the applicable governmental regulatory entity i.e. beyond that required by the outlet $SO_2$ permit requirement 1922, and to sell the resulting regulatory credits which will be earned.

In particular, the MPCC 1500, executing the prediction logic 850, in accordance with the dynamic control model 870, will determine the necessary changes in the operations of the WFGD subsystem 130' to increase the removal of $SO_2$. Based on this determination, the MPCC 1500 will also determine the number of resulting additional regulatory credits that will be earned. Based on the determined operational changes and the current or anticipated cost of electricity, e.g. unit power cost 1906, the MPCC 1500 will additionally determine the resulting additional electricity costs required by the changes in the WFGD subsystem 130' operations determined to be necessary. Based on these later determinations and the current or anticipated price of such credits, e.g. $SO_2$ credit price 1904, the MPCC 1500 will further determine if the cost of generating the additional regulatory credits is greater than the price at which such a credit can be sold.

If, for example, the credit price is low, the generation and sale of additional credits may not be advantageous. Rather, the removal of $SO_2$ at the minimal level necessary to meet the operational permit granted by the applicable governmental regulatory entity will minimize the cost and thereby maximize the profitability of the WFGD subsystem 130' operations, because it is more profitable to remove only that amount of $SO_2$ required to minimally meet the outlet $SO_2$ permit requirement 1922 of the operational permit granted by the applicable governmental regulatory entity. If credits are already being generated under the WFGD subsystem 130' current operations, the MPCC 1500 might even direct changes in the operation of the WFGD subsystem 130' to decrease the removal of $SO_2$ and thus stop any further generation of $SO_2$ credits, and thereby reduce electricity costs, and hence profitability of the operation.

Establishing Operational Priorities

As also shown in FIG. 19, MPCC 1500 is also preferably configured to receive tuning factors 1902 as another of the non-process input 1550. The MPCC 1500, executing the prediction logic 850 in accordance with the dynamic control model 870 and the tuning factors 1902, can set priorities on the control variables using, for example, respective weightings for each of the control variables.

In this regard, preferably the constraints 1555 will, as appropriate, establish a required range for each constrained parameter limitation. Thus, for example, the outlet $SO_2$ permit requirement 1922, the gypsum purity requirement 1924, the dissolved $O_2$ requirement 1926 and the slurry pH requirement 1928 will each have high and low limits, and the MPCC 1500 will maintain operations of the WFGD subsystem 130' within the range based on the tuning factors 1902.

Assessing the Future WFGD Process

The MPCC 1500, executing the prediction logic 850 in accordance with the dynamic process model 870, preferably first assesses the current state of the process operations, as has been discussed above. However, the assessment need not stop there. The MPCC 1500 is also preferably configured to execute the prediction logic 850, in accordance with the dynamic process model 870, to assess where the process operations will move to if no changes in the WFGD subsystem 130' operations are made.

More particularly, the MPCC 1500 assesses the future state of process operations based on the relationships within the dynamic control model 870 and the historical process data stored in the process historian database 1210. The historical process data includes the data in the $SO_2$ history database as well as other data representing what has previously occurred within the WFGD process over some predefined time period. As part of this assessment, the MPCC 1500 determines the current path on which the WFGD subsystem 130' is operating, and thus the future value of the various parameters associate with the WFGD process if no changes are made to the operations.

As will be understood by those skilled in the art, the MPCC 1500 preferably determines, in a manner similar to that discussed above, the availability of additional $SO_2$ absorption capacity, the additional amount of $SO_2$ available for removal, the availability of additional $SO_2$ oxidation capacity and whether to apply additional available capacity based on the determined future parameter values.

Implementing an Operating Strategy for WFGD Subsystem Operations

MPCC 1500 can be used as a platform to implement multiple operating strategies without impacting the underlying process model and process control relationships in the process model. MPCC 1500 uses an objective function to determine the operating targets. The objective function includes information about the process in terms of the relationships in the process model, however, it also includes tuning factors, or weights. The process relationships represented in the objective function are fixed via the process model are fixed. The tuning factors can be adjusted before each execution of the controller. Subject to process limits or constraints, the controller algorithm can maximize or minimize the value of the objective function to determine the optimum value of the objective function. Optimal operating targets for the process values are available to the controller from the optimum solution to the objective function. Adjusting the tuning factors, or weights, in the objective function changes the objective function value and, hence the optimum solution. It is possible to implement different operating strategies using MPCC 1500 by applying the appropriate criteria or strategy to set the objective function tuning constants. Some of the more common operating strategies might include:

Asset optimization (maximize profit/minimize cost),
Maximize pollutant removal,
Minimize movement of the manipulated variables in the control problem Optimizing WFGD Subsystem Operations Based on the desired operating criteria and appropriately tuned objective function and the tuning factors 1902, the MPCC 1500 will execute the prediction logic 850, in accordance with the dynamic process model 870 and based on the appropriate input or computed parameters, to first establish long term operating targets for the WFGD subsystem 130'. The MPCC 1500 will then map an optimum course, such as optimum trajectories and paths, from the current state of the process variables, for both manipulated and controlled variables, to the respective establish long term operating targets for these process variables. The MPCC 1500 next generates control directives to modify the WFGD subsystem 130' operations in accordance with the established long term operating targets and the optimum course mapping. Finally, the MPCC 1500, executing the control generator logic 860, generates and communicates control signals to the WFGD subsystem 130' based on the control directives.

Thus, the MPCC 1500, in accordance with the dynamic control model 870 and current measured and computed parameter data, performs a first optimization of the WFGD subsystem 130' operations based on a selected objective function, such as one chosen on the basis of the current electrical costs or regulatory credit price, to determine a desired target steady state. The MPCC 1500, in accordance with the dynamic control model 870 and process historical data, then performs a second optimization of the WFGD subsystem 130' operations, to determine a dynamic path along which to move the process variables from the current state to the desired target steady state. Beneficially, the prediction logic being executed by the MPCC 1500 determines a path that will facilitate control of the WFGD subsystem 130' operations by the MPCC 1500 so as to move the process variables as quickly as practical to the desired target state of each process variable while minimizing the error or the offset between the desired target state of each process variable and the actual current state of each process variable at every point along the dynamic path.

Hence, the MPCC 1500 solves the control problem not only for the current instant of time (T0), but at all other instants of time during the period in which the process variables are moving from the current state at T0 to the target steady state at Tss. This allows movement of the process variables to be optimized throughout the traversing of the entire path from the current state to the target steady state. This in turn provides additional stability when compared to movements of process parameters using conventional WFGD controllers, such as the PID described previously in the Background.

Optimized control of the WFGD subsystem is possible because the process relationships are embodied in the dynamic control model 870, and because changing the objective function or the non-process inputs, such as the economic inputs or the tuning of the variables, does not impact these relationships. Therefore, it is possible to manipulate or change the way the MPCC 1500 controls the WFGD subsystem 130', and hence the WFGD process, under different conditions, including different non-process conditions, without further consideration of the process level, once the dynamic control model has been validated.

Referring again to FIGS. 15A and 19, examples of the control of the WFGD subsystem 130' will be described for the objective function of maximizing $SO_2$ credits and for the objective function of maximizing profitability or minimizing loss of the WFGD subsystem operations. It will be understood by those skilled in the art that by creating tuning factors for other operating scenarios it is possible to optimize, maximize, or minimize other controllable parameters in the WFGD subsystem.

Maximizing $SO_2$ Credits

To maximize $SO_2$ credits, the MPCC 1500, executes the prediction logic 850, in accordance with the dynamic control model 870 having the objective function with the tuning constants configured to maximize $SO_2$ credits. It will be recognized that from a WFGD process point of view, maximizing of $SO_2$ credits requires that the recovery of $SO_2$ be maximized.

The tuning constants that are entered in the objective function will allow the object function to balance the effects of changes in the manipulated variables with respect to $SO_2$ emissions relative to each other.

The net result of the optimization will be that the MPCC 1500 will increase:

$SO_2$ removal by increasing the slurry pH setpoint 186', and
Increase blower oxidation air 154' to compensate for the additional $SO_2$ that is being recovered
Subject to constraints on:
The low limit on the gypsum purity constraint 1924. It will be recognized that this will typically be a value providing a slight margin of safety above the lowest allowable limit of gypsum purity within the gypsum purity requirement 1924.
The low limit on required oxidation air 154', and
The maximum capacity of the oxidation air blower 150.
In addition, If MPCC 1500 is allowed to adjust the pump 133 line-up, MPCC 1500 will maximize slurry circulation and the effective slurry height subject to constraints on pump 133 line-up and loading.

Under this operating scenario, MPCC 1500 is focused totally on increasing $SO_2$ removal to generate $SO_2$ credits. MPCC 1500 will honor process constraints such as gypsum purity 1924 and oxidation air requirements. But, this scenario does not provide for a balance between the cost/value of electrical power vs. the value of $SO_2$ credits. This scenario would be appropriate when the value of $SO_2$ credits far exceeds the cost/value of electrical power.

Maximizing Profitability or Minimizing Losses

The objective function in MPCC 1500 can be configured so that it will maximize profitability or minimize losses. This operating scenario could be called the "asset optimization" scenario. This scenario also requires accurate and up-to-date cost/value information for electrical power, $SO_2$ credits, limestone, gypsum, and any additives such as organic acid.

Cost/value factors associated with each of the variables in the controller model are entered into the objective function. Then, the objective function in MPCC 1500 is directed to minimize cost/maximize profit. If profit is defined as a negative cost, then cost/profit becomes a continuous function for the objective function to minimize.

Under this scenario, the objective function will identify minimum cost operation at the point where the marginal value of generating an additional $SO_2$ credit is equal to the marginal cost of creating that credit. It should be noted that the objective function is a constrained optimization, so the minimize cost solution will be subject to constraints on:

Minimum $SO_2$ removal (for compliance with emission permits/targets),
Minimum gypsum purity,
Minimum oxidation air requirement,
Maximum blower load,
Pump line-up and loading limits,
Additive limits.

This operating scenario will be sensitive to changes in both the value/cost of electricity and the value/cost of $SO_2$ credits. For maximum benefit, these cost factors should be updated in real-time.

For example, assuming that the cost factors are updated before each controller 1500A execution, as electricity demand increases during the day, the spot value of the electrical power being generated also increases. Assuming that it is possible for the utility to sell additional power at this spot value and value of $SO_2$ credits are essentially fixed at the current moment, then if there is a way to shift power from the pumps 133 and the blower 150 to the grid while still maintaining the minimum $SO_2$ removal, there is significant economic incentive to put the additional power on the grid. The cost/value factor associated with electrical power in the MPCC 1500 objective function will change as the spot value of electricity changes and the objective function will reach a new solution that meets the operating constraints but uses less electrical power.

Conversely, if the spot value of an $SO_2$ credit increases, there is a market for additional $SO_2$ credits, and the cost/value of electrical power is relatively constant, the objective function in MPCC 1500 will respond to this change by increasing $SO_2$ removal subject to the operating constraints.

In both example scenarios, MPCC 1500 will observe all operating constraints, and then the objective function in MPCC 1500 will seek the optimum operating point were the marginal value of an $SO_2$ credit is equal to the marginal cost required to generate the credit.

Infeasible Operation

It is possible that at times the WFGD Subsystem 130' will presented with a set of constraints 1555 and operating conditions, measured 1525 and estimated 1560, for which there is no feasible solution; the area of feasible operation 525 as shown in FIGS. 5A and 5B is null space. When this occurs, no solution will satisfy all of the constraints 1555 on the system. This situation can be defined as "infeasible operation" because it is infeasible to satisfy the constraints on the system.

Infeasible operation may be the result of operation beyond the capability of the WFGD, a process upset in either the WFGD or upstream of the WFGD. It may also be the result of overly restrictive, inappropriate, and/or incorrect constraints 1555 on the WFGD and the MPCC 1500 system.

During a period of infeasible operation, the objective function in MPCC 1500 focuses on the objective to minimize weighted error. Each process constraint 1555 appears in the objective function. A weighting term is applied to each error or violation of the constraint limit by the controlled/targeted process value. During controller 1500A commissioning, the implementation engineer(s) select appropriate values for the error weighting terms so that during periods of infeasible operation the objective function will "give-up" on constraints with the least weight in order to honor the more important constraints.

For example, in the WFGD subsystem 130', there are regulatory permit limits associated with the outlet $SO_2$ 1505 and a sales specification associated with gypsum purity 1506. Violation of the $SO_2$ emission permit carries fines and other significant ramifications. Violation of the gypsum purity sales specification requires downgrading or re-mixing of the gypsum product. Downgrading product is not a desirable option, but it has less impact on the operating viability of the generation station than violation of the emission permit. Hence, the tuning factors will be set so that the constraint on the $SO_2$ emission limit will have more importance, a greater weight, than the constraint on gypsum purity. So with these tuning factors, during periods of infeasible operation, the objective function in MPCC 1500 will preferentially maintain $SO_2$ emissions at or under the $SO_2$ emission limit and violate the gypsum purity constraint; MPCC 1500 will minimize violation of the gypsum purity constraint, but it will shift the infeasibility to this variable to maintain the more important emission limit.

Notifying Operators of Control Decisions

The MPCC 1500 is also preferably configured to provide notices to operators of certain MPCC 1500 determinations. Here also, the prediction logic 850, dynamic control model 870 or other programming may be used to configure the MPCC 1500 to provide such notices. For example, the MPCC may function to direct the sounding of alarms or presentation of text or image displays, so that operators or other users are aware of certain determinations of the MPCC 1500, such as a determination that maintaining gypsum quality is of low priority at a particular time because $SO_2$ credits are so valuable.

WFGD Summary

In summary, as described in detail above, the optimization-based control for a WFGD process has been described. This control facilitates the manipulation of the setpoints for the WFGD process in real-time based upon the optimization of a multiple-input, multiple-output model which is updated using process feedback. The optimization can take multiple objectives and constraints for the process into account. Without such control, the operator must determine the setpoints for the WFGD. Because of the complexity of the process, the operator often chooses suboptimal setpoints for balancing multiple constraints and objectives. Suboptimal setpoints/ operation results in lost removal efficiency, higher operating costs and potential violations of quality constraints.

Also described is a virtual on-line analysis for gypsum purity. The analysis computes an on-line estimate of the purity of the gypsum byproduct being produced by the WFGD process using measured process variables, lab analysis and a dynamic estimation model for gypsum purity. Since on-line sensors for gypsum purity produced by WFGD processing are not conventionally available, off-line lab analysis are conventionally used to determine gypsum purity. However, because gypsum purity is only occasionally tested, and the purity must be maintained above a constraint, typically set in the gypsum specification, process operators often use setpoints for the WFGD process that result in the gypsum purity being well above the required constraint. This in turn results in $SO_2$ removal efficiency being sacrificed and/or unnecessary power consumption by the WFGD subsystem. By estimating gypsum purity on-line, setpoints for the WFGD process can be controlled to ensure the gypsum purity closer to the purity constraint, thus, facilitating increased $SO_2$ removal efficiency.

As also described in detail above, the virtual on-line analysis of gypsum purity is preformed in a control loop, thus allowing estimates to be included in the feedback control, whether the model predictive control (MPC) or PID control is utilized. By providing feedback to a control loop, the $SO_2$ removal efficiency can be increased when operating so as to produce gypsum with purity closer to the applicable purity constraint.

Additionally described above is a virtual on-line analysis for operational costs. The analysis, as disclosed, uses WFGD process data as well as current market pricing data to compute the operation costs of a WFGD process on-line. Conventionally, operators do not account for the current cost of operating a WFGD process. However, by computing such cost on-line, operators are now given the ability to track the effects of process changes, e.g. changes in the setpoints, on operational cost.

Further described above is the performance of the virtual on-line analysis of operational cost in the control loop, thus allowing estimates to be included in the feedback control, irrespective of whether MPC or PID is utilized. This feedback control can thereby be exercised to minimize the operational costs.

Also described above is a technique for applying MPC control to optimize operation of the WFGD process for maximum $SO_2$ removal efficiency, minimum operational costs and/or the desired gypsum purity above a constraint. Such control may take advantage of a virtual analysis of gypsum purity and/or operational cost within the feedback loop, as discussed above, and is capable of automatic optimization, for example of the $SO_2$ removal efficiency and/or the operational costs for a WFGD process.

Necessary as well as optional parameters are described. With the disclosed parameters those skilled in the art can apply well known techniques in a routine manner to develop an appropriate model of the applicable WFGD process, which can in turn be utilized, for example by a MPCC 1550 controlling the WFGD process, to optimize operation of the WFGD process. Models may be developed for gypsum purity, $SO_2$ removal efficiency and/or operational costs, as well as various other factors. Conventional MPC or other logic can be executed based on the WFGD process models developed in accordance with the principles, systems and processes described herein, to optimize the WFGD process. Thus, the limitations of conventional control of WFGD processes, for example using PIDs, which are limited to single-input/single-output structures and strictly rely on process feedback, rather than process models, are overcome. By including models in the feedback loop, the WFGD process control can be even further enhanced to, for example, maintain operations closer to constraints with lower variability than ever before possible.

The application of neural network based models for a WFGD process is also described in both the context of process control and virtual on-line analysis of a WFGD process. As described in detail above, the input to output relationships of a WFGD process exhibits a nonlinear relationship, therefore making it advantageous to use a nonlinear model, since such a model will best represent the nonlinearity of the process. Furthermore, the development of other models derived using empirical data from the WFGD process is also described.

The application of a combination model, which considers both first principles and empirical process data, for control and virtual analysis of a WFGD process is also described in detail above. While some elements of the WFGD process are well understood and may be modeled using first principle models, other elements are not so well understood and are therefore most conveniently modeled using historical empirical process data. By using a combination of first principles and empirical process data, an accurate model can be developed quickly without the need to step test all elements of the process.

A technique for validating sensor measurements used in a WFGD process is also described above in detail. As described, non-validated measurements can be replaced, thereby avoiding improper control resulting from inaccurate sensor measurements of the WFGD process. By validating and replacing bad measurements, the WFGD process can now be continuous operated based upon the correct process values.

The control of rolling emissions is also described in detail. Thus, in view of the present disclosure, the WFGD process can be controlled so that one or more multiple rolling emissions average for the process can be properly maintained. The MPC can be implemented using a single controller or multiple cascaded controllers to control the process. Using the described technique, the WFGD process can be controlled, for example, such that multiple rolling averages are simultaneous considered and maintained while at the same time operational costs are minimized.

SCR Subsystem Architecture:

Highlights from the application of MPCC to the SCR will be described to demonstrate the usefulness of the present invention to other environments and implementations. The main control objectives for the SCR involve:

NOx removal—targeted for either regulatory compliance or asset optimization,
Control of ammonia slip, and
Minimum cost operation—management of SCR catalyst and ammonia usage.

Once again, a measurement and control methodology similar to what was discussed with the WFGD can be utilized:

Measurement: As discussed, ammonia slip is an important control parameter that is frequently not measured. If there is not a direct measurement of ammonia slip, it is possible to calculate ammonia slip from the inlet and outlet NOx measurements 2112 and 2111 and the ammonia flow to the SCR 2012. The accuracy of this calculation is suspect because it requires accurate and repeatable measurements and involves evaluating small differences between large numbers. Without a direct measurement of ammonia slip, virtual on-line analyzer techniques are used in addition to a direct calculation of ammonia slip to create a higher fidelity ammonia slip estimate.

The first step in the VOA estimates the catalyst potential (reaction coefficient) and the space velocity correlation variance (SVCV) across the SCR catalyst. These are computed using inlet flue gas flow, temperature, total operational time of the catalyst, and quantities of inlet $NO_x$ and outlet $NO_x$. Both the calculation of catalyst potential and SVCV are time averaged over a number of samples. The catalyst potential changes slowly, thus, many data points are used to compute the potential while the SVCV changes more often so relatively few data points are used to compute the SVCV. Given the catalyst potential (reaction coefficient), the space velocity correlation variance (SVCV), and the inlet $NO_x$, an estimate of ammonia slip may be computed using the technique shown in FIG. 9.

If an ammonia slip hardware sensor is available, a feedback loop from such a sensor to the process model will be used to automatically bias the VOA. The VOA would be used to significantly reduce the typically noisy output signal of the hardware sensor.

Finally, it should be noted that virtual on-line analyzer for operational cost of the SCR can be used. As outlined in the previous section, the model for operation costs is developed from first principles. The operational costs can be computed on-line using a virtual on-line analyzer—again, the technique that is shown in FIG. 9 is used for the VOA.

Figure 20:
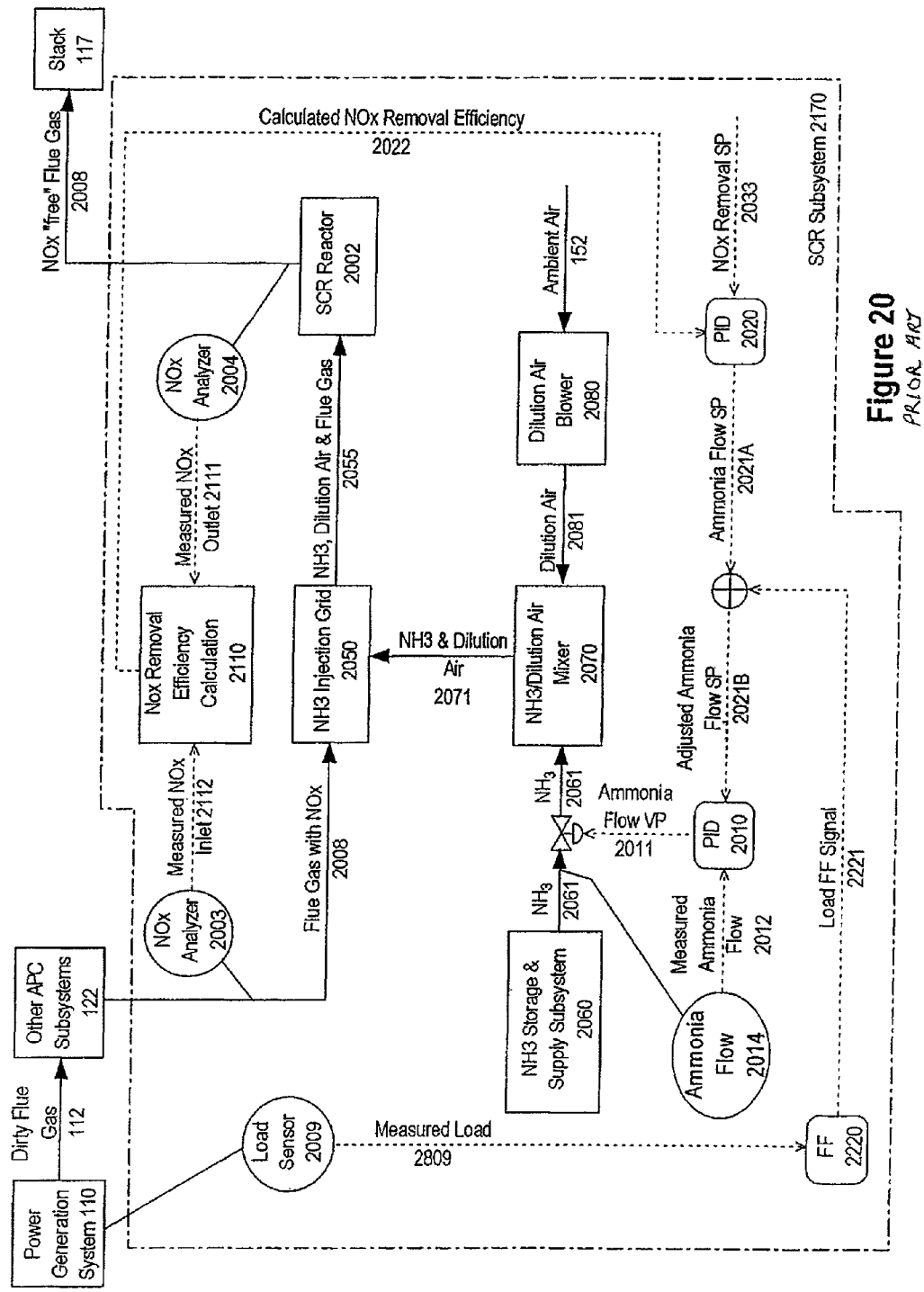
FIG. 20 is a block diagram depicting an overview of a typical selective catalytic reduction (SCR) unit.
Figure 21:
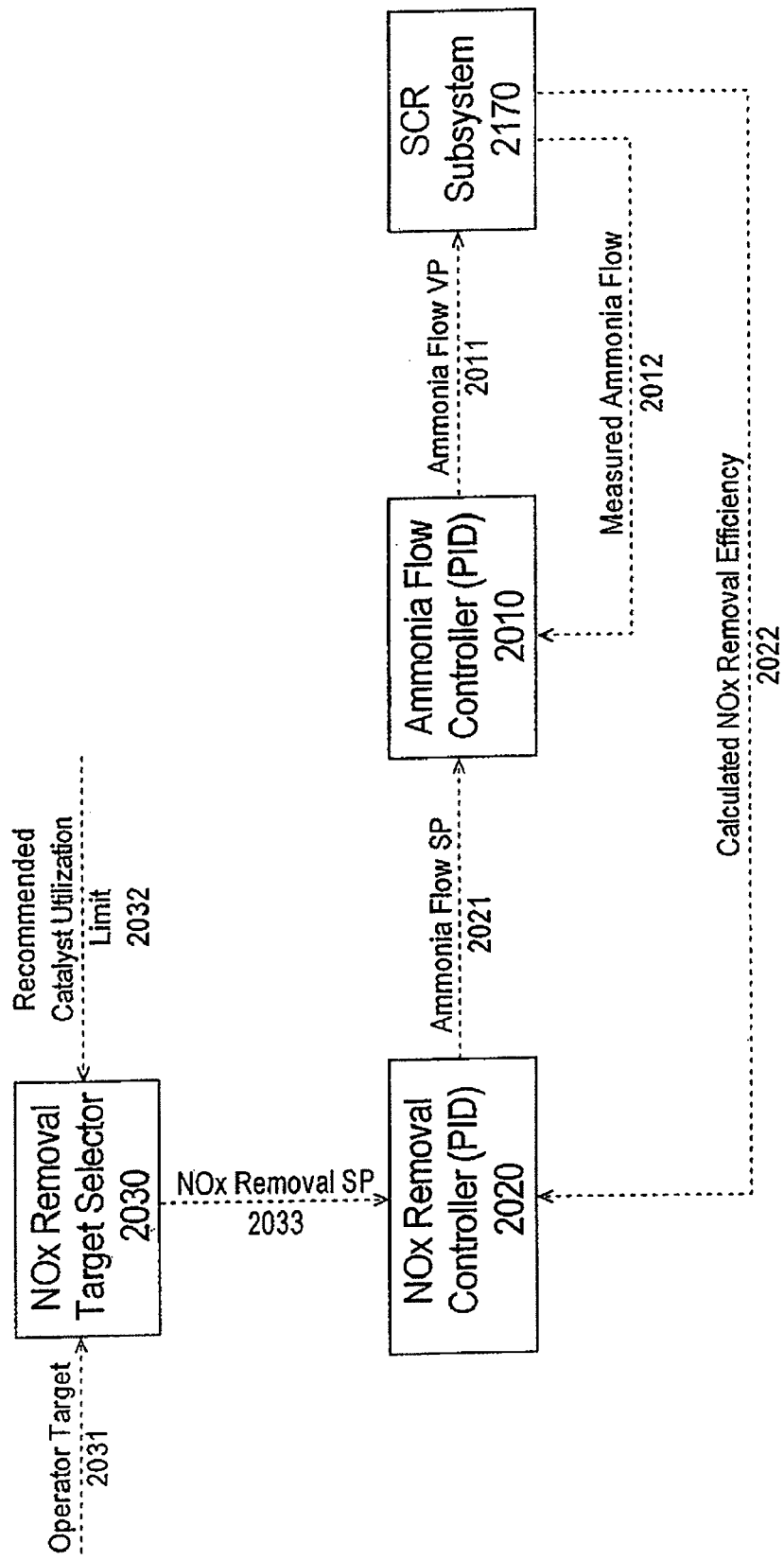
FIG. 21 depicts the conventional process control scheme for the SCR subsystem.
Figure 22:
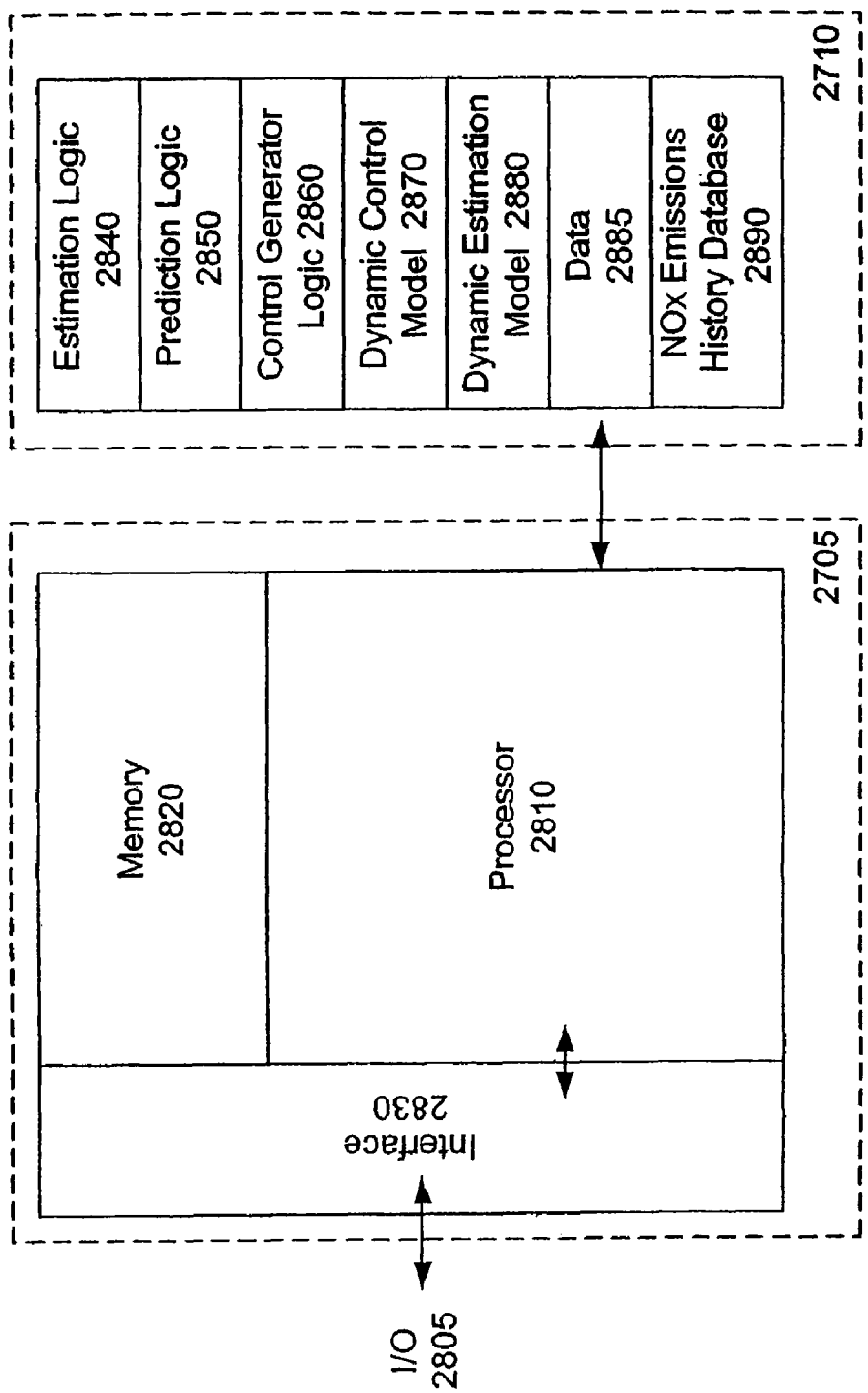
FIG. 22 details the processing unit and storage disk of the MPC controller in accordance with the present invention.
Figure 23A:
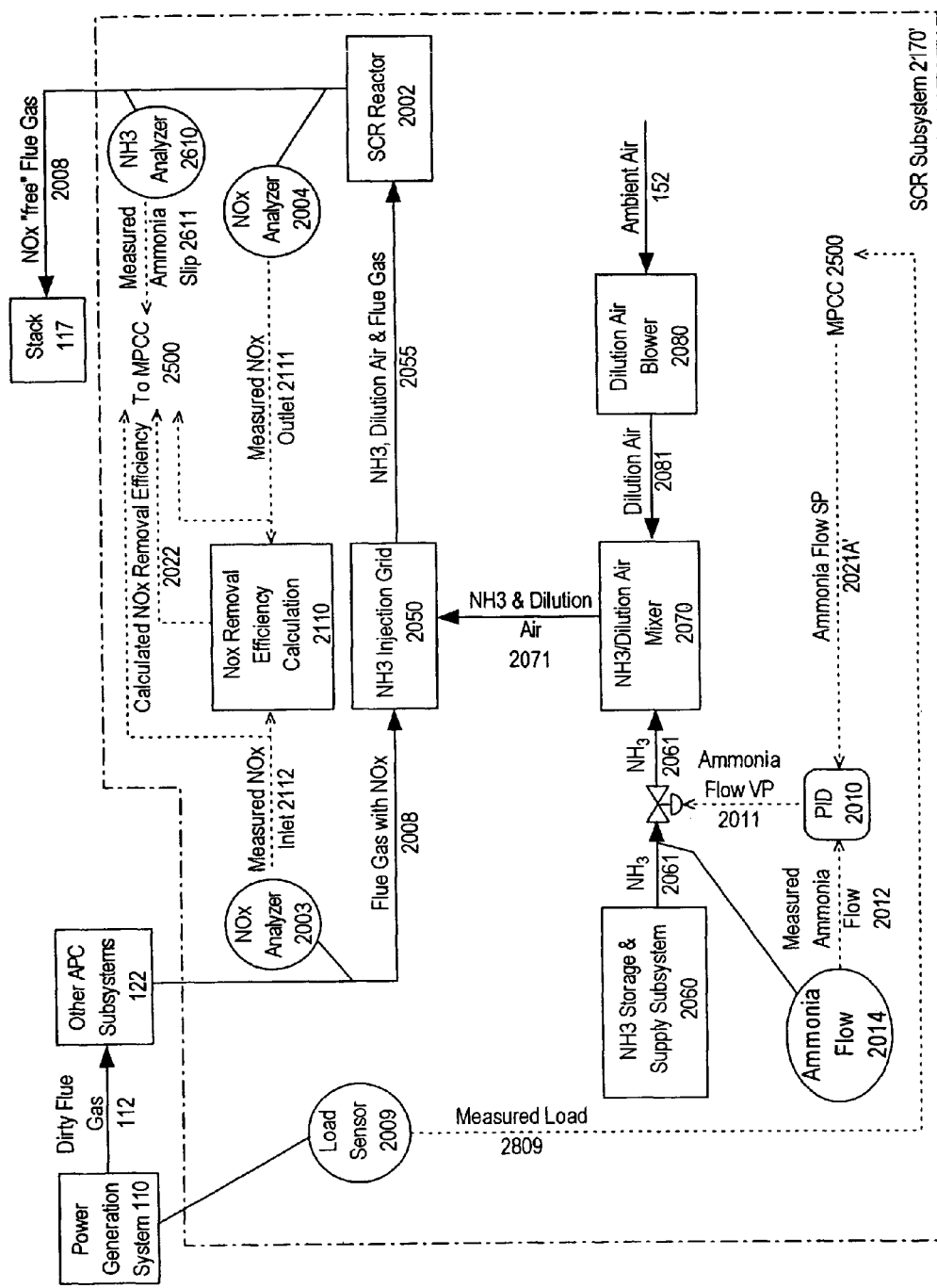
FIG. 23A depicts a SCR subsystem with overall operations of the subsystem controlled by an MPCC, in accordance with the present invention.

Control: MPCC is applied to the SCR control problem to achieve the control objectives. FIG. 22, similar to FIG. 8 shows the MPCC structure for the SCR MPCC 2500. Because of the similarities to FIG. 8, a detailed discussion of FIG. 22 is not necessary, as MPCC 2500 will be understood from the discussion of FIG. 8 above. FIG. 23A shows the application of MPCC 2500 to the SCR Subsystem 2170'. The biggest change to the SCR Subsystem 2170' regulatory control scheme is that functionality of the NOx Removal PID controller 2020 and the load feedforward controller 2220, each shown in FIG. 20, are replaced with MPCC 2500. MPCC 2500 directly calculates the ammonia flow SP 2021A' for use by the ammonia flow controller(s) (PID 2010).

MPCC 2500 can adjust one or a plurality to ammonia flows to control NOx removal efficiency and ammonia slip. Provided that there are sufficient measurement values with the inlet and outlet NOx analyzers 2003 and 2004 and the ammonia slip measurement 2611 from ammonia analyzer 2610 to establish NOx removal efficiency and ammonia profile information, MPCC 2500 will control the overall or average NOx removal efficiency and ammonia slip and also the profile values. Coordinated control of a plurality of values in the NOx removal efficiency and ammonia slip profile allows for a significant reduction in variability around the average process values. Lower variability translates into fewer "hot" stops within the system. This profile control requires at least some form of profile measure and control—more than one NOx inlet, NOx outlet and ammonia slip measurement and more than one dynamically adjustable ammonia flow. It must be acknowledged that without the necessary inputs (measurements) and control handles (ammonia flows), the MPCC 2500 will not be able to implement profile control and capture the resulting benefits.

From the perspective of MPCC 2500, the additional parameters associated with profile control increase the size of the controller, but the overall control methodology, scheme, and objectives are unchanged. Hence, future discussion will consider control of the SCR subsystem without profile control.

Figure 23B:
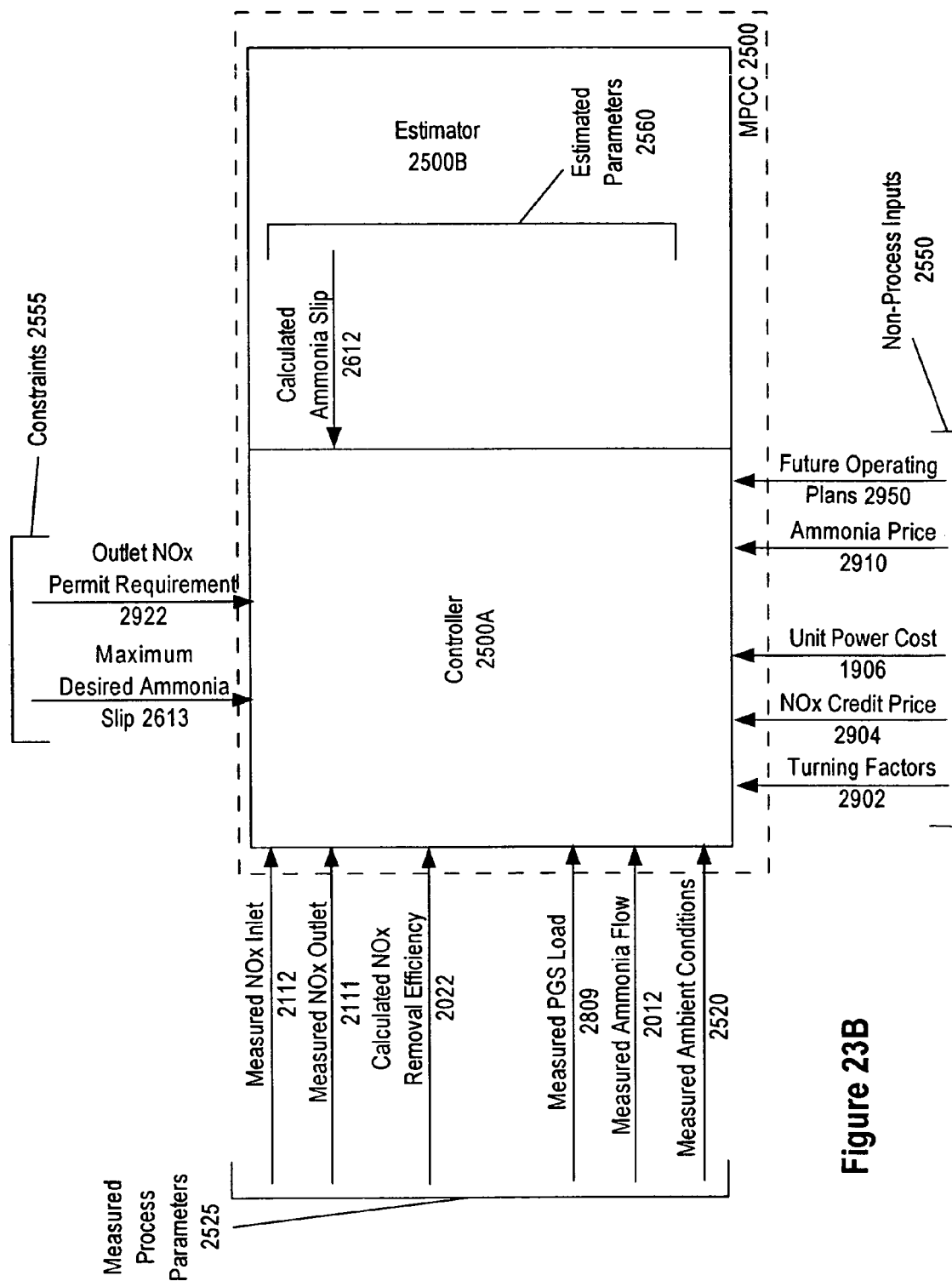
FIG. 23B further details aspects of the MPCC shown in FIG. 23A, in accordance with the present invention.

FIG. 23B shows an overview of MPCC 2500.

Optimizing SCR Subsystem Operations

Based on the desired operating criteria and appropriately tuned objective function and the tuning factors 2902, the MPCC 2500 will execute the prediction logic 2850, in accordance with the dynamic control model 2870 and based on the appropriate input or computed parameters, to first establish long term operating targets for the SCR subsystem 2170'. The MPCC 2500 will then map an optimum course, such as optimum trajectories and paths, from the current state of the process variables, for both manipulated and controlled variables, to the respective establish long term operating targets for these process variables. The MPCC 2500 next generates control directives to modify the SCR subsystem 2170' operations in accordance with the established long term operating targets and the optimum course mapping. Finally, the MPCC 2500, executing the control generator logic 2860, generates and communicates control signals to the SCR subsystem 2170' based on the control directives.

Thus, the MPCC 2500, in accordance with the dynamic control model and current measure and computed parameter data, performs a first optimization of the SCR subsystem 2170' operations based on a selected objective function, such as one chosen on the basis of the current electrical costs or regulatory credit price, to determine a desired target steady state. The MPCC 2500, in accordance with the dynamic control model and process historical data, then performs a second optimization of the SCR subsystem 2170' operations, to determine a dynamic path along which to move the process variables from the current state to the desired target steady state. Beneficially, the prediction logic being executed by the MPCC 2500 determines a path that will facilitate control of the SCR subsystem 2170' operations by the MPCC 2500 so as to move the process variables as quickly as practicable to the desired target state of each process variable while minimizing the error or the offset between the desired target state of each process variable and the actual current state of each process variable at every point along the dynamic path.

Hence, the MPCC 2500 solves the control problem not only for the current instant of time (T0), but at all other instants of time during the period in which the process variables are moving from the current state at T0 to the target steady state at Tss. This allows movement of the process variables to be optimized throughout the traversing of entire path from the current state to the target steady state. This in turn provides additional stability when compared to movements of process parameters using conventional SCR controllers, such as the PID described previously.

The optimized control of the SCR subsystem is possibly because the process relationships are embodied in the dynamic control model 2870, and because changing the objective function or the non-process inputs such as the economic inputs or the tuning of the variables, does not impact these relationships. Therefore, it is possible to manipulate or change the way the MPCC 2500 controls the SCR subsystem 2170', and hence the SCR process, under different conditions, including different non-process conditions, without further consideration of the process level, once the dynamic control model has been validated.

Referring again to FIGS. 23A and 23B, examples of the control of the SCR subsystem 2170' will be described for the objective function of maximizing $NO_x$ credits and for the objective function of maximizing profitability or minimizing loss of the SCR subsystem operations. It will be understood by those skilled in the art that by creating tuning factors for other operating scenarios it is possible to optimize, maximize, or minimize other controllable parameters in the SCR subsystem.

Maximizing NOx Credits

To maximize NOx credits, the MPCC 2500, executes the prediction logic 2850, in accordance with the dynamic control model 2870 having the objective function with the tuning constants configured to maximize NOx credits. It will be recognized that from a SCR process point of view, maximizing of NOx credits requires that the recovery of NOx be maximized.

The tuning constants that are entered into the objective function will allow the objective function to balance the effect of changes in the manipulated variables with respective to NOx emissions.

The net results of the optimization will be that the MPCC 2500 will increase:

NOx removal by increasing the ammonia flow setpoint(s) subject to constraints on:

Maximum ammonia slip.

Under this operating scenario, MPCC 2500 is focused totally on increasing NOx removal to generate NOx credits.

MPCC 2500 will honor the process constraint on ammonia slip. But, this scenario does not provide for a balance between the cost/value of ammonia or ammonia slip vs. the value of the NOx credits. This scenario would be appropriate when the value of NOx credits far exceeds the cost/value of ammonia and ammonia slip.

Maximizing Profitability or Minimizing Losses

The objective function in MPCC 2500 can be configured so that it will maximize profitability or minimize losses. This operating scenario could be called the "asset optimization" scenario. This scenario also requires accurate and up-to-date cost/value information for electrical power, NOx credits, ammonia, and the impact of ammonia slip on downstream equipment.

Cost/value factors associated with each of the variables in the controller model are entered into the objective function. Then, the objective function in MPCC 2500 is directed to minimize cost/maximize profit. If profit is defined as a negative cost, then cost/profit becomes a continuous function for the objective function to minimize.

Under this scenario, the objective function will identify minimum cost operation at the point where the marginal value of generating an additional $NO_x$ credit is equal to the marginal cost of creating that credit. It should be noted that the objective function is a constrained optimization, so the minimize cost solution will be subject to constraints on:

Minimum NOx removal (for compliance with emission permits/targets),

Minimum ammonia slip,

Minimize ammonia usage

This operating scenario will be sensitive to changes in both the value/cost of electricity and the value/cost of NOx credits. For maximum benefit, these cost factors should be updated in real-time.

For example, assuming that the cost factors are updated before each controller execution, as electricity demand increases during the day, the spot value of the electrical power being generated also increases. Assuming that it is possible for the utility to sell additional power at this spot value and value of NOx credits are essentially fixed at the current moment, then there is significant incentive to minimize ammonia slip because this will keep the air preheater cleaner and allow more efficient generation of power. There is a significant economic incentive to put the additional power on the grid. The cost/value factor associated with electrical power in the MPCC 2500 objective function will change as the spot value of electricity changes and the objective function will reach a new solution that meets the operating constraints but uses less electrical power.

Conversely, if the spot value of a NOx credit increases, there is a market for additional NOx credits, and the cost/value of electrical power is relatively constant, the objective function in MPCC 2500 will respond to this change by increasing NOx removal subject to the operating constraints.

In both example scenarios, MPCC 2500 will observe all operating constraints, and then the objective function in MPCC 2500 will seek the optimum operating point were the marginal value of a NOx credit is equal to the marginal cost required to generate the credit.

SUMMARY

It will also be recognized by those skilled in the art that, while the invention has been described above in terms of one or more preferred embodiments, it is not limited thereto. Various features and aspects of the above described invention may be used individually or jointly. Further, although the invention has been described in detail of the context of its implementation in a particular environment and for particular purposes, e.g. wet flue gas desulfurization (WFGD) with a brief overview of selective catalytic reduction (SCR), those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

We claim:

1. An article of manufacture for estimating either an attribute of a reactant applied during performance of, or an amount of a reactant exhausted by, a process having multiple process parameters (MPPs) that is performed to control an amount of a pollutant emitted into the air, comprising:
non-transitory computer readable storage media; and
logic stored on the storage media, wherein the stored logic is configured to be executable by one or more computers and thereby cause the one or more processors to operate so as to:
receive signals corresponding to attributes of the MPPs, including (i) if the process is a wet flue gas desulfurization (WFGD) process, a signal corresponding to a measured current pH level of the applied reactant, and (ii) if the process is a selective catalytic reduction (SCR) process, a signal corresponding to a measured current amount of the reactant exhausted by the process; and
estimate (i) if the process is the WFGD process, a current pH level of the applied reactant based on the attributes of the MPPs, other than the measured current pH level of the applied reactant, that correspond to the received signals, and on one of a neural network process model and a non-neural network process model that in either case represents a relationship between the pH level of the applied reactant and the attributes of the MPPs other than the measured current pH level of the applied reactant, or (ii) if the process is the SCR process, a current amount of the reactant exhausted by the process based on the attributes of the MPPs, other than the measured current amount of the reactant exhausted by the process, that correspond to the received signals and on one of a neural network process model and a non-neural network process model that in either case represents a relationship between the amount of the reactant exhausted by the process and the attributes of the MPPs other than the measured amount of the reactant exhausted by the process;
wherein execution of the stored logic by the one or more processors also thereby causes the one or more computers to operate so as to (a) compare (i) if the process is the WFGD process, the estimated pH level of the applied reactant with the measured pH level of the applied reactant corresponding to the received signal or (ii) if the process is the SCR process, the estimated amount of reactant exhausted by the process with the measured amount of reactant exhausted by the process corresponding to the received signal, and (b) determine (i) if the process is the WFGD process, the validity of the measured pH level based on the comparison, and (ii) if the process is the SCR process, the validity of the measured amount based on the comparison.

2. The article of manufacture according to claim 1, wherein:
the pH level of the applied reactant, or the amount of the reactant exhausted by the process, is estimated in real time during performance of the process; and
the estimated pH level is compared with the measured pH level of the applied reactant and the validity of the measured pH level is determined, or the estimated amount is compared with the measured amount of reactant exhausted by the process and the validity of the measured amount is determined, in real time during performance of the process.

3. The article of manufacture according to claim 1, wherein:
the attributes of the MPPs corresponding to the received signals include one or more of (i) an attribute of one of the MPPs measured during performance of the process and (ii) an attribute of one of the MPPs computed based on attributes of other of the MPPs measured during performance of the process.

4. The article of manufacture according to claim 1, wherein:
the pH level of the applied reactant or the amount of the reactant exhausted by the process, is estimated in real time during performance of the process.

5. The article of manufacture according to claim 1, wherein:
the reactant is a limestone slurry;
the process is a WFGD process which applies the limestone slurry to remove $SO_2$ from $SO_2$ laden wet flue gas, and exhausts desulfurized flue gas;
the attributes of the MPPs include an amount of $SO_2$ in the $SO_2$ laden flue gas and an amount of $SO_2$ in the exhausted desulfurized flue gas;
the one model represents a relationship between the pH level of the applied limestone slurry and the amount of $SO_2$ in the $SO_2$ laden flue gas and the amount of $SO_2$ in the exhausted desulfurized flue gas; and
the pH level of the applied limestone slurry is estimated based on the amount of $SO_2$ in the $SO_2$ laden flue gas and the amount of $SO_2$ in the exhausted desulfurized flue gas that correspond to the received signals, and on the one model.

6. The article of manufacture according to claim 1, wherein:
the reactant is ammonia;
the process is a SCR process which applies ammonia to remove $NO_x$ from $NO_x$ laden flue gas and exhausts reduced $NO_x$ flue gas;
the attributes of the MPPs include an amount of $NO_x$ in the $NO_x$ laden flue gas and an amount of $NO_x$ in the exhausted desulfurized flue gas;
the one model represents a relationship between the amount of the ammonia in the exhausted reduced $NO_x$ flue gas and the amount of $NO_x$ in the $NO_x$ laden flue gas and the amount of $NO_x$ in the exhausted reduced $NO_x$ flue gas; and
the amount of the ammonia in the exhausted reduced $NO_x$ flue gas is estimated based on the amount of $NO_x$ in the $NO_x$ laden flue gas and the amount of $NO_x$ in the exhausted reduced $NO_x$ flue gas that correspond to the received signals, and on the one model.

7. The article of manufacture according to claim 1, wherein:
the one network process model is a dynamic neural or non-neural network process model which represents a relationship over time between the pH level of the reactant and the applicable other attributes.

* * * * *